US012639314B2

(12) United States Patent
Files et al.

(10) Patent No.: US 12,639,314 B2
(45) Date of Patent: May 26, 2026

(54) MACHINE LEARNING TECHNIQUES FOR IMPROVING CONTEXT AND UNDERSTANDING OF USER INTERACTION-BASED DATA

(71) Applicant: Soroco India Private Limited, Bengaluru (IN)

(72) Inventors: Kirby Scott Files, Milton, MA (US); George Peter Nychis, Somerville, MA (US); Nikhil Malayil, Calicut (IN); Rohan Narayana Murty, Bangalore (IN); Dishant Arora, Bikaner (IN); Vinayak Dhar, Bengaluru (IN); Sourabh De, Bangalore (IN); Shreyas Harsha Karanth, Bengaluru (IN); Hemanth Yamijala, Bangalore (IN); Mounik V. Patel, Bengaluru (IN); Nikhil Minz, Ranchi (IN)

(73) Assignee: Soroco India Private Limited, Bengaluru (IN)

( * ) Notice: Subject to any disclaimer, the term of this patent is extended or adjusted under 35 U.S.C. 154(b) by 0 days.

(21) Appl. No.: 19/016,076

(22) Filed: Jan. 10, 2025

(65) Prior Publication Data

US 2025/0231947 A1     Jul. 17, 2025

Related U.S. Application Data

(60) Provisional application No. 63/704,471, filed on Oct. 7, 2024, provisional application No. 63/620,142, filed on Jan. 11, 2024.

(51) Int. Cl.
| | |
|---|---|
| *G06F 16/00* | (2019.01) |
| *G06F 16/2455* | (2019.01) |
| *G06F 16/248* | (2019.01) |

(52) U.S. Cl.
CPC ...... *G06F 16/24568* (2019.01); *G06F 16/248* (2019.01)

(58) Field of Classification Search
CPC ......................... G06F 16/24568; G06F 16/248
See application file for complete search history.

(56) References Cited

U.S. PATENT DOCUMENTS

| | | | |
|---|---|---|---|
| 10,474,313 B2 | 11/2019 | Nychis et al. | |
| 10,831,450 B2 | 11/2020 | Kim et al. | |

(Continued)

OTHER PUBLICATIONS

International Search Report and Written Opinion mailed Jul. 19, 2024, in connection with International Application No. PCT/IN2024/050370.

(Continued)

*Primary Examiner* — Paul Kim

(74) *Attorney, Agent, or Firm* — Wolf, Greenfield & Sacks, P.C.

(57) ABSTRACT

Techniques for using machine learning (ML) model(s) to generate a textual summary of a stream of events at least in part by receiving information corresponding to the stream of events corresponding to interactions between a user and application program(s) executing on a computing device, the information comprising, for each of multiple events in the stream of events associated with a process, metadata associated with the event, wherein metadata for a particular event specifies values for attributes of the particular event; processing, using at least one ML model, the metadata associated with the multiple events to generate multiple corresponding textual summaries of the multiple events; generating, using the textual summaries of the multiple events, a textual summary of the process performed by the user through the interactions between the user and the application program(s) executing on the computing device; and outputting the textual summary of the process.

20 Claims, 25 Drawing Sheets

(56) References Cited

U.S. PATENT DOCUMENTS

| | | |
|---|---|---|
| 11,816,112 B1 | 11/2023 | Nychis et al. |
| 12,020,046 B1 | 6/2024 | Nychis et al. |
| 2021/0149641 A1 | 5/2021 | Kim et al. |
| 2023/0205396 A1 | 6/2023 | Romagnoli et al. |
| 2023/0393870 A1 | 12/2023 | Singh |
| 2025/0148395 A1* | 5/2025 | Hambrose .......... G06Q 10/0633 |
| 2025/0231947 A1 | 7/2025 | Files et al. |

OTHER PUBLICATIONS

International Search Report and Written Opinion mailed Apr. 15, 2025, in connection with International Application No. PCT/IB2025/000026.

Reimers et al., Sentence-BERT: Sentence embeddings using Siamese BERT-Networks. arXiv preprint arXiv:1908.10084v1. Aug. 27, 2019. 11 pages.

\* cited by examiner

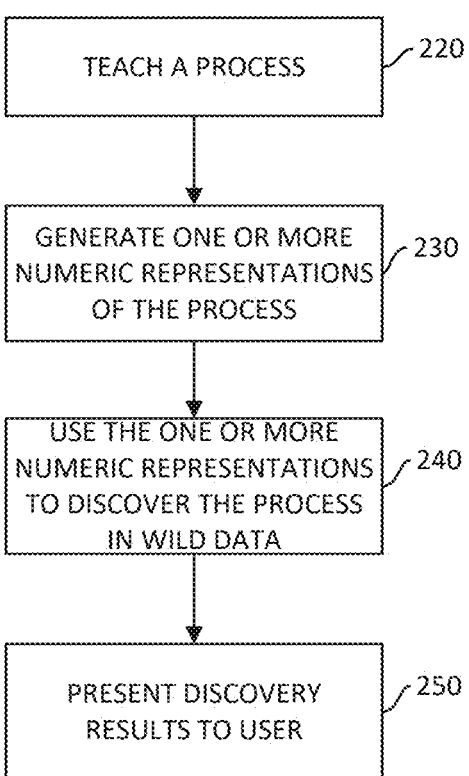
200
TEACH A PROCESS — 220
GENERATE ONE OR MORE NUMERIC REPRESENTATIONS OF THE PROCESS — 230
USE THE ONE OR MORE NUMERIC REPRESENTATIONS TO DISCOVER THE PROCESS IN WILD DATA — 240
PRESENT DISCOVERY RESULTS TO USER — 250
FIG. 2

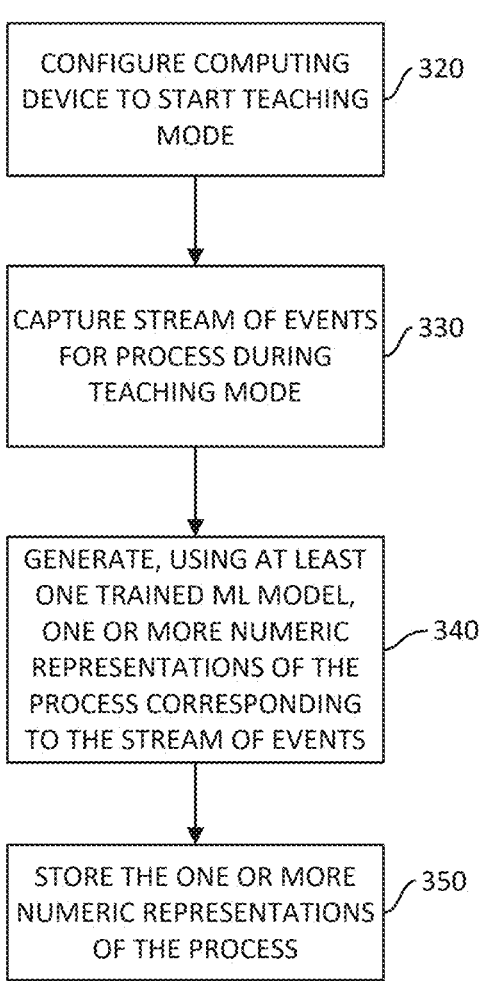
FIG. 3

450

[Company Name]
[Office Address]
[City, ST ZIP]
Phone: (000)-000-0000
Fax:(000)-000-0000
Website

DATE  9/26/2015
PO #  [123456]

VENDOR
[Company Name]
[Contact or Department]
[Street Address]
[City, ST ZIP]
Phone: (000)-000-0000
Fax:(000)-000-0000

SHIP TO
[Name]
[Company Name]
[Street Address]
[City, ST ZIP]
[Phone]

| REQUISITIONER | SHIP WA | F.O.B. | SHIPPING TERMS | |
|---|---|---|---|---|
| ITEM # | DESCRIPTION | QTY | UNIT PRICE | TOTAL |
| [23423423] | Product XYZ | 15 | 130.00 | 2250.00 |
| [45645645] | ProductABC | 1 | 75.00 | 75.00 |

SUBTOTAL  2,325.00
TAX
SHIPPING
OTHER
TOTAL  $2,325.00

Comments or Special Instructions
Thank you for your business

If you have any questions about the purchase order, please contact

I. The Parties. This Service Contract ("Agreement") made _____ 20___

Service Provider: _____, with a mailing address of _____ ("Service Provider") and
Client: _____, with a mailing address of _____ ("Client").
Service Provider and Client are each referred to herein as a "Party" and, collectively, as The "Parties".
NOW, THEREFORE, FOR AND IN CONSIDERATION of the mutual promises and agreements
contained herein, the Client hires the Service Provider to work under the terms and conditions
hereby agreed upon by the Parties:

II. Terms. The Terms of this Agreement shall commence on _____ 20___ (check one)
☐ - At-Will. Written notice of at least _____ days' notice.
☐ - End Date, On _____ 20___.
☐ - Other, III. The Service. The Service Provider agrees to provide the following:

Hereinafter known as the "Service".
The Service Provider shall provide, while performing the Service, that he/she/they shall comply
with the policies, standards, and regulations of the Client, including local, State, and Federal laws
and to the best of their abilities.

IV. Payment Amount. The Client agrees to pay the Service Provider the following compensation
for the service performed under this Agreement: (check one)
☐ - $ _____ / Hour
☐ - $ _____ / per Job. A 'Job' is _____
☐ - Other, Hereinafter known as the "Payment Amount".

Page 1 of 4

FIG. 4B

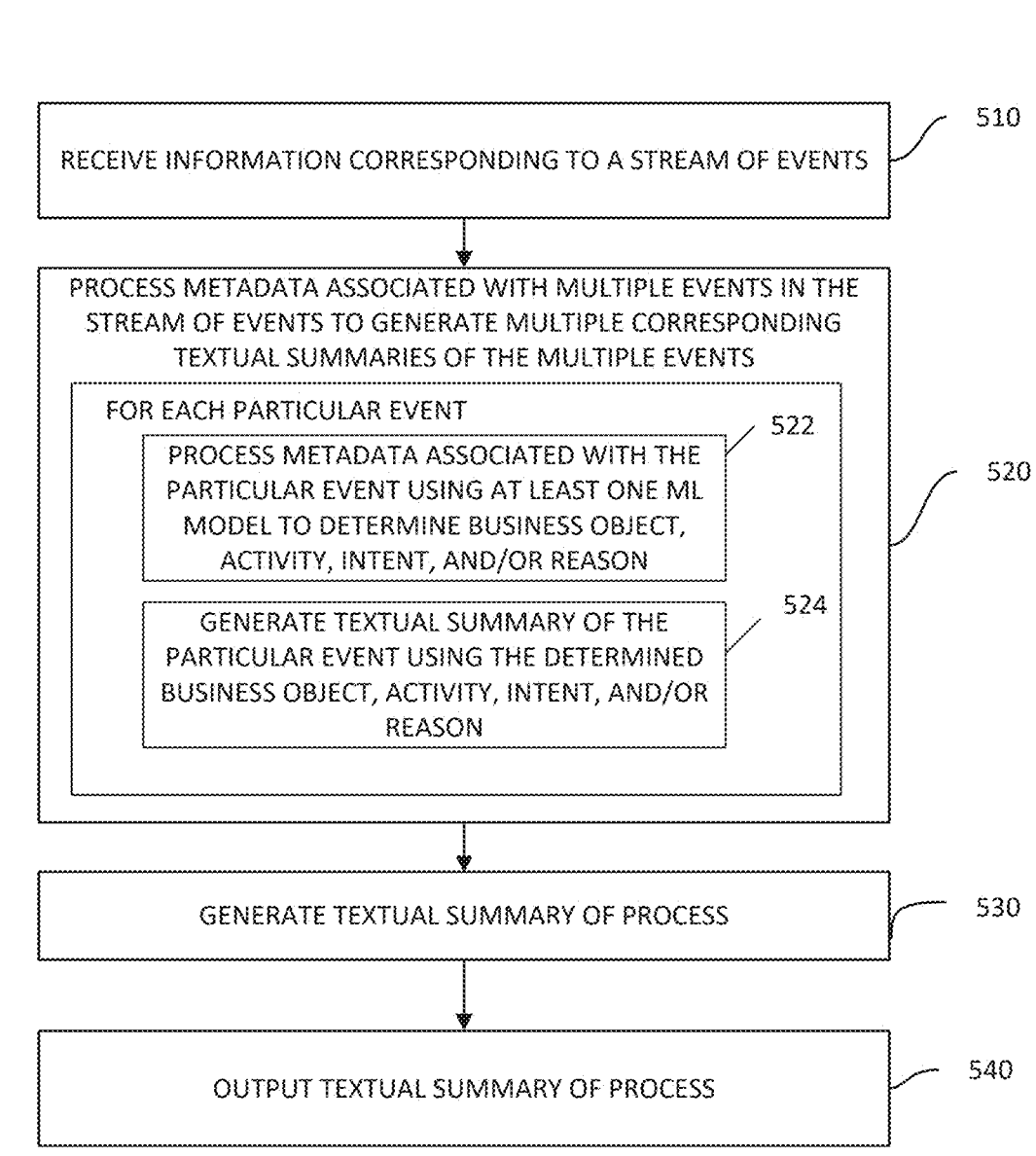

500

510 RECEIVE INFORMATION CORRESPONDING TO A STREAM OF EVENTS

520 PROCESS METADATA ASSOCIATED WITH MULTIPLE EVENTS IN THE STREAM OF EVENTS TO GENERATE MULTIPLE CORRESPONDING TEXTUAL SUMMARIES OF THE MULTIPLE EVENTS

FOR EACH PARTICULAR EVENT

522 PROCESS METADATA ASSOCIATED WITH THE PARTICULAR EVENT USING AT LEAST ONE ML MODEL TO DETERMINE BUSINESS OBJECT, ACTIVITY, INTENT, AND/OR REASON

524 GENERATE TEXTUAL SUMMARY OF THE PARTICULAR EVENT USING THE DETERMINED BUSINESS OBJECT, ACTIVITY, INTENT, AND/OR REASON

530 GENERATE TEXTUAL SUMMARY OF PROCESS

540 OUTPUT TEXTUAL SUMMARY OF PROCESS

FIG. 5

MACHINE LEARNING TECHNIQUES FOR IMPROVING CONTEXT AND UNDERSTANDING OF USER INTERACTION-BASED DATA

CROSS-REFERENCE TO RELATED APPLICATIONS

This application claims the benefit of U.S. Provisional Patent Application Ser. No. 63/620,142, filed Jan. 11, 2024, entitled "Machine Learning Techniques for Improving Context and Understanding of User Interaction-Based Data" and U.S. Provisional Patent Application Ser. No. 63/704,471 filed Oct. 7, 2024, entitled "Machine Learning Techniques for Improving Context and Understanding of User Interaction-Based Data". Both these applications are incorporated by reference herein in their entirety.

BACKGROUND

Employees at many companies spend much of their time working on computers. An employer may monitor an employee's computer activity by installing a monitoring application program on the employee's work computer to monitor the employee's actions. For example, an employer may install a keystroke logger application on the employee's work computer. The keystroke logger application may be used to capture the employee's keystrokes and store the captured keystrokes in a text file for subsequent analysis.

SUMMARY

Some embodiments provide for a method of generating a textual summary of a stream of events corresponding to interactions between a user performing a process and one or more application programs executing on a computing device, the method comprising: receiving information corresponding to the stream of events corresponding to the interactions between the user and the one or more application programs executing on the computing device, the information comprising, for each of multiple events in the stream of events associated with the process, metadata associated with the event, wherein metadata for a particular event specifies values for attributes of the particular event; processing, using at least one machine learning (ML) model, the metadata associated with the multiple events in the stream of events to generate multiple corresponding textual summaries of the multiple events, the processing comprising: for each particular event of the multiple events in the stream of events: processing metadata associated with the particular event using the at least one ML model to determine a business object, an activity, an intent, and/or a reason associated with the particular event; and generating a textual summary of the particular event from the determined business object, activity, intent, and/or reason associated with the particular event; generating, using the textual summaries of the multiple events, a textual summary of the process performed by the user through the interactions between user and the one or more application programs executing on the computing device; and outputting the textual summary of the process.

Some embodiments provide for a system, comprising at least one computer hardware processor; and at least one non-transitory computer-readable storage medium storing processor executable instructions that, when executed by the at least one computer hardware processor, cause the at least one computer hardware processor to perform a method of generating a textual summary of a stream of events corresponding to interactions between a user performing a process and one or more application programs executing on a computing device, the method comprising: receiving information corresponding to the stream of events corresponding to the interactions between the user and the one or more application programs executing on the computing device, the information comprising, for each of multiple events in the stream of events associated with the process, metadata associated with the event, wherein metadata for a particular event specifies values for attributes of the particular event; processing, using at least one machine learning (ML) model, the metadata associated with the multiple events in the stream of events to generate multiple corresponding textual summaries of the multiple events, the processing comprising: for each particular event of the multiple events in the stream of events: processing metadata associated with the particular event using the at least one ML model to determine a business object, an activity, an intent, and/or a reason associated with the particular event; and generating a textual summary of the particular event from the determined business object, activity, intent, and/or reason associated with the particular event; generating, using the textual summaries of the multiple events, a textual summary of the process performed by the user through the interactions between the user and the one or more application programs executing on the computing device; and outputting the textual summary of the process.

Some embodiments provide for at least one non-transitory computer-readable storage medium storing processor executable instructions that, when executed by at least one computer hardware processor, cause the at least one computer hardware processor to perform a method of generating a textual summary of a stream of events corresponding to interactions between a user performing a process and one or more application programs executing on a computing device, the method comprising: receiving information corresponding to the stream of events corresponding to the interactions between the user and the one or more application programs executing on the computing device, the information comprising, for each of multiple events in the stream of events associated with the process, metadata associated with the event, wherein metadata for a particular event specifies values for attributes of the particular event; processing, using at least one machine learning (ML) model, the metadata associated with the multiple events in the stream of events to generate multiple corresponding textual summaries of the multiple events, the processing comprising: for each particular event of the multiple events in the stream of events: processing metadata associated with the particular event using the at least one ML model to determine a business object, an activity, an intent, and/or a reason associated with the particular event; and generating a textual summary of the particular event from the determined business object, activity, intent, and/or reason associated with the particular event; generating, using the textual summaries of the multiple events, a textual summary of the process performed by the user through the interactions between the user and the one or more application programs executing on the computing device; and outputting the textual summary of the process.

BRIEF DESCRIPTION OF THE DRAWINGS

Various non-limiting embodiments of the technology will be described with reference to the following figures. It should be appreciated that the figures are not necessarily drawn to scale.

FIG. 2 illustrates a flowchart of an illustrative method for generating numeric representation(s) of a process and using the numeric representation(s) during process discovery in accordance with some aspects of the technology described herein;

FIG. 3 illustrates a flowchart of an illustrative method for generating numeric representation(s) of a process in accordance with some aspects of the technology described herein;

FIG. 4B illustrates an annotated screenshot indicating examples of metadata associated with events corresponding to user interactions with a document, in accordance with some aspects of the technology described herein;

FIG. 5 illustrates a flowchart of an illustrative method for generating a textual summary of a stream of events corresponding to interactions between a user performing a process and one or more application programs executing on a computing device, in accordance with some aspects of the technology described herein;

DETAILED DESCRIPTION

Figure 1:
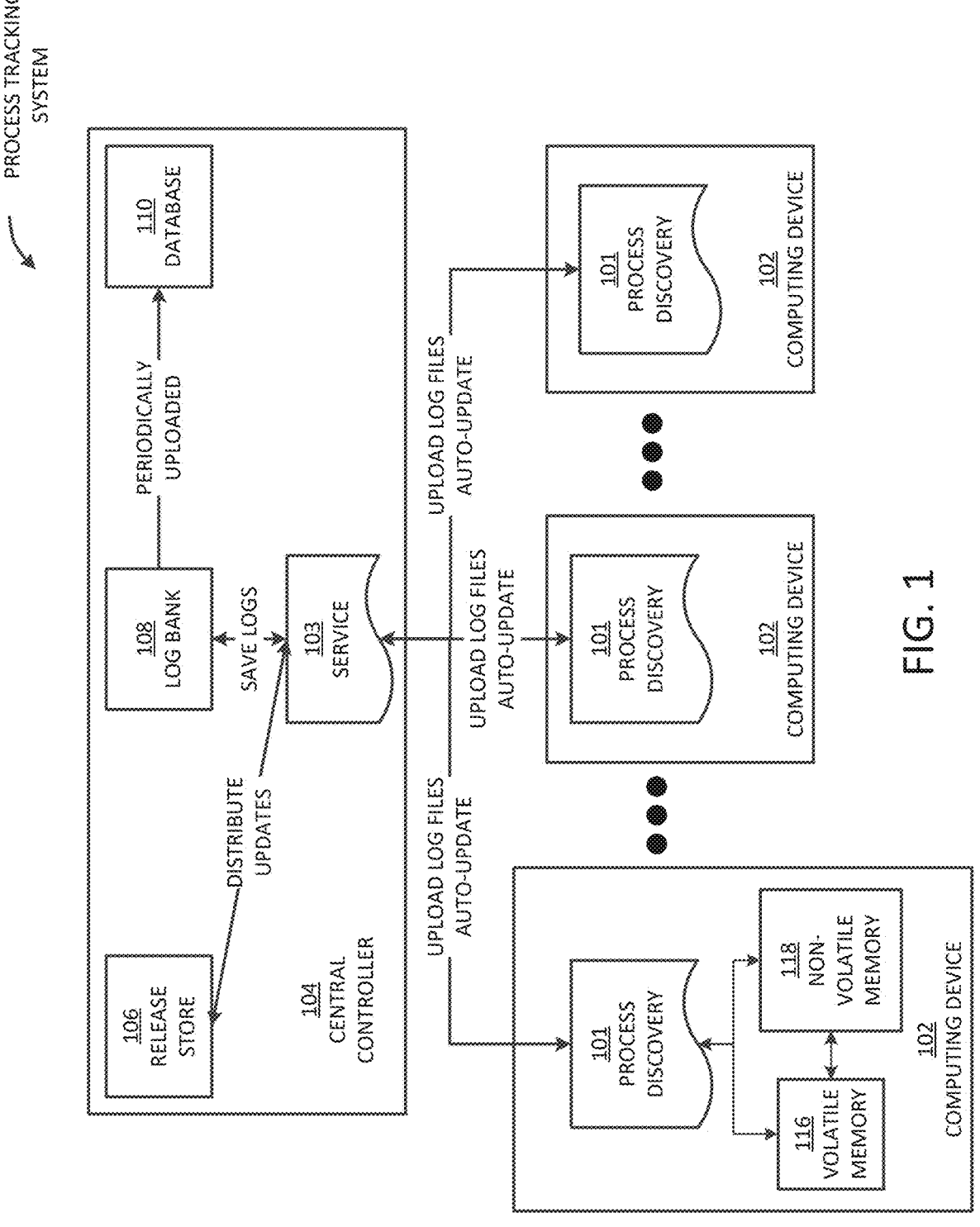
FIG. 1 is a block diagram including components of a process tracking system, according to some aspects of the technology described herein.

Aspects of the technology described herein relate to improvements in robotic process automation technology. Generally, robotic process automation involves two stages: (1) an information gathering stage that involves identifying processes being performed by one or more users; and (2) an automation stage that involves automating these processes through software programs, sometimes referred to as "software robots," which can perform the identified processes more efficiently thereby assisting the users and/or freeing them up to attend to other work.

In the automation stage, in some embodiments, the information collected during the information gathering stage may be employed to create software robot computer programs (hereinafter, "software robots") that are configured to programmatically control one or more other computer programs (e.g., one or more application programs and/or one or more operating systems) to perform one or more tasks at least in part via the graphical user interfaces (GUIs) and/or application programming interfaces (APIs) of the other computer program(s). For example, an automatable task may be identified from the data collected during the information gathering stage and a software developer may create a software robot to perform the automatable task. In another example, all or any portion of a software robot configured to perform the automatable task may be automatically generated by a computer system based on the collected computer usage information. Some aspects of software robots are described in U.S. Pat. No. 10,474,313, titled "SOFTWARE ROBOTS FOR PROGRAMMATICALLY CONTROLLING COMPUTER PROGRAMS TO PERFORM TASKS," granted on Nov. 12, 2019, filed on Mar. 3, 2016, which is incorporated herein by reference in its entirety.

The inventors have recognized that conventional techniques applied during the information gathering stage suffer from numerous drawbacks and can be improved upon. For example, some conventional techniques involve interviewing people to ask them how they perform certain computerized processes and the steps involved. However, the applicability of this approach is very limited. Such interviews often result in information that is incorrect and unusable for automation. With respect to correctness, organizations rarely know which people are the ones performing certain processes, how long each of them takes to perform the process and, most importantly, interviewing reveals only high-level information (e.g., some of the application programs that may be used in performing the process), but not the low-level information needed to automate the process such as, for example, information indicating what low-level acts (e.g., mouse clicks, keystrokes, button presses) are performed in each application that is used, the screens and interfaces within each application that are used, and the order in which all the various acts (low- and high-level) are performed.

Without such detailed information it is difficult, if not outright impossible, to generate a software robot to automate the process and have that software robot perform the desired process accurately. Additionally, interview-based approaches make it impossible to collect data for metrics (e.g., how long processes take to perform on average, how many users are involved, what is the value (e.g., savings and/or efficiency gained) of automating a particular process, etc.)

Other conventional methods have tried to address the above shortcomings of the interviewing approach through automated processing of log files generated by application programs that may be utilized by users when performing processes. However, such log-mining approaches have limited utility because they are supported for only a handful of application programs (e.g., SAP) that generate such logs, and because such logs still do not contain the right level of detail in the data from which processes may be reliably discovered and automated. For example, such logs may indicate which application programs are used, but not what the user did within each application program and in what order. These approaches monitor the overall system but do not collect user-level data and, as a result, do not have access to information such as, for example, how long it takes various users to perform the process, how many times the process performed across a large organization, click-level data, etc.

The inventors have appreciated that to address the above-described shortcomings of conventional approaches to identifying processes being performed by users, one approach can be to collect low-level data such as click and keystroke data from multiple users for a period of time and analyze the collected data to discover, in these data, instances of one or more processes being performed by the monitored users. The inventors recognized that conventional techniques do not involve collection of such data because such data is not only voluminous requiring substantial computational and storage resources to handle (e.g., such data can include gigabytes or terabytes of data per user per day and terabytes or petabytes of data across an enterprise per over days and weeks), but also difficult to analyze because it is noisy and disorganized. The inventors have developed techniques that allow for accurate, intuitive, and computationally efficient ways of processing low-level data (e.g., click and keystroke data across multiple applications) to identify/discover processes being performed by multiple users in an enterprise (e.g., a business having tens, hundreds, thousands or even tens of thousands of users). Some aspects of process discovery are described in U.S. Pat. No. 11,816,112, titled "SYSTEMS AND METHODS FOR AUTOMATED PROCESS DISCOVERY," granted on Nov. 14, 2023, filed on Apr. 2, 2021, and U.S. Pat. No. 12,020,046, titled "SYSTEMS AND METHODS FOR AUTOMATED PROCESS DISCOVERY," granted on Jun. 25, 2024, filed on Apr. 1, 2022, each of which is incorporated herein by reference in its entirety. These techniques constitute an improvement to robotic process automation technology.

There are various aspects of the techniques developed by the inventors that enable such voluminous low-level data to be analyzed efficiently and accurately. One aspect of the techniques developed by the inventors is the notion of "numerical representation(s)" of a process. Numerical representation(s) for a particular process can be used to rapidly process large volumes of low-level data gathered during user monitoring to identify instances of that particular process being performed by one or more users. The inventors have developed techniques that allow a process discovery software system to generate numerical representation(s) of a particular process. This is done through a teaching mechanism in which the process discovery software is placed into a "teaching mode" and one or more users perform one or more instances of the particular process while the process discovery software is capturing low-level data as the user interacts with his/her computing device using multiple different application programs, user interfaces of the application program(s), and the buttons, fields, and other user interface elements therein. In turn, the taught process instances may be used to generate the numeric representation(s) of the process, in accordance with the techniques described herein. The generated numeric representation(s) may be then used to discover, efficiently, other instances of the process from data collected by monitoring one or more other users (e.g., other users at an enterprise).

In some embodiments, the numeric representation(s) of a process may be compact and may contain a small amount of data relative to the data collected for a particular process instance. As a result, using the numeric representation(s) to identify process instances can be implemented efficiently, reducing the computational burden on the process discovery system. By contrast, recording a single process instance and attempting to correlate that process instance with volumes of data, would be computationally inefficient. In this sense, the techniques developed by the inventors provide an improvement to not only process discovery technology, but also to the functioning of a computer because they substantially reduce the amount of computational resources required to identify process instances while performing process discovery.

In turn, the discovered processes can be used in different ways. For example, one or more visualizations of the process discovery results may be displayed to a user. As another example, the discovered processes may be automatically evaluated for automating using software (e.g., creation of software robots for automating the entire or a portion of the discovered process). In some embodiments, an automatable task may be identified from the discovered processes and all or a portion of a software robot configured to perform the automatable task may be manually or automatically created. As such, the techniques developed by the inventors provide an improvement to not only process discovery technology but also robotic process automation technology that can utilize processes discovered by the process discovery technology.

The inventors have recognized that although the low-level data (e.g., data regarding interactions between the user and application programs) captured while performing a process can provide some level of detail about the process, reviewing the low-level data to understand the high-level steps performed to complete the process is a cumbersome task. For instance, manually reviewing a series of interactions (e.g., 200, 300, 400, 500, 600, 700, 800, 900, 1000 or more interactions) between a user and one or more software applications to understand how a process is performed is impractical and extremely difficult. This is because in addition to the sheer volume of the click and keystroke interaction data captured across multiple applications, this low-level interaction data is not captured in an easily-comprehensible user-friendly format. Moreover, manual review of these data would need to be performed by an experienced user possessing technical knowledge about the low-level machine code and hardware and the sheer volume of such data makes manual review impossible.

To address these drawbacks, the inventors have developed techniques for efficiently providing accurate textual summaries of user interaction data. The textual summaries can be presented (e.g., displayed) in a comprehensible user-friendly format. Machine learning is used to enable provision of textual summaries in part by processing the interaction data with one or multiple trained machine learning (ML) models.

In some embodiments, the ML model(s) may include large language model(s) that are prompted with natural language representations of the interaction data. The inventors have further recognized that providing a fine-tuned prompt for the LLM(s) increases the accuracy of the results generated by the LLMs. In addition, providing targeted prompts (with lesser number of tokens) rather than long prompts (with larger number of tokens) enables efficient use of memory and computer resources. To this end, the technology developed by the inventors enables generation of targeted and fine-tuned prompts corresponding to different concepts associated with the interaction data. Examples of the concepts associated with the interaction data may include, but not be limited to, a business object, an activity, an intent, and a reason associated with the interaction data.

Accordingly, some embodiments provide for techniques for generating a textual (e.g., natural language text) summary of a stream of events corresponding to interactions between a user performing a process and one or more application programs executing on a computing device. The textual summary may be generated in a bottom-up fashion whereby textual summaries may be generated (e.g., using one or more ML models, for example, one or more large language models (LLMs)) for individual interactions between the user and the application program(s), these interaction-level summaries may be used to generate higher-level textual summaries. For example, the interaction-level summaries may be processed (e.g., using one or more ML models, for example, LLM(s)) to generate step-level textual summaries for subsets interactions (e.g., each of which that may form a part or a step of the overall process) and the step-level textual summaries may be processed (e.g., using one or more ML models, for example, LLM(s)) to obtain a process-level textual summary. As another example, the interaction-level summaries may be processed (e.g., using one or more ML models, for example, LLM(s)) to generate the process-level textual summary.

In some embodiments, the techniques for generating a textual summary of a stream of events corresponding to interactions between a user performing a process and one or more application programs executing on a computing device may involve: (A) receiving information corresponding to the stream of events corresponding to the interactions between the user and the application program(s), the information comprising, for each of multiple events (e.g., some or all of) in the stream of events associated with the process, metadata associated with the event, wherein metadata for a particular event specifies values for attributes of the particular event; (B) processing, using at least one machine learning (ML) model (e.g., one or more LLMs), the metadata associated with the multiple events in the stream of events to generate multiple corresponding textual summaries of the multiple events, the processing comprising: for each particular event of the multiple events in the stream of events: (i) processing metadata associated with the particular event using the at least one ML model (e.g., a single LLM or multiple LLMs, or other types of ML models) to determine a business object, an activity, an intent, and/or a reason associated with the particular event; and (ii) generating a textual summary of the particular event from the determined business object, activity, intent, and/or reason associated with the particular event; and (C) generating, using the textual summaries of the multiple events, a textual summary of the process performed by the user through the interactions between the user and the one or more application programs executing on the computing device; and (D) outputting the textual summary of the process.

In some embodiments, when processing metadata for a particular event using the at least one ML model, the business object, the activity, the intent and the reason associated with the particular event may all be determined. However, in other embodiments, only one or some of these pieces of contextual information may be determined for the particular event (e.g., activity only, business object and activity only, etc.), as aspects of the technology described herein is not limited in this respect.

In some embodiments, the at least one ML model may be a single ML model. And this single ML model may be used to determine, for a particular event, the business object, the activity, the intent, and/or the reason associated with the particular event. For example, a single ML model (e.g., an LLM, for example, a zero-shot training LLM) may be used to process metadata for a particular event in order to determine all, some or one of the business object, the activity, the intent, and the reason associated with the particular event. That same single ML model may be used to process metadata for multiple events and determine all, some or one of the business object, the activity, the intent, and the reason associated with each of the multiple events.

Accordingly, in some embodiments, the at least one ML model consists of a single ML model; and processing the metadata associated with the particular event comprises processing the metadata associated with the particular event using the single ML model to determine the business object, the activity, the intent, and/or the reason associated with the particular event.

In other embodiments, however, multiple different ML models may be used. For example, one ML model may be used to determine the business object for a particular event while another ML model may be used to determine the activity for the particular event. As yet another example, four separate ML models may be used to determine the business object, the activity, the intent and the reason associated with the particular event. Multiple different ML models may be used to process metadata for each of multiple events in the same way.

Accordingly, in some embodiments, the at least one ML model comprises a first ML model and a second ML model different from the first ML model; and processing the metadata associated with the particular event comprises: processing the metadata associated with the particular event using the first ML model to determine the business object associated with the particular event; and processing the metadata associated with the particular event using the second ML model to determine the activity associated with the particular event.

In some embodiments, the at least one ML model comprises a third ML model different from the first and second ML models and a fourth ML model different from the first, second, and third ML model; and processing the metadata associated with the particular event comprises: processing the metadata associated with the particular event using the third ML model to determine the intent associated with the particular event; and processing the metadata associated with the particular event using the fourth ML model to determine the reason associated with the particular event.

In some embodiments, the at least one ML model comprises a large language model (LLM). For example, the LLM may be one of: Llama3, Llama 2, Mistral, GPT-3, GPT-4, Bidirectional encoder representations from trans-formers (BERT), Orca, or any other suitable large language model, as aspects of the technology described herein are not limited in this respect.

In some embodiments, the at least one ML model comprises a large language model; and processing metadata associated with the particular event using the at least one ML model comprises prompting the large language model with a natural language representation of the metadata associated with the particular event. Examples of such prompts are provided herein.

As described herein, the metadata processed by the at least one ML model includes values of attributes associated with a particular event. Examples of such attributes are provided herein. For example, in some embodiments, the stream of events comprises a first event corresponding to an interaction between the user and the one or more application programs executing on the computing device, and the information corresponding to the stream of events comprises first metadata associated with the first event, and the first metadata comprises values for one or more attributes selected from the group consisting of: a name of the application program, a title of an application program screen of the application program with which the user interacted during the first event, an identifier of the user interface element of the application program screen with which the user interacted, a type of the user interface element of the application program screen with which the user interacted, one or more identifiers for one or more user interface elements of the application program screen with which the user did not interact, a duration of the interaction, and one or more textual phrases and/or sentences appearing on the application program screen.

In some embodiments, the textual summary of the particular event comprises a natural language summary of the particular event and the textual summary of the process comprises a natural language summary of the process.

As described herein, the textual summary of the process may be generated from textual summaries of one or more events. For example, in some embodiments, generating the textual summary of the process comprises: (a) grouping two or more events in the multiple events into a step (e.g., by using a large language model); (b) generating a textual summary of the step using the textual summaries of the two or more events; and (c) generating the textual summary of the process using the textual summary of the step.

Following below are more detailed descriptions of various concepts related to, and embodiments of machine learning techniques for generating textual summaries of streams of events corresponding to interactions between users and application programs performed as part of one or more processes. Various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 shows an example process event tracking system 100, according to some embodiments. The process tracking system 100 is configured to track one or more processes being performed by users working on a plurality of computing devices 102. Each of the computing devices 102 may comprise a volatile memory 116 and a non-volatile memory 118. At least some of the computing devices may be configured to execute process discovery module 101 (also referred to herein as "Scout™") that tracks user interaction with the respective computing device 102. Process discovery module 101 may be, for example, implemented as a software application and installed on an operating system, such as the WINDOWS® operating system, running on the computing device 102. In another example, process discovery module 101 may be integrated into the operating system running on the computing device 102.

As shown in FIG. 1, process tracking system 100 further includes a central controller 104 that may be a computing device, such as a server, including a release store 106, a log bank 108, and a database 110. The central controller 104 may be configured to execute a service 103 that gathers the computer usage information collected from the process discovery modules 101 executing on the computing devices 102 and store the collected information in the database 110. Service 103 may be implemented in any of a variety of ways including, for example, as a web-application. In some embodiments, service 103 may be a Python Web Server Gateway Interface (WSGI) application that is exposed as a web resource to the process discovery modules 101 running on the computing devices 102.

In some embodiments, process discovery module 101 may monitor the particular tasks being performed on the computing device 102 on which it is running. For example, process discovery module 101 may monitor the task being performed by monitoring keystrokes and/or clicks and gathering contextual information associated with each keystroke and/or click. The contextual information may include information indicative of the state of the user interface when the keystroke and/or click occurred. For example, the contextual information may include information regarding a state of the user interface such as the name of the particular application that the user interacted with, the particular button or field that the user interacted with, and/or the uniform resource locator (URL) link in an active web-browser. The contextual information may be leveraged to gain insight regarding the particular task that the user is performing.

For example, a software developer may be using the computing device 102 to develop source code and may be continuously switching between an application suitable for developing source code and a web-browser to locate code snippets. Unlike traditional keystroke loggers that would merely gather a string of depressed keys including bits of source code and web URLs, process discovery module 101 may advantageously gather useful contextual information such as the particular active application associated with each keystroke. Thereby, the task of developing source code may be more readily identified in the collected data by analyzing the active applications.

The data collection processes performed by process discovery module 101 may be seamless to a user of the computing device 102. For example, process discovery module 101 may gather the computer usage data without introducing a perceivable lag to the user between when one or more actions of a process are performed and when the user interface is updated. Further, process discovery module 101 may automatically store the collected computer usage data in the volatile memory 116 and periodically (or aperiodically or according to a pre-defined schedule) transfer portions of the collected computer usage data from the volatile memory 116 to the non-volatile memory 118. Thereby, process discovery module 101 may automatically upload captured information in the form of log files from the non-volatile memory 118 to service 103 and/or receive updates from service 103. Accordingly, process discovery module 101 may be completely unobtrusive on the user experience.

In some embodiments, the process discovery module 101 running on each computing device 102 may upload log files to service 103 that include computer usage information such as information indicative of one or more actions performed by a user on the respective computing device 102 and contextual information associated those actions. Service 103 may, in turn, receive these log files and store the log files in the log bank 108. Service 103 may also periodically upload the logs in the log bank 108 to a database 110. It should be appreciated that the database 110 may be any type of database including, for example, a relational database such as PostgreSQL. Further, the events stored in the database 110 and/or the log bank 108 may be stored redundantly to reduce the likelihood of data loss from, for example, equipment failures. The redundancy may be added by, for example, by duplicating the log bank 108 and/or the database 110.

In some embodiments, service 103 may distribute updates (e.g., software updates) to the process discovery modules 101 running on each of the computing devices 102. For example, process discovery module 101 may request information regarding the latest updates that are available. In this example, service 103 may respond to the request by reading information from the release store 106 to identify the latest software updates and provide information indicative of the latest update to the process discovery module 101 that issued the request. If the process discovery module 101 returns with a request to download the latest version, the service 103 may retrieve the latest update from the release store 106 and provide the latest update to the process discovery module 101 that issued the request.

In some embodiments, service 103 may implement various security features to ensure that the data that passes between service 103 and one or more process discovery modules 101 is secure. For example, a Public Key Infrastructure may be employed by which process discovery module 101 authenticates itself using a client certificate to access any part of the service 103. Further, the transactions between process discovery module 101 and service 103 may be performed over HTTPS and thus encrypted.

In some embodiments, service 103 makes the collected computer usage information in the database 110 and/or information based on the collected computer usage information (e.g., numeric representation(s) of a process as described in more detail below) available to users. For example, service 103 (or some other component in communication with service 103) may be configured to provide a visual representation of at least some of the information stored in the database 110 and/or information based on the stored information to one or more users (e.g., of computing devices 102). For example, a series of user interface screens that permit a user to interact with the computer usage data in the database 110 and/or information based on the stored computer usage data may be provided as the visual representation. These user interface screens may be accessible over the Internet using, for example, HTTPS. It should be appreciated that service 103 may provide access to the data in the database 110 through still yet other ways. For example, service 103 may accept queries through a command-line interface (CLI), such as psql, or a graphical user interface (GUI), such as pgAdmin.

Some embodiments relate to using user interaction information collected via one or more process discovery modules 101 to generate numeric representation(s) of a process that can then be used to identify instances of the process from captured data corresponding to further user interaction information collected via the one or more of the process discovery modules.

Various components in process tracker system 100 may be used to perform generation of numeric representation(s) in teaching mode and/or process discovery. In some embodiments, process discovery may be performed locally on individual computing devices 102 by process discovery modules 101, which may be updated with the most recent numeric representation(s) stored centrally by service 103 periodically, aperiodically or in response to a request from the computing device to provide an update. In some embodiments, process discovery may be performed centrally, with data collected by process discovery modules 101 executing on computing devices 102 being forwarded to service 103, and with service 103 performing process discovery on the received data (from computing devices 102) using the numeric representation(s). In some embodiments, process discovery results may be analyzed using one or more software tools as described herein, and the software tools may execute locally on one or more computing device(s) 102, centrally as part of service 103, and/or in any suitable combination of local and centralized processing.

Regardless of whether process discovery is performed locally, centrally, or in a combination of local and central processing, in some embodiments, process discovery results may be analyzed by any user.

It should be appreciated that the above-described architecture in which some functions are performed locally on computing devices 102 and other functions are performed centrally (e.g., on a server) is only one such embodiment, and various other architectures in which all functions (e.g., generation of numeric representation(s), process discovery, visualization, teaching, analysis of process discovery results) are performed locally, all functions are performed remotely, or a mixture of local and remote resources are used to perform the functions described herein are also contemplated as being part of the technology described herein.

In some embodiments, the discovered processes may be automatically evaluated for automating using software (e.g., creation of software robots for automating the entire or a portion of the discovered process). In some embodiments, an automatable task may be identified from the discovered processes and all or a portion of a software robot configured to perform the automatable task may be automatically created by the process tracking system 100.

In some embodiments, the process tracking system 100 may identify an automatable task based on an automation score generated by analyzing the metadata associated with events in the discovered processes. For example, the metadata may be analyzed to determine values for one or more parameters that impact automatability of a given task. Example parameters include but are not limited to, a number of applications employed to perform a task, a number of keystrokes performed in the task, a ratio between keystrokes and clicks performed in the task, and/or other parameters. In some embodiments, the process tracking system 100 may generate the automation score by combining (e.g., linearly combining) the values of these parameters. A determination may be made regarding whether the automation score exceeds a threshold. For example, a task with an automation score that exceeds the threshold may be a good candidate for automation. In response to a determination that the automation score exceeds a threshold, a software robot may be generated to perform the automatable task. Aspects of generating an automation score are described in U.S. Pat. No. 10,831,450, titled "SYSTEMS AND METHODS FOR DIS- COVERING AUTOMATABLE TASKS," granted on Nov. 10, 2020, which is incorporated by reference herein in its entirety.

In some embodiments, a software robot that is configured to perform the automatable task may be generated. The software robot may be configured to control the same set of one or more computer programs employed in the task. The software robot may be generated in any of a variety of ways. In some embodiments, the software robot may be generated using, for example, a sequence of one or more events defining the automatable task. For example, the process tracking system 100 may comprise one or more predetermined software routines for replicating one or more events and the process tracking system 100 may combine these software routines in accordance with the defined sequence of events associated with the task to form a software robot that is configured to perform the task.

FIG. 2 illustrates a flowchart of a method 200 of acts for generating numerical representation(s) for a process and using the numerical representation(s) during process discovery in accordance with some embodiments. At least some of the acts of method 200 may be performed by any suitable computing device(s) and, for example, may be performed by one or more of the computing devices 102 shown in process tracking system 100 of FIG. 1.

In act 220, one or more users "teach" the process by performing a plurality of actions that collectively form the process while interactions between the user and their computing device are captured (e.g., by using a process discovery module 101 executing on the computing device). Each performance of the process by a user may be called an "instance" of the process, and the data captured during the user's performance of the instance may be stored in association with the instance (e.g., in association with an identifier corresponding to the instance of the process). Specifically, with respect to teaching, an instance performed during teaching may be called a "teaching instance" performed by a user, and a collection of instances taught by one or more users for a particular process may be called the "taught instances" for that process. The information captured during a user's performance of a teaching instance may be called a "stream of events," a "plurality of events" or simply "events." The events in a stream of events may correspond to individual keystrokes, clicks, etc. captured by the process discovery module during performance of the teaching instance.

A "process" as that term is used herein, refers to a plurality of steps or user actions that are collectively performed to achieve a task. The task may be any suitable task that could be performed by a user (or multiple users) by interacting with one or more computing devices. The task, in some embodiments, may be any suitable task that one or more users perform in a business such as, for example, one or more accounting, finance, IT, human resources, purchasing and/or any other types of tasks. For example, a process may refer to a plurality of user actions that a user takes to perform the task of receiving a purchase order, reviewing the purchase order, and approving the purchase order. As another example, a process may refer to a plurality of user actions that a user takes to perform the task of opening an IT ticket for an issue (e.g., resetting a user's password), addressing the issue, and closing same (e.g., by resetting the password and notifying the user whose password was reset that this is completed). Some processes may include only a few (e.g., 2 or 3) user actions, whereas other processes may include more (e.g., tens, hundreds, or thousands) user actions. As described herein, a process is a unit of discovery that is searched for during "process discovery" to identify instances of the process in data other than training data, often referred to herein as "wild data" or "data in the wild." In some embodiments, the "wild data" may be data captured during interaction between users and their computing devices. The data captured may include keystrokes, mouse clicks, and associated metadata described herein including with reference to FIGS. 3, 4A, and 4B. In turn, the captured data may be analyzed using the techniques described herein to identify instances of one or more processes being performed by the users. Examples of the types of data that may be captured are provided herein and in U.S. Pat. No. 10,831,450, titled "SYSTEMS AND METHODS FOR DISCOVERING AUTOMATABLE TASKS," granted on Nov. 10, 2020, which is incorporated by reference herein in its entirety.

Method 200 then proceeds to act 230, where one or more numeric representations of the process may be generated based on the taught instances of the process. In some embodiments, the one or more numeric representations of the process may be generated using at least one trained machine learning model.

Method 200 then proceeds to act 240, where the generated numeric representation(s) is used to discover the process (referred to herein as "process discovery" or simply "discovery") in wild data (i.e., data on which the process was not taught). Each identification of the process during process discovery may be called a "discovered instance" or "observed instance" of the process. Similar to data captured during performance of a teaching instance, the wild data may also correspond to a stream of events performed by a user, and process discovery may operate by discovering the process in the stream of events.

Following process discovery, method 200 proceeds to act 250, where the process discovery results are provided to the user. In some embodiments, one or more visualizations of the process discovery results may be displayed to a user to provide the user insight into whether process discovery for a particular process is operating in a manner that is consistent with the user's expectations.

Aspects of generating numeric representations of processes are described herein as well as in PCT Application PCT/IN2024/050370, titled "MACHINE LEARNING SYSTEMS AND METHODS FOR AUTOMATED PROCESS DISCOVERY," filed on Apr. 10, 2024, which is incorporated by reference herein in its entirety.

It should be appreciated that one or more of the acts of method 200 may be optional. For example, only acts 220 and 230 may be used, with the result being generation of numeric representation(s) of a process, and discovery may not be performed until the generated numeric representation(s) is approved for use. As another example, acts 220, 230, and 240 (or any subset of these acts) may be used, but results of process discovery may not be presented to a user or the process discovery results may be presented to a user at a later time. The data about discovered processes may be collected and stored for subsequent analysis and/or visualization.

As described in more detail below, in some embodiments, a user teaches an instance of the process by performing the process while a stream of events is collected as the process is performed. If the process is short enough, the user may teach an instance of the process by performing the process as they normally would by starting from the beginning of the process (possibly with manually starting capture of the stream of events-referred to herein as causing the computing device to enter a "training mode"), performing one or more actions included in the process, and concluding with a successful submission of a taught instance. Once the submission is complete, recording of the stream of events may be stopped (either manually by the user or automatically by the computing device of the user). For some longer processes that may be conducted across multiple sittings (e.g., a 3-hour process), the teaching instance of the process may be performed in parts and each part may be associated with an identifier (e.g., a transaction ID). For example, a user may teach a first part of an instance of a process at a first time, and the first part may be labeled with a process identifier and a particular transaction ID (e.g., "PO-12345"). The teaching instance may then be paused and resumed at a later time (e.g., at a second time), and the second part of the instance of the process may be associated with the same process identifier and transaction ID (e.g., "PO-12345"). A similar strategy may be used for processes that are conducted across multiple users and/or teams, where each user teaches a part of the process and each part is labeled with the same process identifier and transaction ID. In some embodiments, using the same transaction ID across multiple parts of the process may not be needed, for example, if the system is taught the various parts of the process a sufficient number of times to generate reliable numeric representation(s) of the process.

In some embodiments, the computer may be configured to enter a "teaching mode," for a process which initiates collection of events during performance of a process. To generate training data a user may be instructed to teach a plurality of instances of a process (referred to herein as "teaching instances"). The computer may be configured to start the teaching mode to begin capturing events and associated metadata for the process.

FIG. 3 illustrates a flowchart of a method 300 for capturing a stream of events when a computer is configured to implement a teaching mode and generating numerical representation(s) of a process in accordance with some embodiments. At least some of the acts of method 300 may be performed by any suitable computing device(s) and, for example, may be performed by one or more of the computing devices 102 shown in process tracking system 100 of FIG. 1.

In act 320, the computing device is configured to start a teaching mode. In some embodiments, the computing device is configured to start the teaching mode in response to an indication to start the teaching mode. For example, a user may interact with a user interface presented by an application executing on the computer to provide an indication to start the teaching mode.

Method 300 then proceeds to act 330, where a stream of events for one or more processes is captured while the computer is configured to be in the teaching mode. The stream of events corresponds to interactions between a user and one or more application programs executing on a computing device. The events collected while the user interacts with the computer during performance of a process may be considered a stream of events sorted with respect to the time at which the events occurred during performance of the process.

Information corresponding to the stream of events may be collected in any suitable way. In some embodiments the information may be collected as a user interacts with a computer. For instance, an application (e.g., process discovery module 101 shown in FIG. 1) may be installed on the user's computer that collects data as the user interacts with the computer to perform a process. In some embodiments, each user interaction such as a mouse click, keyboard key press, or voice command that a user performs may be considered as an "event." For each event, metadata associated with the event may be collected. Aspects of the collecting information as the user interacts with a computer are described herein and in U.S. Pat. No. 10,831,450, titled "SYSTEMS AND METHODS FOR DISCOVERING AUTOMATABLE TASKS," granted on Nov. 10, 2020, which is incorporated by reference herein in its entirety. Examples of metadata that may be collected for each event include, but are not limited to:

Application (e.g., the name of an application program, such as an operating system (e.g., Microsoft Windows, Mac OS, Linux) application, a web application, or a mobile application)

Screen Title (e.g., the title appearing on an application program screen such as the name of the tab in a web browser, the name of a file open in an application, etc.)

Element Identifier(s) (e.g., identifier(s) of user interface element(s) of the application program screen with which the user interacted and/or identifier(s) for user interface element(s) of the application program screen with which the user did not interact)

Element Type (e.g., the type of a user interface element of the application program screen with which the user interacted, such as "button", "input", "dropdown" etc.)

Element Name (e.g., the name of a user interface element of the application program screen with which the user interacted such as a name of a button, label of input, etc.)

Duration of the interaction

One or more textual phrases and/or sentences appearing on the application program screen (e.g., subject and body of emails in an email application (e.g., Outlook); content of a spreadsheet or document, such as, a list of special words that are colored, italicized, bolded or highlighted, in the spreadsheet or document application (e.g., Excel, Word, Adobe reader); text displayed on the screen of a mainframe application, etc.)

In some embodiments, metadata associated with an event may additionally include an event identifier. The event identifier may be in any suitable format, such as, numeric, alphanumeric, or other format. For example, an event identifier may be combination of digits, alphabets, and special characters, such as, underscore.

Figure 4A:
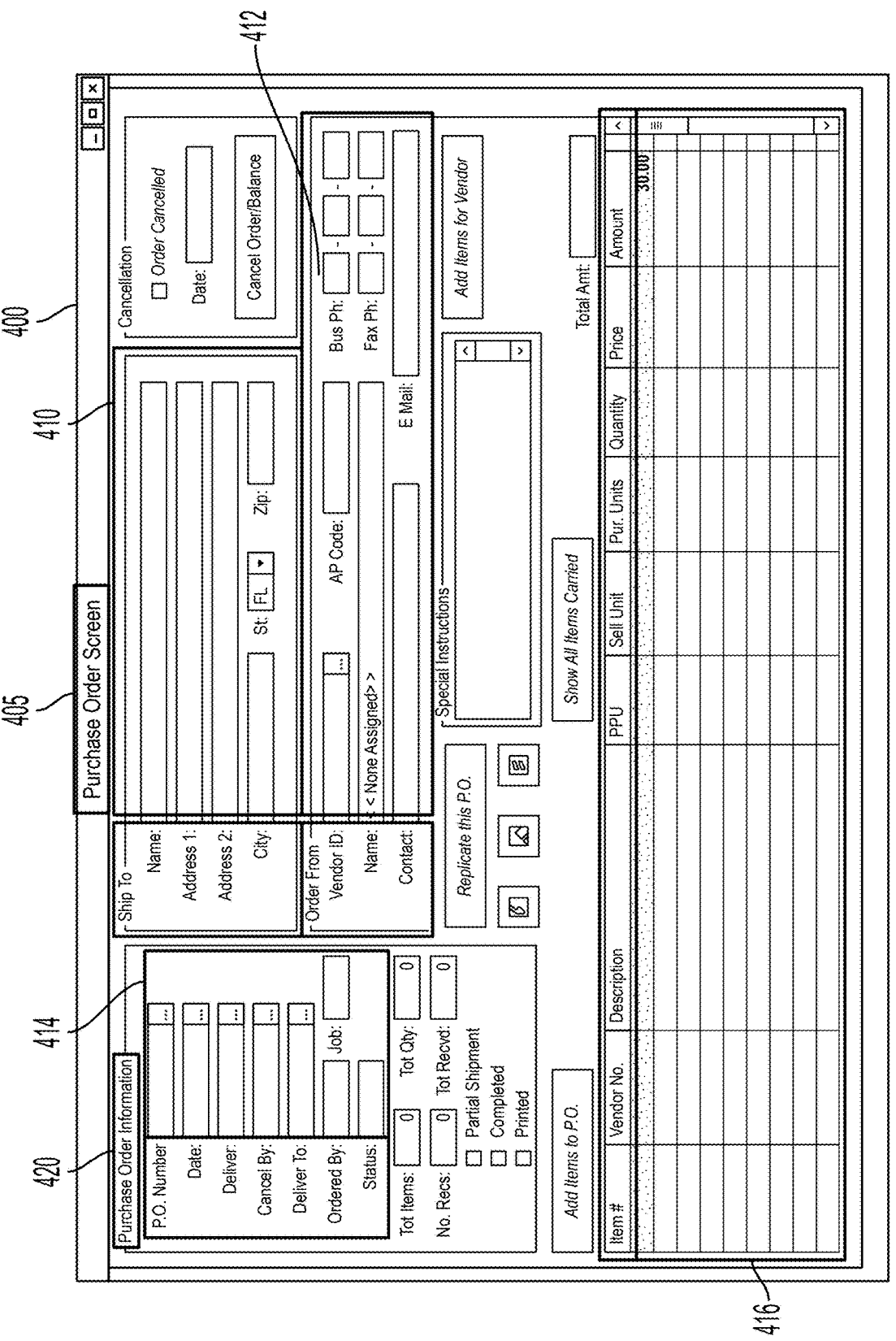
FIG. 4A illustrates an annotated screenshot indicating examples of metadata associated with events corresponding to user interactions with a purchase order screen, in accordance with some aspects of the technology described herein.

FIG. 4A illustrates an annotated screenshot indicating examples of metadata associated with events corresponding to user interactions with a purchase order screen 400, in accordance with some aspects of the technology described herein. As shown in FIG. 4A, the metadata includes the title of the screen 405 (e.g., Purchase Order Screen), element identifiers, types (e.g., dropdowns, input, etc.) and names (e.g., P.O. Number, Date, Name, Address, etc.) associated with user interface elements 410, 412, 414, and 416 with which the user interacted, and/or element identifier for user interface element 420 with which the user did not interact.

FIG. 4B illustrates an annotated screenshot indicating examples of metadata associated with events corresponding to user interactions with a document 450, in accordance with some aspects of the technology described herein. As shown in FIG. 4B, the metadata includes textual phrases, sentences, highlighted sections, etc. in the document with which the user interacted.

In some embodiments, the metadata for each particular event specifies values for attributes of the particular event. For example, entering an address in an address field shown in FIG. 4A may cause the following information (attribute value pairs) to be captured as metadata. It will be appreciated that the following list is not exhaustive and other information may be captured without departing from the scope of this disclosure.

Application—Purchase Order
    Screen Title—Purchase Order Screen
    Element Type—Input field
    Element Name—Address 1

As another example, interacting with the document shown in FIG. 4B (e.g., clicking a save button) may cause the following information to be captured as metadata. It will be appreciated that the following list is not exhaustive and other information may be captured without departing from the scope of this disclosure.

Application—Word
    Document Title—Service Contract
    Element Type—Button
    Element Name—Save
    Text—Parties heading and associated text; Term heading and associated text; Payment Amount heading and associated text.

In some embodiments, at least some of the metadata associated with the stream of events may be processed using a first trained ML model. This portion of metadata may include attribute values that do not include natural language text and/or complex values such as textual phrases, sentences, paragraphs, etc. For instance, the first portion of metadata may include attribute values described above in relation to FIG. 4A. In some embodiments, the first trained ML model may include an encoder including a trained neural network having a transformer-based architecture, though it should be appreciated that one or more other types of neural network architectures may be used in other embodiments. For example, the first trained ML model may include an encoder including a trained neural network having a BERT model architecture or a ROBERTa model architecture.

In some embodiments, at least some other of the metadata associated with the stream of events may be processed using a second trained ML model. This portion of metadata may include attribute values that include natural language text and/or complex values such as textual phrases, sentences, paragraphs, etc. For instance, the second portion of metadata may include some of the attribute values (e.g., text) described above in relation to FIG. 4B. In some embodiments, the second trained ML model may include an encoder including a trained neural network having a transformer-based architecture, though it should be appreciated that one or more other types of neural network architectures may be used in other embodiments. For example, the second trained ML model may include an encoder having a trained neural network having a Sentence-BERT architecture.

Referring back to FIG. 3, in act 340, one or more numeric representations of the process corresponding to the stream of events may be generated using at least one trained machine learning model. In some embodiments, the one or more numeric representations of the process may include a single numeric representation of the process corresponding to the stream of events. The single numeric representation of the process may be generated by processing at least some of the metadata associated with the stream of events using the first trained ML model and at least some other of the metadata associated with the stream of events using the second trained ML model.

In some embodiments, the one or more numeric representations of the process may include multiple (e.g., two or more) numeric representations of the process, where each of the multiple numeric representations corresponds to one or multiple events in the stream of events. At least some metadata associated with the one or multiple events may be processed using the first trained ML model and at least some other metadata associated with the one or multiple events may be processed using the second trained ML model.

In some embodiments, each of the multiple numeric representations corresponds to a window of events including the one or more multiple events in the stream of events. Any suitable windowing technique may be used to organize events in the stream of events into a plurality of windows, where each window includes the one or multiple events. In some embodiments, one or more windowing parameters such as, time, number of events, or number or sequence of actions may be used to split the stream of events into smaller subsets or windows of events. For example, each set of events in the stream that is associated with a number of consecutive user actions (e.g., 2, 3, 4, 5, or other suitable number of consecutive actions) performed by the user may be organized into a window. As another example, each set of events in the stream that is associated with a particular timeframe (e.g., 10 seconds, 20 seconds, 30 seconds, 40 seconds, 50 seconds, 1 minute, 2 minutes, or other suitable timeframe) may be organized into a window. As yet another example, each set number of events (e.g., 5, 10, 15, 20, 25, 30, or any other suitable number) in the stream may be organized into a window.

The method proceeds to act 350, where the one or more numeric representations of the process may be stored. For example, the one or more numeric representations generated for each taught process may be stored in database 110. In some embodiments, the one or more numeric representations are stored in a database with vector indexing capabilities such that a vector search can be performed to find representations that are most similar to known representations.

As described herein, some embodiments relate to generating numeric representation(s) of a process based on teaching conducted by one or more users. The generated numeric representation(s) of processes are then used to discover the process and one or more process variations in wild data on which teaching has not been conducted.

Although in some embodiments collecting information for a stream of events during performance of a process may be performed by a specialized application (e.g., process discovery module 101 shown in FIG. 1) for capturing events executing on a computer as the user performs the process, in other embodiments, the information for a stream of events may be collected by one or more other applications (e.g., the native applications with which the user is interacting to perform the process). For example, the one or more other applications may log events (e.g., in a log file) that occur during user interactions with the application(s) and receiving the information for the stream of events may be accomplished by receiving one or more of such log files that includes the events and their associated metadata.

The inventors have recognized that any particular process may be performed in different ways both by the same user and across different users, resulting in multiple variations of the process. To ensure that inter- and intra-user variations of performing processes is taken into account, each of multiple users may be asked to provide training data for multiple instances of a process (i.e., multiple teaching instances performed by each of multiple users). Any suitable number of taught instances of a process (e.g., three taught instances of a process performed by three different users) may be used, and embodiments are not limited in this respect. Also, multiple processes may be taught by multiple users belonging to an organization or team within the organization resulting in multiple numeric representations of processes to be stored in the system. For example, in practice, the system may store may (e.g., 1-10, 5-20, 10-30, 50-100, etc.) numeric representations for a process or across various processes.

Teaching a process in accordance with some embodiments is typically performed on the computing device of the user that is teaching the process, which may be where the applications needed to perform one or more actions associated with performance of the process reside. The applications may be implemented as thick clients on the desktop of the user's computing device, may be implemented as web applications that the user is accessing through a browser, or a combination of thick and thin (e.g., web-based) applications. In some instances, the applications needed to perform one or more actions associated with performance of a process may be virtualized to be interactable from the user's computing device using virtualization techniques known in the art.

As the user is teaching an instance of the process by interacting with different business applications, events and their metadata are collected as described above in connection with FIGS. 2-3. The events and associated metadata may be stored locally on the computing device of the user or sent to a server over one or more networks (e.g., using the system architecture described in connection with FIG. 1). However, it should be appreciated that the events need not be collected by a remote service in all embodiments and can be used directly on the computing device of the user for discovering processes in wild data.

As described herein, process discovery refers to techniques for discovering a process after that process has been taught during training and generation of numerical representation(s) of the taught process. The stored numeric representation(s) for a process are used to identify the process in wild data. Some aspects of process discovery are described in U.S. Pat. No. 11,816,112, titled "SYSTEMS AND METHODS FOR AUTOMATED PROCESS DISCOVERY," granted on Nov. 14, 2023, filed on Apr. 2, 2021; U.S. Pat. No. 12,020,046, titled "SYSTEMS AND METHODS FOR AUTOMATED PROCESS DISCOVERY," granted on Jun. 25, 2024, filed on Apr. 1, 2022; and PCT Application PCT/IN2024/050370, titled "MACHINE LEARNING SYSTEMS AND METHODS FOR AUTOMATED PROCESS DISCOVERY," filed on Apr. 10, 2024, each of which is incorporated by reference herein in its entirety.

As described herein, the inventors have developed techniques for generating a textual summary of a stream of events corresponding to interactions between a user performing a process and one or more application programs executing on a computing device. That textual summary may be obtained, in part, by obtaining metadata associated with events in the stream of events and processing that metadata (e.g., using one or multiple machine learning models, such as one or more LLMs) to obtain a textual summary of the event.

In one example, metadata associated with an event may include the following information organized as attribute-value pairs:

Metadata Associated with Event 1
    Timestamp: Nov. 16, 2023 1:45 pm
    User: c6f93c98-8909-4102-9444-a2c48827973c
    Application: internalapp.com
    Screen Title: Claim
    Action: Keystroke Field Name: Destination
    Field Value: PA
    Field Type: Input In some embodiments, this metadata may be processed using at least one machine learning (ML) model to generate a textual summary of the event. The textual summary may consist of multiple portions each describing an aspect of the interaction. One portion may describe a business object with respect to which the interaction is performed. Another portion may describe an activity being performed by the user through the interaction. Yet another portion may describe an intent of the specific activity being performed by the user-identifying what is the user trying to achieve through the interaction. Yet another portion may be used to describe the reason for why the interaction is being performed-identifying the reason of achieving the intent of this particular interaction relative to other interactions being performed by the user. For example, a textual summary of an event may have the following format:

{Perform an activity} {on a business object [in a screen\view]} [{using information from another source}] [{to achieve purpose, i.e., intent}]

In this example format, the description in the first bracketed portion is a description of the activity, the description in the second bracketed portion is a description of the business object, the description in the third bracketed portion is a description of an optional source of information, and the description in the fourth bracketed portion is a description of the intent.

In the above example of "Event 1", the generated textual summary may be:

{The user was updating a claim on a purchase order by editing the destination of the claim}, {as part of work related to ordering and purchasing goods or services}. [{The user used an app (internalapp.com)}] [{to manage and track business operations in shipping and logistics}]."

Such textual summaries of multiple events in the stream of events associated with the process performed by the user may be used to generate a textual summary of the process. As can be seen, the textual summary may include values for one or more entities such as "business object", "activity", "intent", and "reason". However, it should be appreciated that a textual summary may include values of one or more other entities in addition to or instead of these four entities, as aspects of the technology described herein are not limited in this respect. Other examples of entities are provided herein. Techniques for obtaining values for such entities (which in turn will facilitate generating textual summaries) are described below including with reference to FIG. 5.

FIG. 5 is a flowchart of an illustrative method 500 for generating textual summaries of a stream of events corresponding to interactions between a user performing a process and one or more application programs executing on a computing device, in accordance with some embodiments of the technology described herein. At least some of the acts of method 500 may be performed by any suitable computing device or devices, and, for example, may be performed by one or more of the computing devices 102 and/or central controller 104 shown in process tracking system 100 of FIG. 1.

In act 510, information corresponding to a stream of events may be received. The information corresponding to a stream of events may correspond to interactions between a user and one or more application programs executing on computing device 102. The information may include, for each of multiple events in the stream of events associated with a process, metadata associated with the event, where the metadata for a particular event specifies values for attributes of the particular event. Examples of metadata are described herein including with reference to FIGS. 3, 4A and 4B. In some embodiments, the information may be collected from a single user or a user part of a team of users whose computer interactions are being captured and analyzed to generate textual summaries of the processes being performed by the user and/or team of users.

Figure 6A:
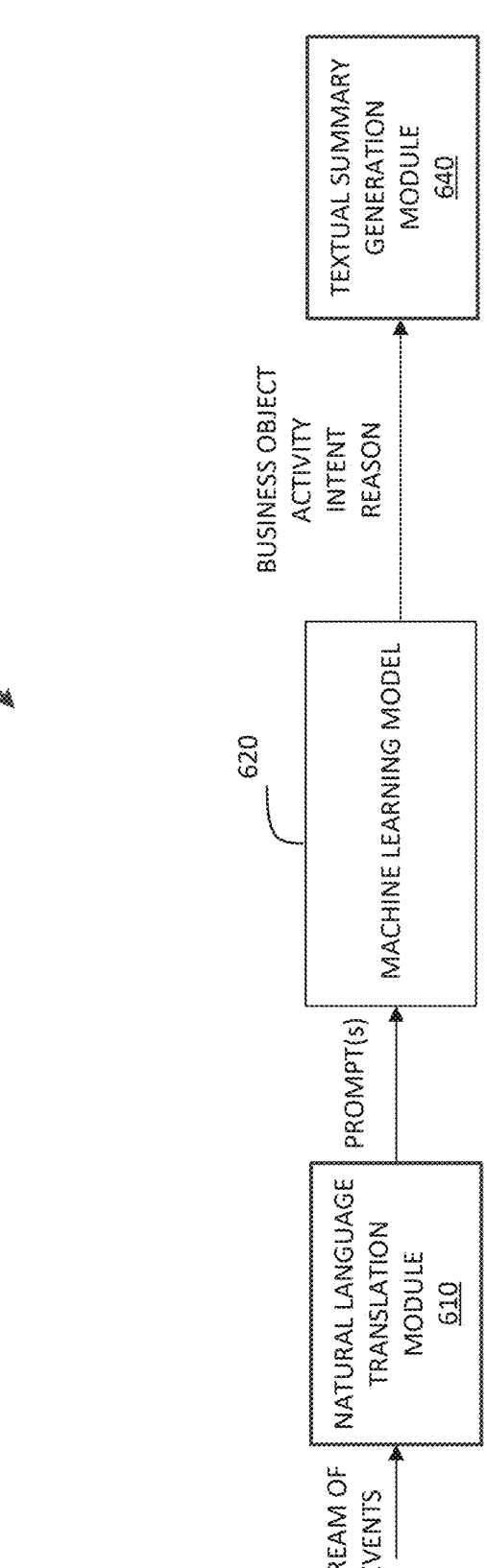
FIGS. 6A-6D are block diagrams showing various embodiments for using machine learning models to generate textual summaries of events, in accordance with some aspects of the technology described herein.
Figure 6B:
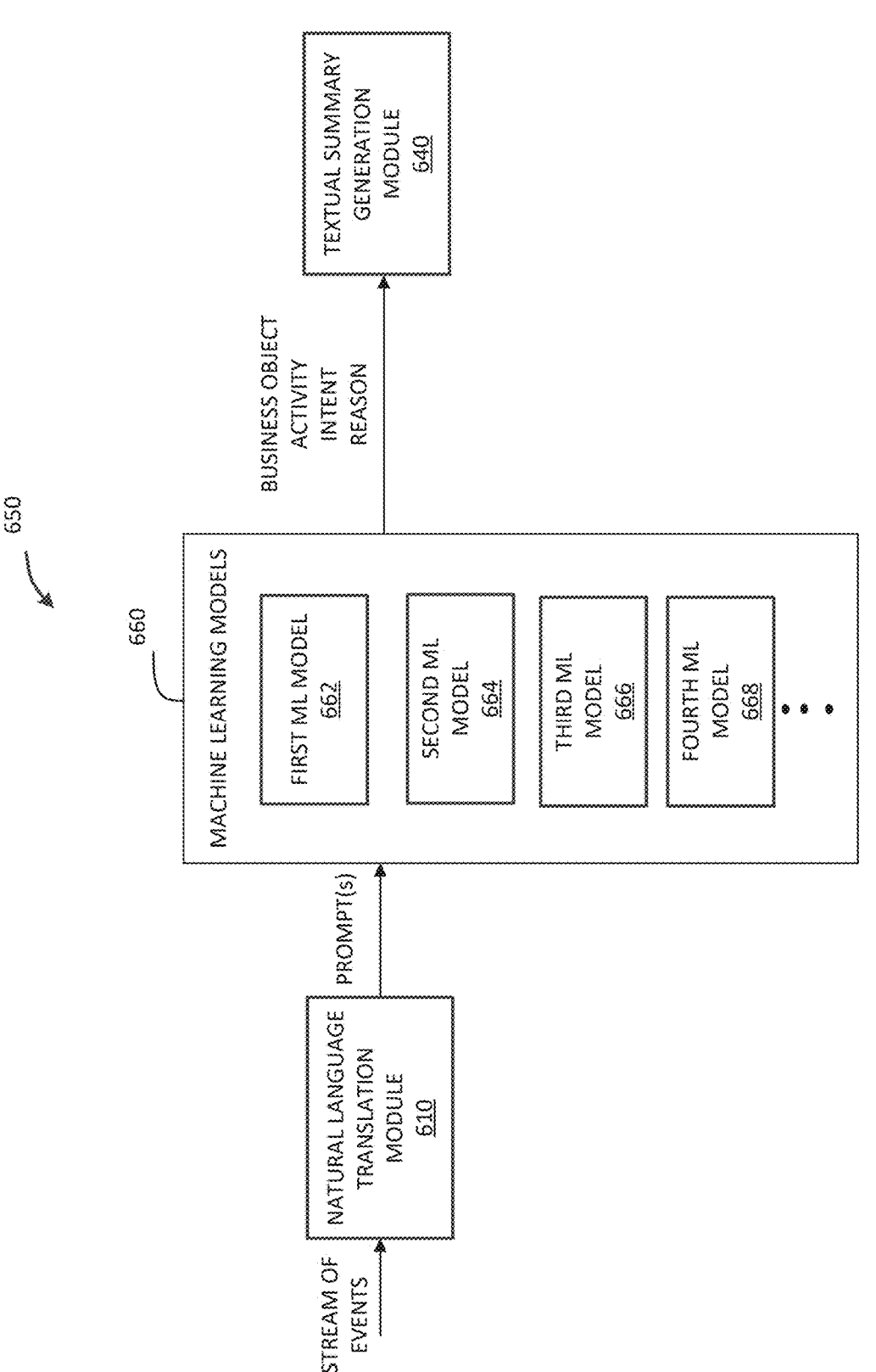

Method 500 then proceeds to act 520, where metadata associated with the multiple events in the stream of events is processed using at least one machine learning (ML) model to generate a textual summary for each of the multiple events. In some embodiments, the metadata may be translated into a natural language representation and the natural language representation of the metadata may be processed to generate the textual summaries of the multiple events. To this end, in some embodiments, process discovery module 101 may include a natural language translation module 610, as shown in FIGS. 6A and 6B, that receives information corresponding to a stream of events and translates metadata associated with multiple events in the stream of events associated with a process to a natural language representation of the metadata. In some embodiments, the at least one ML model may include at least one large language model (LLM). One or more prompts for the at least LLM one model may be generated from the natural language representation of the metadata and provided as inputs to the at least one LLM model in furtherance of generating the textual summaries.

As shown in FIG. 5, act 520 includes acts 522 and 524, both of which are performed for each of multiple events in the stream of events. At act 522, metadata associated with a particular event of the multiple events is processed using the ML model(s) to determine values of one or more entities (e.g., business object, activity, intent, reason, and any other entity described herein including in the section titled "Entities to Enable Business Understanding and Generation of Textual Summaries) associated with the particular event. In turn, these entity values may be used to create a textual summary for the particular event. For example, the metadata associated with the particular event may be processed to obtain various entity values for the particular event and these values may form or may be used to form different portions of the textual summary for the event.

In some embodiments, the at least one ML model consists of a single ML model (e.g., ML model 620 shown in FIG. 6A), and the metadata associated with the particular event is processed using the single ML model to determine the values for the business object, activity, intent, and/or reason entities for the particular event. This same single ML model may be used to process metadata for multiple events in the stream of events (not just a single event). The single ML model may be of any suitable type. For example, the single ML model may be a large language model. Examples of LLMs are provided herein. In other embodiments, the ML model may be another type of model, for example, a text generation model based on a bi-directional transformer (e.g., BERT). Examples of such models are provided herein.

In some embodiments, the at least one ML model includes different ML models 660 (e.g., as shown in FIG. 6B), each of which is used to process metadata associated with the particular event to determine values of different entities (e.g., from among the business object, the activity, the intent, and the reason) for the particular event. For example, a first ML model 662 may be used to process metadata associated with the particular event to determine the business object associated with the particular event (i.e., to determine the value of the business object entity for the event), a second ML model 664 may be used to process metadata associated with the particular event to determine the activity associated with the particular event (i.e., to determine the value of the activity entity for the event), a third ML model 666 may be used to process metadata associated with the particular event to determine the intent associated with the particular event (i.e., to determine the value of the intent entity for the event), and a fourth ML model 668 may be used to process metadata associated with the particular event to determine the reason associated with the particular event (i.e., to determine the value of the reason entity for the event).

Each of the different ML models 660 may be of any suitable type. For example, one or more of the different ML models may be LLMs. As one example, the ML model 662 may be an LLM fine-tuned (e.g., through further training or few-shot prompting) to determine business objects from metadata, while the ML model 664 may be fine-tuned to determine the activity associated with metadata. As yet another example, one or more of the models 660 may be fine-tuned to perform a specific task (e.g., determining business object or activity), while one or more other models 660 may be used without fine-tuning, for example, with zero-shot prompting. Other ML models maybe used, for example, graphical models (e.g., hidden Markov models, Markov random fields, Bayesian networks), random forests, decision trees, gradient boosted decision trees, and neural networks (NNs).

A large language model (LLM) is a generative ML model that generates textual output in response to an input prompt. For example, an LLM may process an input prompt comprising metadata for an event (e.g., metadata that comprises attribute-value pairs) and generates a textual output for the event. An LLM may be a deep neural network model trained to generate textual output in response to the input prompt. The LLM may have a transformer-based architecture.

Examples of LLMs include Generative Pre-trained Transformers (GPTs) (e.g., GPT. 3.0, GPT-3.5, GPT-4), Large Language Model Meta AI (LLaMA) models (e.g., LLama 2, LLama 3, 3.2, etc.), Bidirectional Encoder Representations from Transformers (BERT) models, and Robustly Optimized BERT Approach (ROBERTA) models, Mistral AI models, and Orca models. Each such model may have billions, tens of billions, or hundreds of billions of parameters (e.g., 1-50 billion parameters, 50-100 billion parameters, 100-500 billion parameters, or 500 billion-10 trillion parameters). When executing, an LLM may receive an input prompt (e.g., a prompt constructed using metadata for an event), convert the input prompt into a numeric representation (e.g., by embedding), and process that numeric representation using the billions of parameter values part of the LLM to generate the output text.

Thus, in some embodiments, processing metadata associated with a particular event to determine a business object, activity, intent, and/or reason may involve prompting an LLM with a textual representation of the metadata associated with the particular event to have it provide such a determination as its output. The prompts may be zero-shot prompts (prompts that do not provide any examples of what the output is to look like) or few-shot prompts (prompts that provide one or a small number of examples of what the output is to look like). The LLM may be used as is without further being trained or may be fine-tuned by being further trained with specific examples of interaction data and associated entity values.

An example of a zero-shot prompt for an LLM to generate a possible name of a business object is:

Can you give me the most likely form that these fields belong to? PO Number, Issue Date, Vendor Information, Buyer Information, Shipping Address, Billing Address, Item Description, Quantity, Unit Price, Total Price, Subtotal, Tax, Shipping and Handling, Total Amount, Payment Terms, Delivery Date, Special Instructions, Terms and Conditions, Authorized Signature, Approval Status. Just give me the name.

In this example, the prompt is constructed from metadata that includes field names and/or values associated with user interface element(s) of the application program screen with which the user interacted and the user interface elements(s) of the application program screen with which the user did not interact. The LLM (e.g., LLama 2) may generate the following response:

Yes, based on your list of fields, here is the most likely form that they belong to: Purchase Order Form.

Based on the LLM's response, "Purchase Order" may be determined as the business object the user is working with, and this may be used to generate a textual summary of the event. As another example, the following is a prompt for an LLM to identify an activity:

There is screen called {Screen Title} The screen is an app called {Application}. The screen has the following fields—{Field Names and/or Values} that appear to be a {Business Object}. The user interacted with the following fields {Field Names}. In no more than five words, what is the activity performed on this screen?

In this example, the prompt is also constructed from metadata including field names and/or values associated with user interface element(s) of the application that the user was using as well as an indication of the specific UI elements with which the user interacted. Each of the variables in brackets is filled in based on the metadata when generating the prompt. Notably, one of the variables is the {Business Object} entity, whose value in the prompt may be a value determined by using an LLM (as described above) or another type of ML model. Thus, the results of determining a business object may be used (e.g., as part of a prompt to an LLM) to determine an activity. Similarly, the results of determining a business object and/or activity may be used (e.g., as part of a prompt to an LLM) to determine an intent for the activity and/or the reason for performing the activity. Returning to the example prompt in the preceding paragraph, the LLM (e.g., LLama 2) may generate the following response:

The user was updating a claim on a purchase order by editing the destination of the claim.

As another example, the following is a prompt for an LLM to identify an intent:

There is screen called {Screen Title} The screen is an app called {Application}. The screen has the following fields—{Field Names and/or Values} that appear to be a {Business Object}. The user interacted with the following fields {Field Names}. In no more than five words, what is the overall business intent of the activity in this screen?

In this example, the prompt is also constructed from metadata including field names and/or values associated with user interface element(s) of the application that the user was using as well as an indication of the specific UI elements with which the user interacted. Each of the variables in brackets may be filled in based on the metadata when generating the prompt. Note that the Business Object is also identified in the prompt and the value of this variable may be determined from the output of an LLM (the same or different one that this prompt will be provided to). The generated response may be:

To track business operations in shipping and logistics.

As another example, the following is a prompt for an LLM to identify a reason:

A user performed an activity in a process which was 'Searching with item number', can you tell me why the user performed this activity?

As is clear, the above prompt includes the determined activity associated with the event. The inventors have recognized that it is helpful to include activity information associated with multiple events to determine a meaningful reason for a particular event. For example, a user may have performed a particular activity followed by a sequence of one or more other activities. In this case, prompting the LLM with, in addition to the determined activity associated with the particular event, the activities associated with one or more events following the particular event, may result in a more meaningful reason being provided as a response.

An example of such a prompt is:

A user performed an activity in a process which was 'Searching with item number', can you tell me why the user performed this activity in the context of the following activities that followed it: "Extraction item price and packaging information", "Entering invoice number", "Adding items in the invoice", Updating invoice amount", and "Fixing an invoice due date."

An LLM processing the above prompt may generate the following response:

The step is required to search for the item and fetch the latest price of the item from the item master list document.

In some embodiments, additional information (e.g., in addition to the metadata/activity associated with the particular event) may be used to prompt the LLM to obtain a meaningful reason associated with the particular event. Examples of such additional information may include, but not be limited to: metadata associated with events that occurred before the particular event, metadata associated with events that occurred after the particular event, the determined business object, activity, and/or intent associated with the previous and/or following events, the industry associated with the events (e.g., Healthcare), and any other process information, such as interactions taking place while the user performs a particular process (e.g., a purchase order process).

Referring back to FIG. 5, in act 524, a textual summary of the particular event may be generated from the determined business object, activity, intent, and/or reason associated with the particular event. Putting the responses together from the preceding examples produces the following example textual summary:

The user was updating a claim on a purchase order by editing the destination of the claim, as part of work related to ordering and purchasing goods or services to manage and track business operations in shipping and logistics.

Method 500 then proceeds to act 530, where textual summaries of multiple events in the stream of events associated with the process are generated and the textual summaries of the multiple events are used to generate a textual summary of the process, as described in the "Generating Textual Summaries of Steps" and "Generating Textual Summaries of Processes" sections below. In some embodiments, generating the textual summary of the process may include grouping two or more events in the multiple events into a step, generating a textual summary of the step using the textual summaries of the two or more events, and generating the textual summary of the process using the textual summary of the step. In some embodiments, process discovery module 101 may include a textual summary generation module 640, as shown in FIGS. 6A and 6B, that is configured to generate textual summaries of events, steps, and/or processes.

Figure 10:
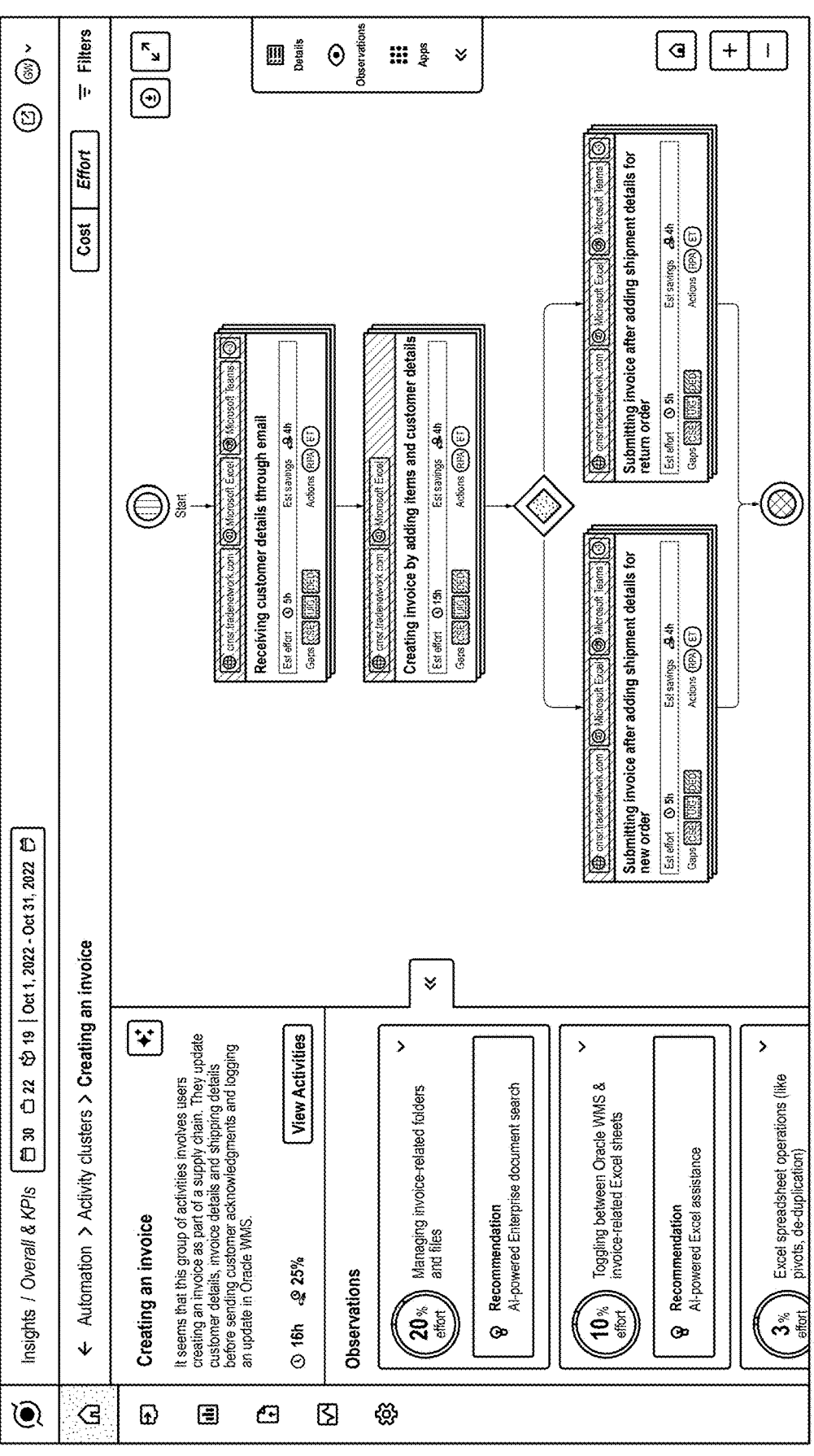
FIG. 10 is a screenshot showing a textual summary of a process, in accordance with some aspects of the technology described herein.

In act 540, the generated textual summary of the process is output. In some embodiments, the generated textual summary may be displayed via a user interface, such graphical user interface shown in FIG. 10.

Figure 6C:
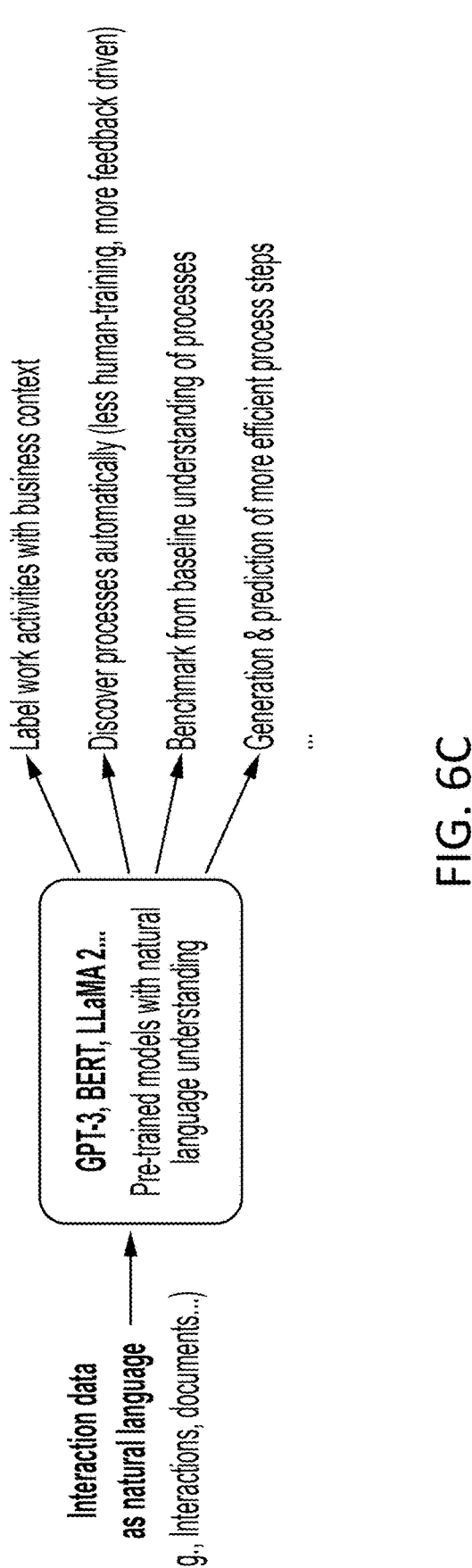
Figure 6D:
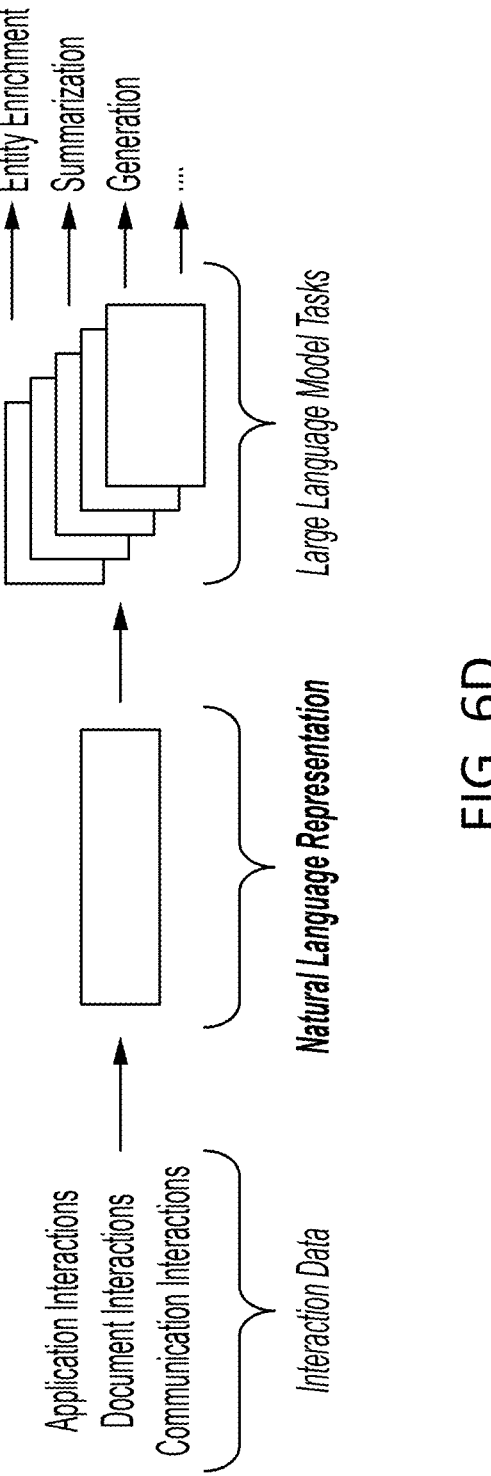

In some embodiments, when the machine learning model used is an LLM, the input to be provided to the LLMs described herein may first be converted to natural language as shown in FIG. 6C. Then, the LLMs may be prompted using the natural language representation, as shown in FIG. 6D, to produce outcomes such as labelling work activities and generating textual summaries of events, steps, and/or processes performed by the user. As an example, an LLM may be prompted to determine an intent associated with an event. The metadata associated with the event may be translated to a natural language representation for the prompt as follows:

"Can you tell me the intent behind a user interaction with the desktop application 'SAP' on a screen 'Create Purchase Order' with the field name 'Submit' which is of type 'Button'?"

Although this example prompt is a prompt to an LLM for determining an intent associated with a single event, the LLM may be prompted to determine an intent associated with multiple events. For this, the prompt provided to the LLM may include natural language metadata associated with multiple events in lists or comma separated format.

It should be appreciated that the techniques described herein can be used for various purposes, including but not limited to:

Providing a high-level description (e.g., a textual summary) with business context of what interactions were performed by a user.

Providing high-level descriptions of how different ways of the same process are performed.

Summarizing differences in how a team conducts a process differently.

Automatically labeling a repetitive pattern that users perform as likely to be a particular activity with a name (e.g., "Creating a purchase order.").

Describing the intent of a document based on its content.

Providing what processes a document is typically performed in.

Benchmarking the efficiency of how a team performs the process compared to other teams.

Identifying bottlenecks with business context when the process is typically performed (e.g., "The slowness of application X is causing purchase order creation delays.")

Generating more than descriptions, for example, generating content itself, such as, generating an ideal document for a particular use case (e.g., generate an ideal invoice form for a process); generating a more efficient way of performing steps in a process that the team can perform; generating code that can perform a set of business activities that were captured; generating support tickets when issues are experienced; and generating consultant-like recommendations to improve the process or activities being performed.

The techniques described herein can provide teams with a better understanding of their activities and how to improve them. For example, the users can be provided with real-time notifications when they are about to make a mistake while performing a process/activity.

Applicability of Different Types of ML Models

As is clear from the foregoing, a variety of different types of ML models may be used for generating textual summaries of interaction events, steps, and processes. In some embodiments, one or more LLMs may be used. Each such LLM may be used without further training and may be prompted with zero-shot or few-shot prompts. In other embodiments, any one of the LLMs being used may be further trained using additional training data (e.g., not just through few-shot prompting). For example, such training data may include examples of interaction metadata (e.g., attribute-value pairs examples of which are provided herein) and corresponding entity values (e.g., values of business object, activity, intent, and reason entities). Such training data may be generated by: having users perform a process, deriving metadata from the data recorded as the process is performed, and labelling the derived metadata with corresponding entity values.

In some embodiments, other types of ML models may be used including text-to-text generation models, examples of which are provided below including in the sections called: "Business Object Determination", "Activity Determination", "Intent Determination", and "Reason Determination". These types of models may be also trained on interaction metadata and corresponding entity values.

Figure 7A:
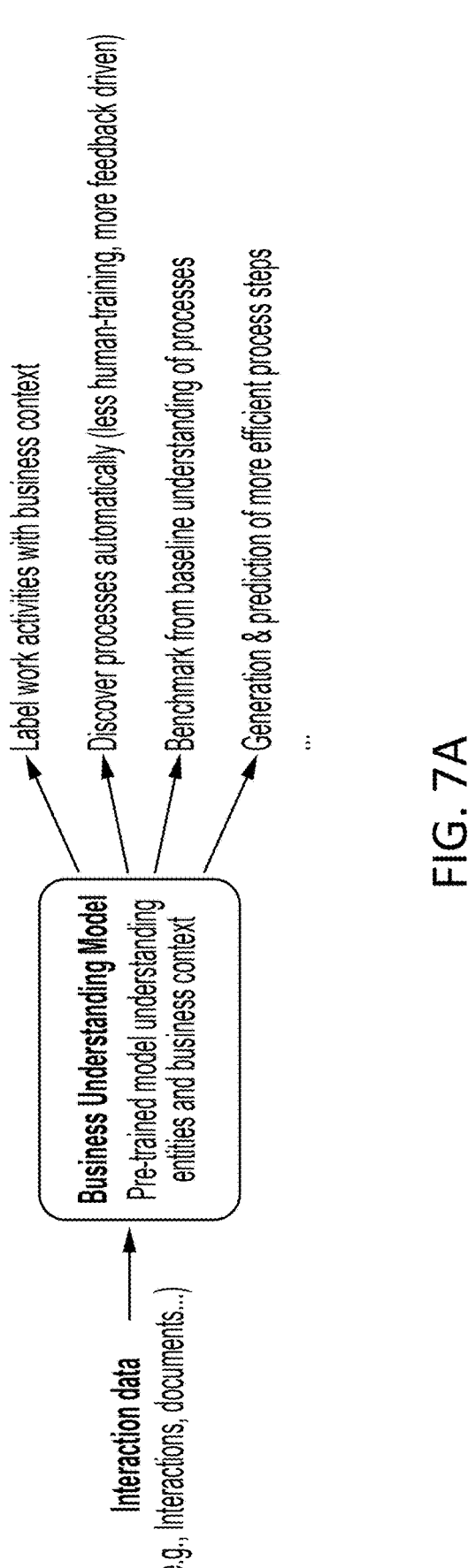
FIG. 7A illustrates an example model trained on digital interactions and metadata from those interactions to learn and understand business context, in accordance with some aspects of the technology described herein.

In some embodiments, for example, an ML model (e.g., a deep neural network), as illustrated in FIG. 7A, may be trained on interactions and metadata derived from those interactions to process metadata associated with events to generate textual summaries of the events. However, an ML model may be trained to perform many other tasks, not just the generation of textual summaries. Broadly speaking, an ML model may be trained using interaction data to learn meaning behind the interactions to be able to describe, summarize, generate, and predict aspects of work that teams do.

Figure 7B:
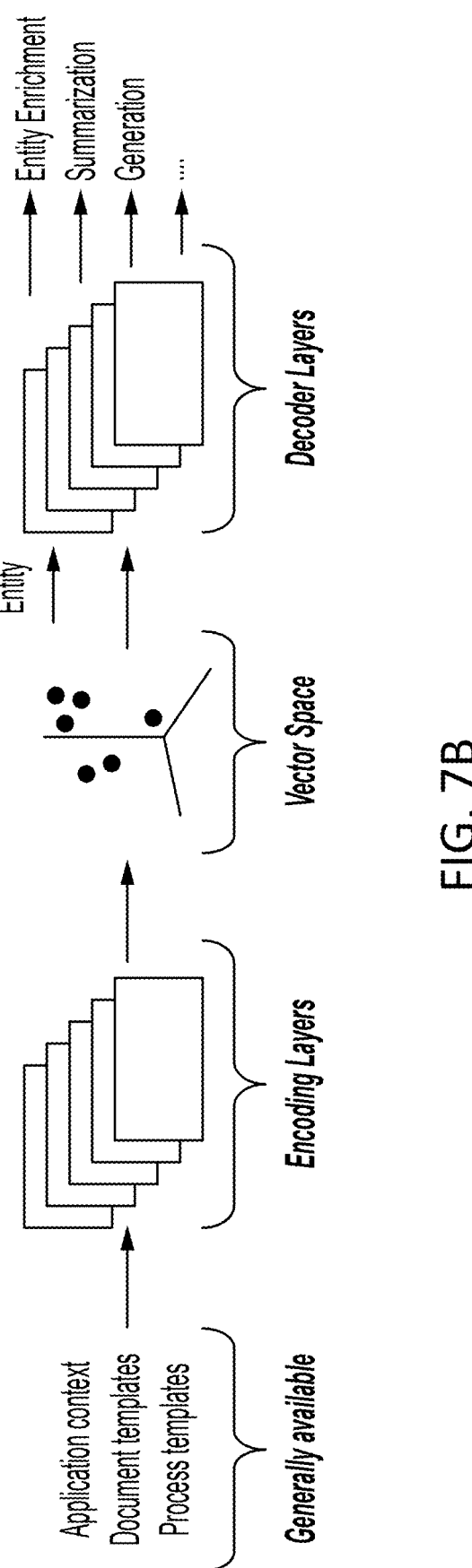
FIG. 7B illustrates an example model architecture trained with generally available information that trains encoding layers, a model with a vector space tuned with business context and semantic similarity, and decoding layers for particular tasks, in accordance with some aspects of the technology described herein.

In some embodiments, building a deep learning model based on user interaction data with applications, documents, chats, etc. the architecture shown in FIG. 7B may be utilized. First, generally available information such as application context, document templates, and process templates may be gathered and pre-processed for the purpose of training one or more ML models. The pre-processing may involve deriving metadata such as attribute-value pairs (examples of such metadata are provided herein) and obtaining (e.g., either automatically or by using human labelers) corresponding entity values (e.g., values of the business object, activity, intent, reason, and/or other entities). These data may be used to train a set of encoding layers. These encoding layers are responsible for entities as inputs and producing a vector representation of them.

The vector representations based on the weights learned in the encoding process may be produced such that entities that have similarity have a shorter distance from each other in the vector space. For example, documents that have similar intents may have vector values that are closer to each other than documents without similar intent. Any entity given to the encoding layers that have similar business intent or understanding may be placed closely to each other in the vector space, based on the properties learned by the encoding layers. The architecture is one in which there may be multiple encoders and vector spaces that are fine-tuned for particular work graph entities. For example, one set of layers could be fine-tuned for document entities and another set of layers could be fine-tuned for user interactions or steps that they perform.

The encoding that was described is either one or all parts of the relevant model, in that the encoding layers can be used to produce vectors that are used directly by use cases. For example, directly used to compute similarity between entities in the work graph without needing to use any decoding layers. However, some decoding layers may be relevant to particular tasks or use cases of the model, such as layers that take vectors produced by the encoder and resultingly produce summaries of the entities that were encoded. Other uses of the decoding layers may be to have fine-tuning to particular tasks as described in further sections below on the use cases. However, the decoding layers may provide functionality like summarization of the entities, enriching them with additional business context (e.g., like the business purpose of what was given), generation of new material from the model (e.g., generating an ideal document based on a goal), or for but not limited to providing a conversational interface for users to ask questions of the model.

As described, the encoding layers may be trained from entities that have business context associated with them. This embeds business understanding into the encoding layers for various entities such as user interactions, documents, chats, and e-mails. Such that when new entities are provided to the encoder, they can also be embedded with business context based on their placement in the vector space and their resulting nearest neighbors. That can be learned via the decoders. For example, final decoder layers in the model can be fine-tuned to learn that an area of the vector space contains documents or user interactions whose intent are related to Purchase Orders. Such that any new entity that is encoded which the model has never seen which is of some distance to that area in the vector space can also be classified as related to Purchase Orders. This is how the model may obtain business understanding, which is explained in more detail below in how the model is trained.

The deep learning model and architecture chosen is trained with general information available that is collected across applications, documents, and process templates. This is information that is often displayed to human users to give them business context of what they see on their screen. For example, text labels in business applications are meant to give the human user business context of what activity they are performing and guiding them. This same information can be used to train the model to give it the same business context. With enough information from applications, documents, process templates, chats and more the model can learn to understand the same kind of business context that humans need and are looking for when they see data that has been collected to help them understand their business processes and activities.

In some embodiments, there are various labels that give the user business context, and by training the model with these words together the encoder layer will learn that they have semantic similarity with each other. That is due to the bi-directional transformer and autoregressive designs of the model. As can be seen in the example application screen of FIG. 4A, it is possible to take business applications and use various technologies to extract information from them such as the labels in the application that say, "Purchase Order Screen", "Purchase Order Information", "P.O. Number", "Ship To", "Item #", "Vendor No." etc. All of this information will be given sequentially to the encoder which will construct layers that produce a vector space whereby these words will be closer to each other due to their context associated with each other. If they appear together, such as shown in FIG. 4A, the encoder learns of their association and thereby use in similar contexts. That puts them nearby each other in the vector space.

The model may learn that even if key words providing the business context like 'Purchase Order' did not exist anywhere in the screen, it is still possible for it to associate the context and the meaning of what the user is doing. For example, imagine that only "Vendor ID:," "P.O. Number", "Order Form" and other terms like this were present, the model may still place these contextually in the same vector space as a purchase order. This can later allow for applications of the model and its decoders to enrich smaller amount of information that would have been shown to a user which explains the work they are doing to far more rich descriptions. Even the ability to be able to predict and classify the work they are doing automatically.

When collecting this information from applications, there are several strategies that can be used when deciding what to train the encoder with, but not limited to:

Application labels can be used during the training.

Screen titles can be used during the training (e.g., the text at the top of the window).

Values in the application, such as those in text boxes or dropdowns, can be used during training.

Meta-data from the application not shown to the user (e.g., embedded in the application), such as application element names used by the UI frameworks (UIA, Java Access Bridge, SAP scripting, etc).

Visual representations of the screen and the text in it.

In addition to this information, broader context can be provided when the training is occurring and/or in the decoding layers. For example, there may be additional information provided with the training. Such as knowing when training that the application's purpose or this section of the application's purpose is related to purchase orders. This information can come out-of-band to what is actually in the application, but rather from pre-existing metadata about the application or sections of it.

Since this information is general to the business context it will extend to work for applications that the model has never seen before in the future. These applications may be in-house applications in organizations who use the technology. Even if the model was never explicitly trained on them, the general information given to the model means that is likely to still see similar labels and context in applications it has never seen before.

The next generally available information that the model can be trained on are publicly accessible documents. When training on documents, formatting may be used to detect general information in the document such as headers, sub-headings, sections, and general context given to users. Such as what has been highlighted in FIG. 4B like "VENDOR," "SHIP TO", "ITEM #", "Payment Amount", etc. To find this information in training various formatting filters such as bold text, italic text, larger text, all capital text, colored text, table headings, etc. may be used. This identifies information that is generally context about what's being done as opposed to values. Although the technique works for both templates and filled in documents, it is templates that also help find more structure about the documents and their context as they will not be filled with a lot of dynamic information yet.

This information is passed in training just as described above in the training on application data section and just like with the training on application data, information in the documents that train the business understanding may build an understanding of documents even if not shown to the model in training. In fact, documents can be treated just like an application and what is learned in applications and documents will extend to each other. That is, business context learned in one can extend to another i.e., business context in applications can still be used to generate business context for documents.

The encoding layers may be trained to produce a vector space with embedded business context and understanding. The next step is to train the decoder layers shown in FIG. 7B, which may produce at least one if not multiple models that are fine-tuned to particular tasks, such as being able to generate textual summaries of events or generate a more efficient way of doing a process.

How this works is that the encoding layers are trained using the techniques described herein. That will create the ability to take work graph data such as user interactions with the applications, documents, chats, e-mails, etc. and convert them into vector values in the vector space. Next, the decoding layers may be developed which may take as inputs the vectors output of the previous encoding layers and potentially reduce or expand them into a new set of outputs such as a classification.

Using a classification decoding layer as an example, a set of user interactions may be passed to the encoder which produces the set of resulting vectors. The next layer may be setup as a classification layer where the goal may be to take the vectorized user interactions and classify them into a potential activity, such as activity related to Purchase Orders. If the output of the final encoding layer is of size 100 and there are 50 possible activities that the user could be performing, then the final decoding layer may be a fine-tuned model that is 100×50 where it takes the vector of size 100 and produces a resulting vector of size 50 which is its output fine-tuned for the use case of activity classification. Each value in that vector of size 50 being a vector with a result that embeds the potential weight of each possible label from the classification. This is just one example of how the model may be built and fine-tuned for different use cases.

Another example of how the decoder is built and fine-tuned to particular use cases is an example of summarization or generation. Given an input vector from the encoding layers, such as a series of user interactions from an activity they performed, a resulting vector representation will again be produced. A set of context and text that was learned from the encoding and embedded in the vector space can then be used to generate a summary of the context of the business application. An example of this will be that as we build the vector space, to keep a representation of the context that is associated with different regions of the vector space. For example, when training on Purchase Order related activities we can embed through the decoder that the region of the vector space related to this activity is bounded by this area in the vector space. Imagine that 'Creation' (e.g., creation of a purchase order, creation of an invoice, creation of a report . . . ) is also represented by some area of the vector space. Then when a set of activities is passed to the decoder it will be able to generate a description of what the user is doing by recognizing what parts of the vector space their digital interactions belong in. It could therefore predict that the user is both working on purchase orders and creating, thereby capable of producing a description such as "The user is creating purchase orders."

All of these applications and use cases are described in the detail below, including the relevant details of the model to be able to produce the outcome of that use case.

Entities to Enable Business Understanding and Generation of Textual Summaries

In this section, we describe how the model is used to derive novel functionality for users. These use cases are built on top of the model and its business understanding, which were not possible before with user interaction data on its own, and from documents, e-mails, or chats.

All of the techniques described herein are applicable to any of the entities described herein or other entities that we may construct in the future since the techniques are generally applicable to the information available in the entities. For example, techniques used to summarize an entity work across all entities.

Entities are related to organization's work and operations, as collected and/or created by technologies described herein. Particularly, these entities can describe the digital interactions that users take with applications, documents, chats, e-mails, etc. and their organization into business activities like processes or steps that they perform. These entities include, but are not limited to:

User Interactions that are collected as they interact with applications, documents, chats, e-mails, etc.

Fields which are application elements like text boxes, dropdowns, radio buttons, etc.

Attributes/Identifiers are Fields that contain properties of a business activity, such as a purchase order number for a purchase order process.

Views which are a representation of what the user sees on their screen when working with applications, documents, chats, e-mails, etc.

Activities that users perform such as a series of interactions to perform a task.

Steps that users perform, such as a series of activities that are part of a business activity.

Processes that users follow to complete a business activity (e.g., creating an invoice).

Variations of the interactions, activities, steps, processes, documents, e-mails, etc. that might exist.

Applications are digital interfaces by which teams perform work.

Documents that the business uses to complete interactions, activities, steps, processes, etc.

Chats/Conversations that are related to the business activities that they perform.

E-mails that are related to the business activities that they perform.

Groups which are collections of any of the above entities that share some business intent.

KPIs are performance indicators towards specific business objectives.

Statistics are numerical properties of entities described above (e.g., like total number of e-mails).

Users are the individual workers who conduct the business activities.

Teams are the groups of workers who conduct the business activities.

For all entities, techniques may be deployed on the model that are accessible on every entity and across entities that enable obtaining greater business understanding, searching entities, generating textual summaries, etc. The available model tasks that are enabled on every entity are as follows, but not limited to, for enabling greater business understanding using the model:

Entity Enrichment: For the given entity, we enrich it with additional business context using the model developed. Additional context, for example, being some additional purpose or description to help the user understand more about the business activity. This can be implemented via generative layers in the model. For a generative layer, it can be giving the model the original details about the entity and having a decoder produce additional tokens or words that describe the entity in more detail. Given how the model was trained, it produces additional context relevant to the entity that was provided. A generative model is not the only way, but one such way to implement entity enrichment that can be used.

Input Example: "User edited text field."

Output Example: "User edited an address field related to shipping."

Summarization: For multiples of the same entity (e.g., multiple User Interactions), to summarize what was performed in a natural language form with the enrichment that was added to the entity. A common method for implementing summarization is a sequence-to-sequence set of layers in the model to produce a natural language summarization. In particular, by being example sequences from the original domain (e.g., multiple User Interactions) with example sequences in the following domain (e.g., a set of natural language words that summarize it). Not limited in solution to sequence-to-sequence models, however, as other ways of providing the summarization are possible (e.g., through generation).

Input Example: "User edited text field. User clicked on dropdown. User clicked on button."

Output Example: "The user changed an address field related to shipping and saved the address."

Topic Modelling: Topic modelling can be provided on any of the entities to relate them to a business activity, thereby giving them additional business context. For example, to say that the User Interaction or the Step is related to "Purchase Orders." This provides better business understanding of the information that is presented to users. Implementations of topic modelling can happen in many different ways, such as single label classification, multi-label classification, and various clustering techniques. One such implementation, e.g., with single label classification, can have the model described in the design and training sections trained on inputs of the entities with resulting topic classifications for it to learn from.

Input Example: "The user changed an address field related to shipping and saved the address."

Output Example: "Updating Purchase Orders."

Similarity Analysis: Any entity can be directly compared to another instance of another entity and obtain a similarity score via vector distances and other techniques from the model that was described. This will enable a number of features related to finding similar documents, similar processes, similar users, etc. The similarity analysis can take two or more entities and will return a similarity score between them. This score can be, for example, a score between 0 and 1 but is open to many different types of similarities (e.g., cosine similarity, Euclidean distance, etc.).

Input Example: Document 1, Document 2

Output Example: 0.65

Fast Similarity Analysis and Search: With similarity analysis as a base feature and all of the entities being encodable in the vector space, it is easy to implement a fast similarity analysis and search. This can, for example, be implemented using a nearest neighbor search in the vector space and can span across entities. Within the same entity type, it can find all other documents that are similar to a given document that users were viewing, editing, creating, etc. Across entity types, finding processes that are similar to a given document will result in processes that are most likely to use the document. This enables many use cases that we describe below.

Input Example: Document 1

Output Example: Document 7, Document 10, Document 32 . . . (all of which are semantically similar in business intent/context)

Finding the Usage Of: With the similarity analysis, nearest neighbor searches, as well as the mappings that can be created, the model can enable finding usage of any of the entities across user's and team's work. For example, the relationship between documents and processes can enable finding the usage of documents in processes. It can also enable finding the usage of documents in unstructured work the teams do. It can also enable finding the usage of documents in e-mails, or when they are referenced in chats. But this is not limited to documents, it can be used on any of the entities, such as e-mails to see what processes e-mails belong to and so forth.

Input Example: Document 1

Output Example:

{'Processes': ['Purchase Order Creation', 'Purchase Order Cancellation', . . . ], 'E-Mails': ['URGENT: Cancel purchase order #1234, . . . ]}

Grouping: There are several ways using the model and the vector space that entities can now be grouped and clustered. First, is using model tasks and techniques already described. For example, grouping entities together by the using the Topic Modelling, Similarity Analysis, and some of the nearest neighbor searches described. The value of the clustering and grouping that results from these techniques can help provide user experiences where clusters or groups of entities are created for users, in addition to users being able to create their own clusters or groups. Clusters or groups will contain entities that have semantic similarity to each other as well. The groups will contain entities that all belong to the same topic, which are all within some similarity threshold, or all within some distance as neighbors in a vector space. Groups can either be pre-defined, e.g., based on the topics, or a user can create a cluster by providing one example of an entity which can then use similarity analysis or nearest neighbors as an example. For example, if the user were to provide a document and request that a group is created from it. That group can be named by the user or provided through the summarization model task previously described.

Output Example: {'Group Name': [Group Entities], . . . }

Interactive Queries: Using the model's business understanding learned from training, a model task can be implemented that provides interactive queries on the data using natural language. This allows a user to ask for knowledge about the entities listed and others that the technology may be extended to include. To provide the model task of interactive queries, there are a number of techniques employed. To provide access to data that is dynamic and can change over time, there are translation options of the natural language queries into SQL queries where entities are detected in the natural language queries and mapped to database information. Other techniques may retrain an interactive query model with knowledge daily to instead embed the exact knowledge into the model. These are two example ways of achieving this. This can allow users to ask questions like the example below. In addition to this, the user can request that the information be graphed for them for easier understanding of the data.

Input Example: What is the total cost impact due to reprocessing of orders in the last month?

Output Example: ~ $220.

Input Example: Give me a trend view of the past 6 months.

Figure 12:
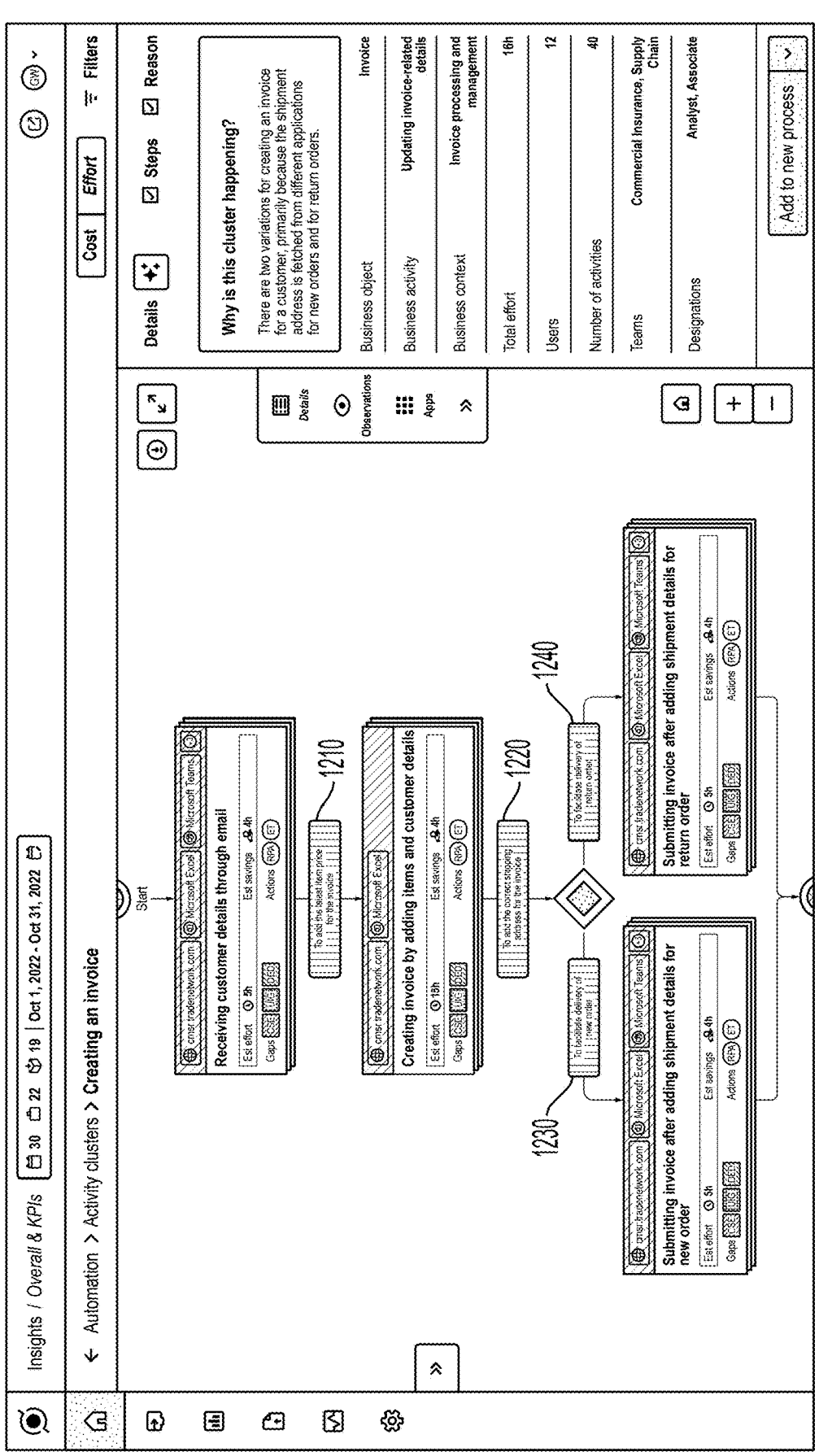
FIG. 12 is a screenshot showing a reason for going between steps and decision points of a process, in accordance with some aspects of the technology described herein.

Output Example as shown in FIG. 12 may be provided.

Generation Of: With the learning built into the model, generative tasks can be built which enable the generation of entities. These model tasks can be fine-tuned to generate entities such as generating documents that have a template structure ideal for the process learned by the model or detected in the customer's use case. The generative model tasks can be fine-tuned to generate the summarization as previously described. The generative model tasks can be fine-tuned to generate a more efficient set of Steps to performing a process.

Input Example: <Set of business process Steps>

Output Example: <More efficient set of business process Steps>

Input Example: <Purchase Classification like 'Purchase Order'>

Output Example: <An ideal 'Purchase Order' document>

Impact on Business KPIs: Part of what the model has learned are about statistics (entity) that are relevant to processes (entity). The model therefore has an understanding of what statistics are influenced by what processes, what documents, what e-mails, what applications, etc. This can identify what entities are bottlenecks in a process and how they impact business KPIs. For example, that a Purchase Order document has an impact on the manual processing effort related to purchase orders. The user can be navigated to more information on the business KPI with actual statistics on their impact to the KPI.

Input Example: Purchase Order Document

Output Example: Impact: Manual processing effort per-invoice.

Industry Benchmarking: When the model is trained with business understanding from process templates and other industry standards, it is learning general industry benchmarks in terms of the standard set of steps that should be performed, statistics about the process from industry standards such as the average processing time, the amount of effort required to complete a transaction of the process, the cycle time it may take to complete the process (i.e., time from start of a transaction to the end, including gaps in time where it has not been worked on). Other benchmarking can include documents that should be present or used according to industry standards, like a compliance tracker.

Input Example: <Example executions of Purchase Order Process>

Output Example: {'Processing Time Benchmark': '−10 minutes', 'Manual document processing effort': '+15 minutes', . . . }

Real-time User Experiences: Various of the model tasks described above can then be used to build real-time user experiences. These experiences, for example, can help improve the productivity of the user related to particular entities. For processes, it is now possible to provide the real-time experience of detecting the process that the user is doing in real-time (e.g., using the model's classification) and simply asking the user to confirm whether or not they are doing the process. Previously, accurate classification may have required substantial amounts of manual user effort to train the model. Now, a more real-time experience can be built using a classification task and learning from the user's feedback. Other experiences that can be provided are checking compliance against a process.

Business Object Determination

As described herein, in some embodiments, metadata associated with an event may be processed using a trained ML model to determine a business object associated with the event. In some embodiments, an LLM may be used for this purpose. In other embodiments, another type of ML model may be trained for this purpose.

For example, a text classifier may be trained to determine the business object (a "label") associated with an event from text containing metadata derived from the interaction data for the event. One approach to training such a text classifier is described below.

This may begin by defining a mapping from terms appearing in metadata to business object labels as indicated, by way of example, in the following table:

| Business Object (label) | Metadata (text) |
| --- | --- |
| Purchase Order | PO Number, Issue Date, Vendor Information, Buyer Information, Shipping Address, Billing Address, Item Description, Quantity, Unit Price, Total Price, Subtotal, Tax, Shipping and Handling, Total Amount, Payment Terms, Delivery Date, Special Instructions, Terms and Conditions, Authorized Signature, Approval Status |
| Sales Order | Order Number, Issue Date, Customer Information, Seller Information, Shipping Address, Billing Address, Item Description, Quantity, Unit Price, Total Price, Subtotal, Tax, Shipping and Handling, Total Amount, Payment Terms, Delivery Date, Special Instructions, Terms and Conditions, Authorized Signature, Approval Status |
| Invoice | Invoice Number, Invoice Date, Customer Information, Seller Information, Shipping Address, Billing Address, Item Description, Quantity, Unit Price, Total Price, Subtotal, Tax, Shipping and Handling, Total Amount, Payment Terms, Due Date, Terms and Conditions, Authorized Signature, Approval Status |
| Patient Medical Record | Patient ID, First Name, Last Name, Date of Birth, Gender, Blood Type, Contact Information, Emergency Contact, Allergies, Medications, Medical History, Surgical History, Family History, Social History, Vital Signs, Chief Complaint, Present Illness, Physical Examination, Diagnosis, Treatment Plan, Laboratory Results, Imaging Results, Medication History, Immunization History, Discharge Summary, Follow-up Instructions |
| . . . | . . . |

To train the text classification model, the metadata may be considered as the "text" input and the business object as the resulting "label." A single-class classifier for each of the labels or a multi-class classifier may be trained. Either approach may be used to identify one or more possible business objects from metadata. For example, metadata for an event may be processed by multiple-single class classifiers and the business object may be identified as the label associated with the highest likelihood/confidence of a respective single-class classifier. Alternatively, the metadata for an event may be processed a multi-class classifier whose output may be used to identify one or multiple business objects.

As one example, a text classifier may be trained using a bi-directional transformer like BERT, as follows:

```
from simpletransformers.classification import ClassificationModel, ClassificationArgs
# Set classification arguments for training.
Model_args = ClassificationArgs(
    use_multiprocessing=False,
    use_multiprocessing_for_evaluation=False,
    reprocess_input_data=True,
    overwrite_output_dir=True,
    num_train_epochs=3
)
# Create a ClassificationModel which we use 'bert' and 'bert-base-cased' but there are others we can
experiment with.
Model = ClassificationModel(
    "bert",
    "bert-base-cased",
    num_labels=len(class_labels),
    use_cuda=torch.cuda.is_available( ),
    args=model_args,
)
# Train the model
model.train_model(train_df)
```

In this example, the variable train_df is a dataframe that has two columns in it. One is 'text' and one is 'label' to match the example table above. This trains the model on examples of business object labels for the given metadata. Multiple examples can be given for each business object as well.

Then, the model can produce a possible Business Object by asking it to make a prediction on a given set of attributes like:

predictions, raw_outputs=model.predict([attributes])

The predictions contain a set of confidence scores associated with each of the possible sets of labels (i.e., business objects) such that a possible business object with confidence can be returned. For example, a business object with a highest confidence score may be returned as the possible business object.

It should be appreciated, however, that a business object can be determined by prompting an LLM (either by zero-shot or few-shot prompting), as described above, instead of training a separate text classification model as described by way of example in this section.

Activity Determination

As described herein, in some embodiments, metadata associated with an event may be processed using a trained ML model to determine an activity associated with the event. In some embodiments, an LLM may be used for this purpose. In other embodiments, another type of ML model may be trained for this purpose.

For example, a text-to-text generation model may be used. As another example, an ML model could be used that takes in metadata (or features thereof), numerically embeds them and puts them through one or more layers, the final layer of which is trained to generate text representing the activity.

In some embodiments, the activity may be determined using a text-to-text generation model. This can be done using a bi-directional transformer model's ability to summarize and generate text based on examples provided to it. Examples may be provided to it to learn how to summarize the activity through the examples, like the following:

| Metadata (Input) | Activity (text) |
|---|---|
| Timestamp: Nov. 16, 2023 1:45pm<br>User: c6f93c98-8909-4102-9444-a2c48827973c<br>Application: internalapp.com<br>Screen Title: Claim<br>Action: Keystroke<br>Field Name: Destination<br>Field Value: PA<br>Field Type: Input<br>Business Object: Purchase Order | The user was updating a claim on a purchase order by editing the destination of the claim. |
| Timestamp: Nov. 16, 2023 1:45pm<br>User: c6f93c98-8909-4102-9444-a2c48827973c<br>Application: internalapp.com<br>Screen Title: Create Purchase Order<br>Action: Click<br>Field Name: Order Type<br>Field Value: Auto | The user selected the Auto order type when creating a purchase order. |

-continued

| Metadata (Input) | Activity (text) |
|---|---|
| Field Type: Dropdown<br>Business Object: Purchase Order<br>. . . | . . . |

In some embodiments, as described herein, the determined business object may also be used for determining the activity and the determined business object may also be provided as input to the model.

When providing the input to training of the model, it can be such that each of the entities in the metadata are concatenated together and comma separated so that the model is able to distinguish each of the features during training. Training such a text generation model with a bi-directional transformer like BERT, would look like the following, which is an example for the Huggingface platform, but catered to the example data:

After training has been completed, the custom and fine-tuned text generation model may be used to determine activities, for example, as follows:

from transformers import pipeline summarizer=pipeline ("summarization", model="activity_model")

summarizer ("Timestamp: Nov. 16, 2023 1:45 pm, User: c6f93c98-8909-4102-9444-a2c48827973c, Application: internalapp.com, Screen Title: Claim, Action: Keystroke, Field Name: Destination, Field Value: PA, Field Type: Input, Business Object: Purchase Order")

```
from transformers import AutoTokenizer
from transformers import AutoModelForSeq2SeqLM, Seq2SeqTrainingArguments, Seq2SeqTrainer
# Start with a smaller model for fine-tuning such as T5 Small
checkpoint = "t5-small"
tokenizer = AutoTokenizer.from_pretrained(checkpoint)
# Data for training...
training_data = [{
'text': 'Timestamp: Nov 16, 2023 1:45pm, User: c6f93c98-8909-4102-9444-a2c48827973c, Application:
internalapp.com, Screen Title: Claim, Action: Keystroke, Field Name: Destination, Field Value: PA, Field
Type: Input, Business Object: Purchase Order',
'summary': 'The user was updating a claim on a purchase order by editing the destination of the claim.'
}, ...]
prefix = "summarize: "
def preprocess_function(examples):
    inputs = [prefix + doc for doc in examples["text"]]
    model_inputs = tokenizer(inputs, max_length=1024, truncation=True)
    labels = tokenizer(text_target=examples["summary"], max_length=128, truncation=True)
    model_inputs["labels"] = labels["input_ids"]
    return model_inputs
tokenized = training_data.map(preprocess_function, batched=True)
model = AutoModelForSeq2SeqLM.from_pretrained(checkpoint)
training_args = Seq2SeqTrainingArguments(
    output_dir="activity_model",
    evaluation_strategy="epoch",
    learning_rate=2e-5,
    per_device_train_batch_size=16,
    per_device_eval_batch_size=16,
    weight_decay=0.01,
    save_total_limit=3,
    num_train_epochs=4,
    predict_with_generate=True,
    fp16=True,
    push_to_hub=True,
)
trainer = Seq2SeqTrainer(
    model=model,
    args=training_args,
    train_dataset=tokenized["train"],
    eval_dataset=tokenized["test"],
    tokenizer=tokenizer,
    data_collator=data_collator,
    compute_metrics=compute_metrics,
)
trainer.train( )
```

This, in turn, may produce an output identifying an activity such as:

"The user was updating a claim on a purchase order by editing the destination of the claim."

It should be appreciated, however, that an activity can be determined by prompting an LLM (either by zero-shot or few-shot prompting), as described above, instead of training a separate text-to-text generation model as described by way of example in this section.

Intent Determination

As described herein, in some embodiments, metadata associated with an event may be processed using a trained ML model to determine an intent associated with the event. In some embodiments, an LLM may be used for this purpose. In other embodiments, another type of ML model may be trained for this purpose.

For example, a text-to-text generation model may be used. As another example, an ML model could be used that takes in metadata (or features thereof), numerically embeds them and puts them through one or more layers, the final layer of which is trained to generate text representing the intent.

In some embodiments, the intent may be determined using a text-to-text generation model. This can be done using a bi-directional transformer model's ability to summarize and generate text based on examples provided to it. Examples may be provided to it to learn how to summarize the reason through the examples, like the following:

| Metadata (Input) | Intent (text) |
| --- | --- |
| Timestamp: Nov. 16, 2023 1:45pm<br>User: c6f93c98-8909-4102-9444-a2c48827973c<br>Application: internalapp.com<br>Screen Title: Claim<br>Action: Keystroke<br>Field Name: Destination<br>Field Value: PA<br>Field Type: Input<br>Business Object: Purchase Order | To track business operations in shipping and logistics. |
| Timestamp: Nov. 16, 2023 1:45pm<br>User: c6f93c98-8909-4102-9444-a2c48827973c<br>Application: internalapp.com<br>Screen Title: Create Purchase Order<br>Action: Click<br>Field Name: Order Type<br>Field Value: Auto<br>Field Type: Dropdown<br>Business Object: Purchase Order | To initiate order fulfillment through the creation of a PO. |
| . . . | . . . |

In some embodiments, the determined business object and/or activity may also be used for determining the intent and the determined business object and/or activity may also be provided as input to the model.

When providing the input to training of the model, it can be such that each of the entities in the metadata are concatenated together and comma separated so that the model is able to distinguish each of the features during training. Training such a text generation model with a bi-directional transformer like BERT, would look like the following which is an example for the Huggingface platform but catered to the example data:

```
from transformers import AutoTokenizer
from transformers import AutoModelForSeq2SeqLM, Seq2SeqTrainingArguments, Seq2SeqTrainer
# Start with a smaller model for fine-tuning such as T5 Small
checkpoint = "t5-small"
tokenizer = AutoTokenizer.from_pretrained(checkpoint)
# Data for training...
training_data = [{
'text': 'Timestamp: Nov 16, 2023 1:45pm, User: c6f93c98-8909-4102-9444-a2c48827973c, Application:
internalapp.com, Screen Title: Claim, Action: Keystroke, Field Name: Destination, Field Value: PA, Field
Type: Input, Business Object: Purchase Order',
'summary': 'To track business operations in shipping and logistics.'
}, ...]
prefix = "summarize: "
def preprocess_function(examples):
    inputs = [prefix + doc for doc in examples["text"]]
    model_inputs = tokenizer(inputs, max_length=1024, truncation=True)
    labels = tokenizer(text_target=examples["summary"], max_length=128, truncation=True)
    model_inputs["labels"] = labels["input_ids"]
    return model_inputs
tokenized = training_data.map(preprocess_function, batched=True)
model = AutoModelForSeq2SeqLM.from_pretrained(checkpoint)
training_args = Seq2SeqTrainingArguments(
    output_dir="intent_model",
```

-continued

```
    evaluation_strategy="epoch",
    learning_rate=2e–5,
    per_device_train_batch_size=16,
    per_device_eval_batch_size=16,
    weight_decay=0.01,
    save_total_limit=3,
    num_train_epochs=4,
    predict_with_generate=True,
    fp16=True,
    push_to_hub=True,
)
trainer = Seq2SeqTrainer(
    model=model,
    args=training_args,
    train_dataset=tokenized["train"],
    eval_dataset=tokenized["test"],
    tokenizer=tokenizer,
    data_collator=data_collator,
    compute_metrics=compute_metrics,
)
trainer.train( )
```

After training has been completed, the custom and fine-tuned text generation model may be used to determine intents like the following:

> from transformers import pipeline
> summarizer=pipeline ("summarization", model="intent_model")
> summarizer ("Timestamp: Nov. 16, 2023 1:45 pm, User: c6f93c98-8909-4102-9444-a2c48827973c, Application: internalapp.com, Screen Title: Claim, Action: Keystroke, Field Name: Destination, Field Value: PA, Field Type: Input, Business Object: Purchase Order")

Which would then, for example, produce an intent such as:

> "To track business operations in shipping and logistics."

purpose. In other embodiments, another type of ML model may be trained for this purpose.

For example, a text-to-text generation model may be used. As another example, an ML model could be used that takes in metadata (or features thereof), numerically embeds them and puts them through one or more layers, the final layer of which is trained to generate text representing the reason.

In some embodiments, the reason may be determined using a text-to-text generation model. This can be done using a bi-directional transformer model's ability to summarize and generate text based on examples provided to it. Examples may be provided to it to learn how to summarize the reason through the examples, like the following:

| Metadata (Input) | Reason (text) |
|---|---|
| Timestamp: Nov. 16, 2023 1:45pm<br>User: c6f93c98-8909-4102-9444-a2c48827973c<br>Application: internalapp.com<br>Screen Title: Claim<br>Action: Keystroke<br>Field Name: Destination<br>Field Value: PA<br>Field Type: Input<br>Business Object: Purchase Order | The user needs to update the destination in the claim before it can be completed. |
| Timestamp: Nov. 16, 2023 1:45pm<br>User: c6f93c98-8909-4102-9444-a2c48827973c<br>Application: internalapp.com<br>Screen Title: Create Purchase Order<br>Action: Click<br>Field Name: Order Type<br>Field Value: Auto<br>Field Type: Dropdown<br>Business Object: Purchase Order | All Purchase Orders require an Order Type for them to be completed. |
| . . . | . . . |

It should be appreciated, however, that an intent can be determined by prompting an LLM (either by zero-shot or few-shot prompting), as described above, instead of training a separate text-to-text generation model as described by way of example in this section.

Reason Determination

As described herein, in some embodiments, metadata associated with an event may be processed using a trained ML model to determine a reason associated with the event. In some embodiments, an LLM may be used for this In some embodiments, the determined business object, activity, and/or intent may also be used for determining the reason and the determined business object, activity, and/or intent may also be provided as input to the model.

When providing the input to training of the model, it can be such that each of the entities in the metadata are concatenated together and comma separated so that the model is able to distinguish each of the features during training. Training such a text generation model with a bi-directional transformer like BERT, would look like the following which is an example for the Huggingface platform but catered to the example data:

Generating Textual Summaries of Steps

Having described a variety of techniques for generating textual summaries of individual events, we now describe

```
from transformers import AutoTokenizer
from transformers import AutoModelForSeq2SeqLM, Seq2SeqTrainingArguments, Seq2SeqTrainer
# Start with a smaller model for fine-tuning such as T5 Small
checkpoint = "t5-small"
tokenizer = AutoTokenizer.from_pretrained(checkpoint)
# Data for training...
training_data = [{
'text': 'Timestamp: Nov 16, 2023 1:45pm, User: c6f93c98-8909-4102-9444-a2c48827973c, Application:
internalapp.com, Screen Title: Claim, Action: Keystroke, Field Name: Destination, Field Value: PA, Field
Type: Input, Business Object: Purchase Order',
'summary': 'The user needs to update the destination in the claim before it can be completed.'
}, ...]
prefix = "summarize: "
def preprocess_function(examples):
    inputs = [prefix + doc for doc in examples["text"]]
    model_inputs = tokenizer(inputs, max_length=1024, truncation=True)
    labels = tokenizer(text_target=examples["summary"], max_length=128, truncation=True)
    model_inputs["labels"] = labels["input_ids"]
    return model_inputs
tokenized = training_data.map(preprocess_function, batched=True)
model = AutoModelForSeq2SeqLM.from_pretrained(checkpoint)
training_args = Seq2SeqTrainingArguments(
    output_dir="reason_model",
    evaluation_strategy="epoch",
    learning_rate=2e-5,
    per_device_train_batch_size=16,
    per_device_eval_batch_size=16,
    weight_decay=0.01,
    save_total_limit=3,
    num_train_epochs=4,
    predict_with_generate=True,
    fp16=True,
    push_to_hub=True,
)
trainer = Seq2SeqTrainer(
    model=model,
    args=training_args,
    train_dataset=tokenized["train"],
    eval_dataset=tokenized["test"],
    tokenizer=tokenizer,
    data_collator=data_collator,
    compute_metrics=compute_metrics,
)
trainer.train( )
```

After training has been completed, the custom and fine-tuned text generation model may be used to determine reasons like the following:

from transformers import pipeline
    summarizer=pipeline            ("summarization",
        model="reason_model")
    summarizer ("Timestamp: Nov. 16, 2023 1:45 pm, User:
        c6f93c98-8909-4102-9444-a2c48827973c,    Applica-
        tion: internalapp.com, Screen Title: Claim, Action:
        Keystroke, Field Name: Destination, Field Value: PA,
        Field Type: Input, Business Object: Purchase Order")
    Which would then, for example, produce a reason such as:
    "The user needs to update the destination in the claim
        before it can be completed."

While an example using metadata associated with a single event during the training is provided, it is also possible to train the same text generation model on metadata associated with multiple events so that it can generate a reason with more business context.

It should also be appreciated, that a reason can be determined by prompting an LLM (either by zero-shot or few-shot prompting), as described above, instead of training a separate text-to-text generation model as described by way of example in this section.

techniques for generating textual summaries of sets of events. A process performed by a user may have multiple steps and at least some of the steps may be composed of multiple events—each corresponding to a respective interaction between the user and his/her computing device as part of performing the step. Accordingly, in some embodiments, a step may be composed of multiple interaction events and the textual summaries generated for each of the multiple interaction events may in turn be used to generate a textual summary for the step.

Figure 8:
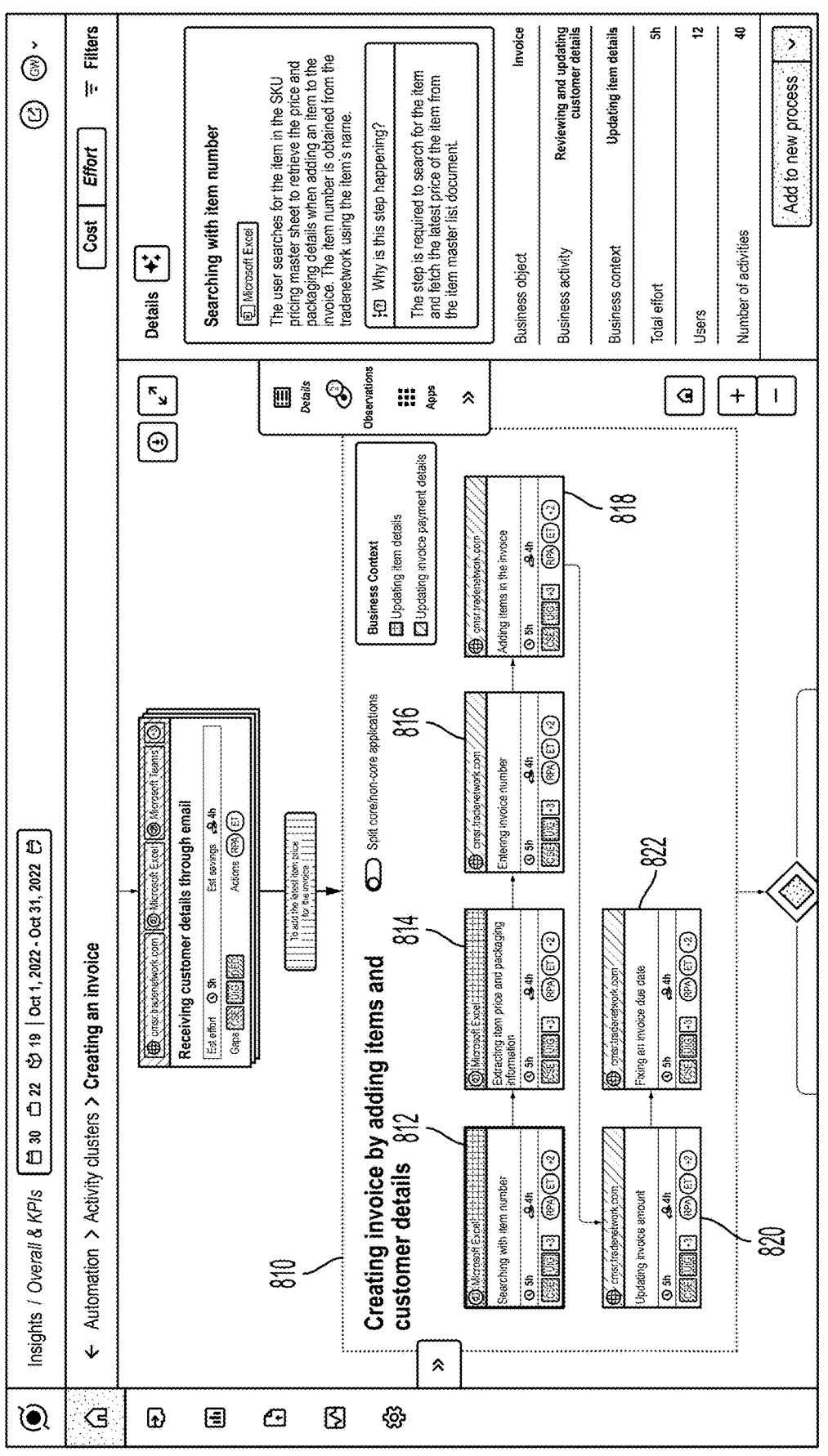
FIG. 8 illustrates a screenshot showing textual summaries of events and steps associated with a process, in accordance with some aspects of the technology described herein.

In some embodiments, two or more events in the multiple events in the stream of events associated with a process may be grouped into a step. A textual summary of the step may be generated using the textual summaries of the two or more events. FIG. 8 is a screenshot displaying multiple events 812, 814, 816, 818, 820, 822 grouped into a step 810.

As shown in FIG. 8, events 812, 814, 816, 818, 820, 822 are displayed with captions such as "Searching with item number", "Extraction item price and packaging information", "Entering invoice number", "Adding items in the invoice", "Updating invoice amount", and "Fixing an invoice due date." Each caption is generated based on the textual summaries generated for the respective event. For example, the caption for each event may include the activity only with some of the metadata about the event to help provide more business context for the user. Additionally, on the right-hand side, description about a selected event, such as "Searching with item number" may be provided. Below the description, the "Reason" determined as described herein may be provided. This reason suggests why the user may have performed that event, in the context of the other event(s) that have occurred around it.

Multiple events are grouped together by a step, in this example called "Creating invoice by adding items and customer details." This is a grouping that is created by the models with a summarization for the group. However, this grouping we refer to as a step, and steps contain metadata associated with multiple events. Inside a step there may be events with their own contextualized information, and the step itself can have sub-grouping inside of it based on the business context for the individual events as shown below by the two groupings of business context such as 'Updating item details' and 'Updating invoice payment details.' A first sub-grouping may include events 812 and 814 and a second sub-grouping may include events 816, 818, 820, and 822.

Grouping multiple events into a step may be performed in a variety of different ways. One approach is to specify rules defining step boundaries and to use those rules to group the observed events into steps. The rules may leverage entity values determined for individual events, as described herein. For example, the rules may leverage business object, activity, and intent that were determined as follows:

Example Rule 1 (Activity): If two consecutive events are associated with performance of the same activity, then the two events should be grouped as part of the same step. A boundary should not be created.

Example Rule 2 (Intent): If two consecutive events are associated with the same intent (e.g., even if the activity is different), then the two events should be grouped as part of the same step. A boundary should not be created.

Example Rule 3 (Business object): If two consecutive events are associated with different business objects, then the two events should not be grouped as part of the same step and a boundary should be created, as the work is changing.

Figure 9:
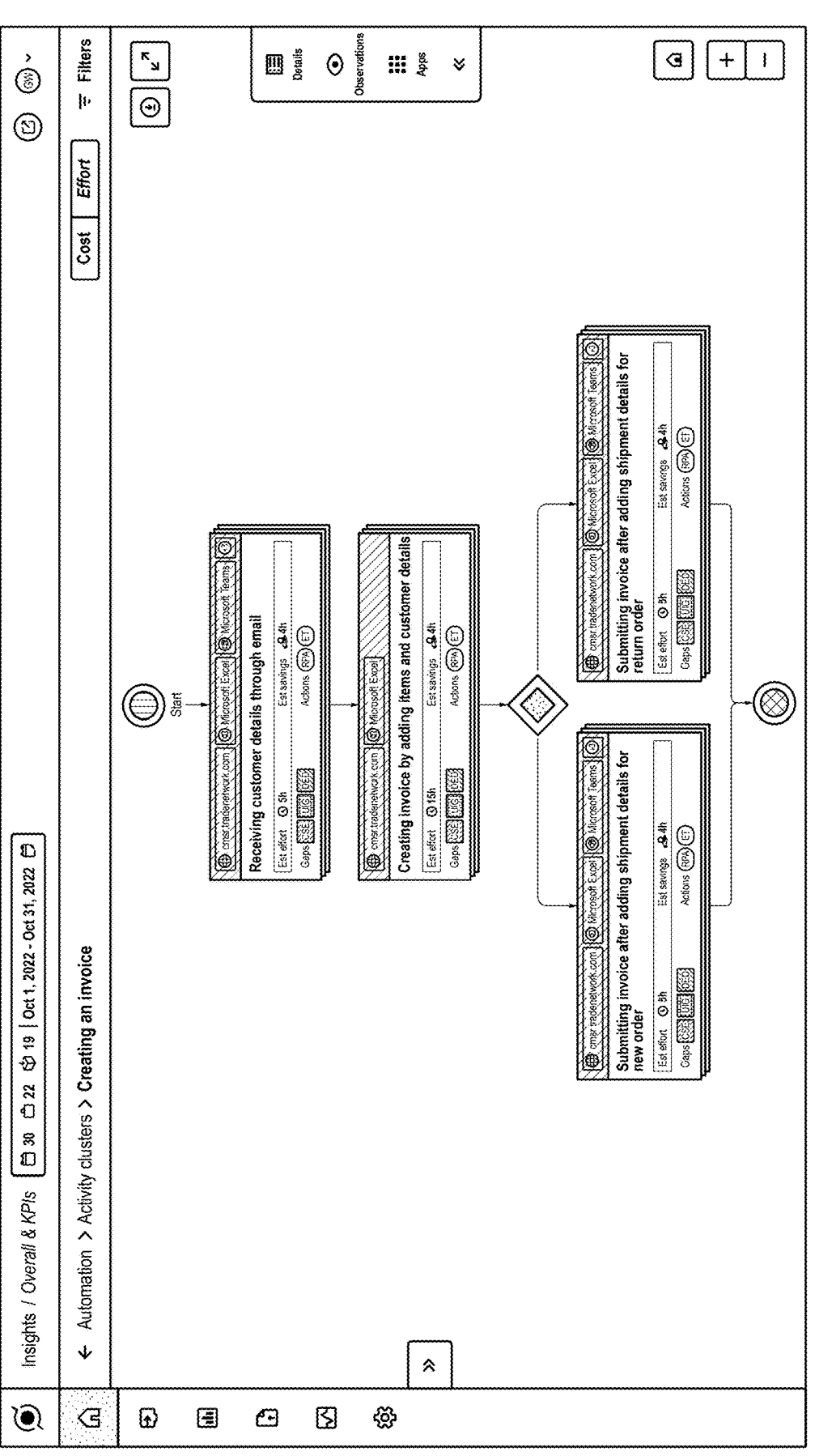
FIG. 9 is a screenshot showing how events are grouped into steps, in accordance with some aspects of the technology described herein.

In the above example, what ends up grouping the events into the "Creating invoice by adding items and customer details" is that all of these events were operating on the same business object, and what is shown in the screenshot of FIG. 9 is that the Business Object changes from Invoice to an Order in the steps. Prior to the step dealing with the Invoice, the user was working with an E-Mail. This shows the example of how events can be grouped into Steps using logic as described above.

In addition to or instead of using a rule-based approach (e.g., based on entity values), in some embodiments, events may be grouped into steps using machine learning models. For example, a large language model may be used to group events by being prompted to do so.

There are many possible prompts that can be used for grouping, of which a few examples are provided below. The structure of the prompt is generally to give the list of events to the prompt and to ask the model to group them together logically. For example:

A user took the following Interactions as enumerated below. Can you group the Interactions together logically, based on the business activity being performed such that there are a smaller number of Interactions in the end?

Interaction 1. Reviewing an email asking for information about a patients claim

Interaction 2. Connecting to a Claims DB for pulling up relevant records.

Interaction 3. Opening a SQL query file for fetching additional claims for auditors Interaction 4. Reviewing the queries in the SQL query file for fetching additional claims for auditors Interaction 5. Querying and selecting a Patient ID from the additional claims for a patient.

Interaction 6. Selecting an "Outpatient Letter" document for the patient.

Interaction 7. Reviewing the "Outpatient Letter" document for the patient.

Interaction 8. Loading and reviewing "unscheduled claims" for the patient with the Patient ID retrieved from the patient DB In this example, the LLM can respond as follows:

Certainly! Based on the business activity being performed, we can group the interactions as follows:

Group 1: Information Retrieval and Review

Interaction 1: Reviewing an email asking for information about a patient's claim Interaction 2: Connecting to a Claims DB for pulling up relevant records Group 2: Auditing Additional Claims Interaction 3: Opening a SQL query file for fetching additional claims for auditors Interaction 4: Reviewing the queries in the SQL query file for fetching additional claims for auditors Interaction 5: Querying and selecting a Patient ID from the additional claims for a patient.

Group 3: Document Retrieval and Review

Interaction 6: Selecting an "Outpatient Letter" document for the patient.

Interaction 7: Reviewing the "Outpatient Letter" document for the patient.

Group 4: Reviewing Unscheduled Claims

Interaction 8: Loading and reviewing "Unscheduled Claims" for the patient with the Patient ID retrieved from the patient DB.

As such, the LLM was able to produce a grouping of the events which could then be translated into a group of steps. The grouping provided is also reasonably logical. Also, the LLM provided a name for the group such as "Information Retrieval and Review" which can be used for the name/caption of the step.

Generating Textual Summaries of Processes

In some embodiments, along with the textual summaries of individual interaction events and groups of interaction events (steps) in a process, a textual summary of the overall process that the user followed while performing the events/steps may be generated. An example of this is shown in the top-left of the screenshot of FIG. 10, where the textual summary of the process is indicated as, "Creating an invoice" and has a detailed description below it that states "It seems that this group of activities involves users . . . ."

In some embodiments, this may be performed using a machine learning model, such as a large language model. Indeed, the inventors have appreciated that the summarization capabilities of large language models may make them especially suitable for such tasks. To this end, an LLM may be prompted with textual summaries of interaction events and/or steps along with a request for the LLM to produce a description of the entire process.

As one example, an LLM may be prompted with textual summaries of steps as follows:

A process contains the following Steps, can you please provide a one-paragraph summary of them?

Receiving customer details through email.

Creating invoice by adding items and customer details.

Submitting invoice after adding shipment details for new order.

Submitting invoice after adding shipment details for return order.

In this example, the LLM may respond with the following textual description of the process:

The process begins with the reception of customer details via email. Upon receipt, the next step involves creating an invoice by incorporating both the customer information and relevant items. For a new order, the subsequent step is to submit the invoice after including shipment details, ensuring a comprehensive record of the transaction. Similarly, for return orders, the process involves submitting the invoice after appending the pertinent shipment details, completing the necessary documentation for the return order. This sequence of steps outlines the streamlined workflow of receiving customer details, generating invoices, and finalizing them with shipment details for both new and return orders within the described business process.

Inferring the 'Reasons' between Events and Steps

Figure 11:
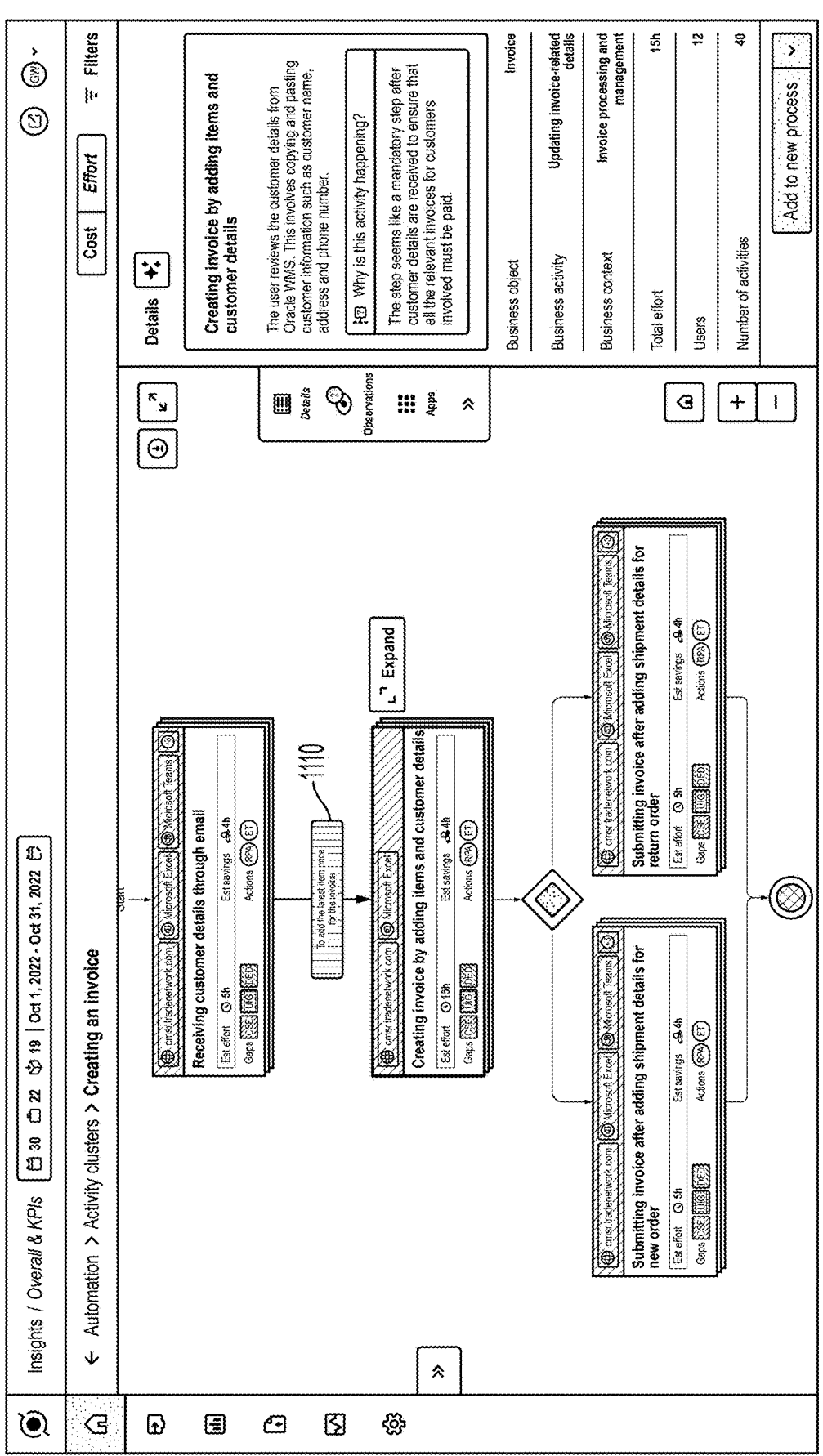
FIG. 11 is a screenshot showing a reason for going between steps of a process, in accordance with some aspects of the technology described herein.

The techniques described herein for determining a reason associated with an event may be used to derive reasons that a user may transition from one step to another step or from one event to another. As shown in the screenshot of FIG. 11, a box 1110 with the caption "To add the latest item price for the invoice" is provided. This is the reason the user goes from performing the step "Receiving customer details through email" and "Creating invoice by adding items and customer details."

Another example of providing the reason between steps is shown in the screenshot of FIG. 12, where there can be reasons between two steps (e.g., reason 1210) and before/after decision points (e.g., reasons 1220, 1230, and 1240) in a process. The decision point is shown as a diamond in the graph. There is a reason 1220 leading into the decision, and then the possible decisions are annotated with reasons 1230 and 1240 themselves. This is possible by looking at the event or step that occurred before, the reason for the decision, and then the resulting step that occurs after that path in the decision.

Figure 13:
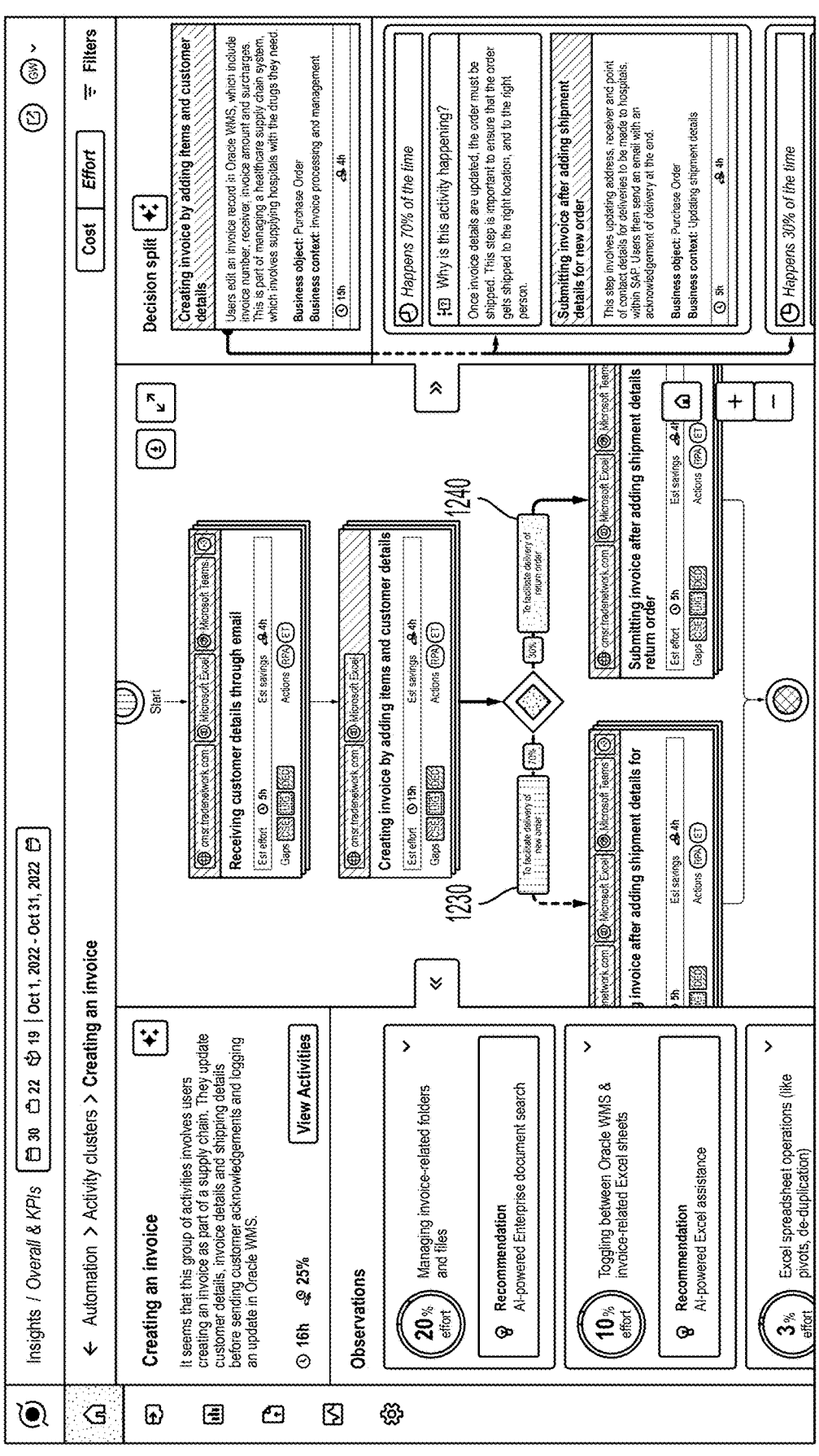
FIG. 13 is a screenshot showing a decision point in a process, the reasons for different decisions to be made at the decision point, and the respective probabilities of the different decisions being made, in accordance with some aspects of the technology described herein.

In some embodiments, the decision points and their reasons may be annotated with some probability of them occurring as shown in the screenshot of FIG. 13. For example, reason 1230 may be annotated with a probability of 70% and reason 1240 may be annotated with a probability of 30%.

The manner in which the reasons between events/steps is determined is very similar to how the reason associated with a single event is determined as described herein. A deep learning model as described herein for determining business object, activity, intent, and/or reason associated with event(s) or an LLM may be used to produce the reason using the same techniques described. However, instead of providing the context of all of the steps or events that happened before, the details between the two steps or two events that we want to derive the reason between may be provided. An example prompt provided to an LLM is as follows:

A user performed a step in a business process "Receiving customer details through email" and then performed the step "Creating invoice by adding items and customer details." Why might the user have performed the first step followed by the second step? Tell me in one sentence, no more than 10 words.

The LLM, such as Llama 2 may respond with:

Gathering customer details before creating an invoice

If individual events that are inside the step are added to the prompt, it can help the LLM produce a better reason as well between the two steps.

Deriving Reason Flow

As shown in FIGS. 11, 12, and 13, reasons are determined for transitions between two events and two steps. In some embodiments, a Reason Flow may be derived from these reasons. The Reason Flow is a graph that shows only the reasons that existed between each of the events or each of the steps. An example graph is shown in FIG. 14.

The Reason Flow may be created in a few ways. One of which is to create the reasons between each of the events and each of the steps as shown in FIGS. 11, 12, and 13, and then to remove all events and steps from the graph, which will leave only the nodes in the graph that were Reasons between events or steps. Alternatively, one could generate the Reason Flow bespoke by just iterating over all of the events and reasons, and then creating the graph with the resulting reasons.

Figure 14:
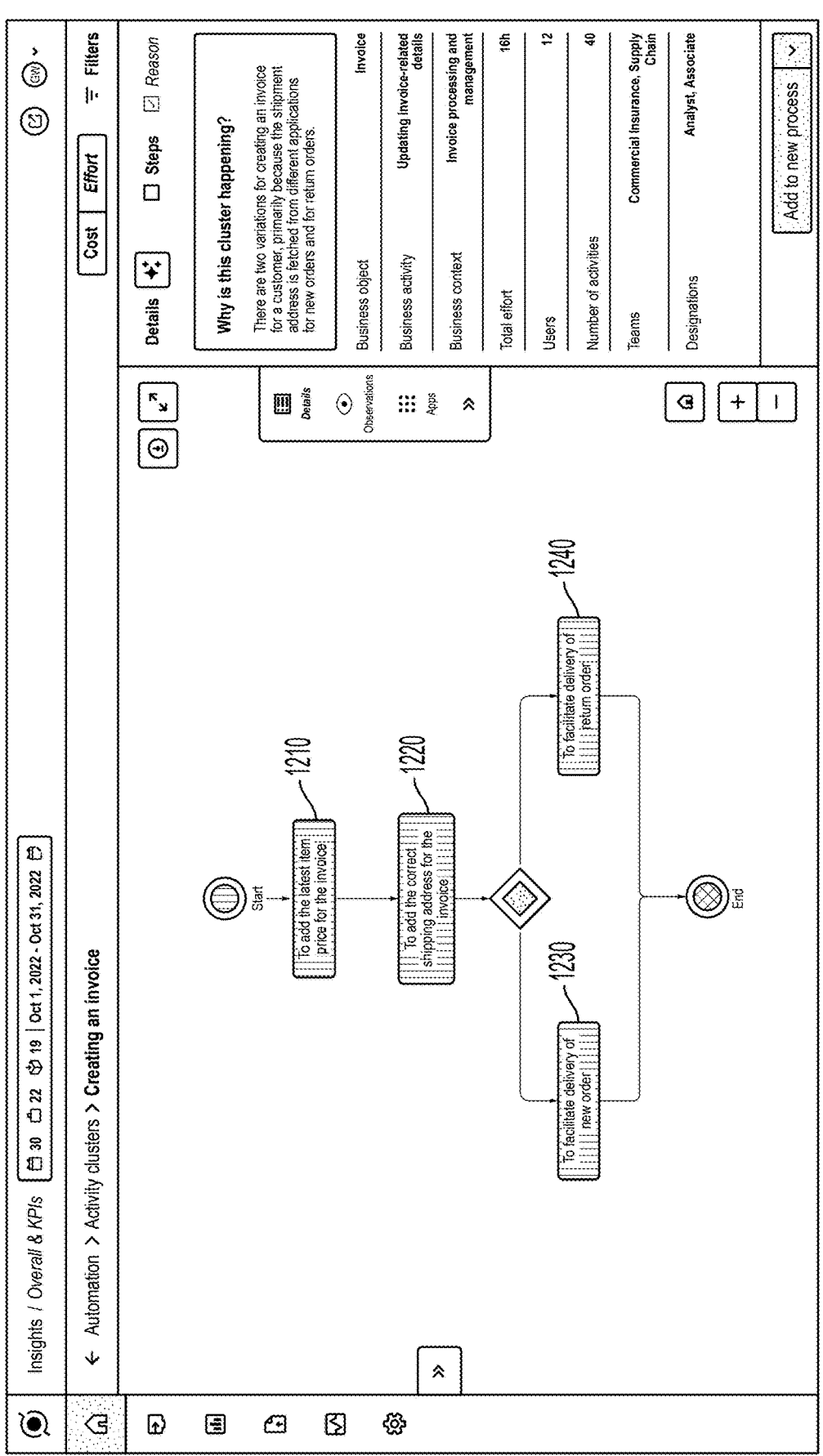
FIG. 14 is a screenshot of a reason flow graph, in accordance with some aspects of the technology described herein.

In some embodiments, clicking on any particular reason of the reasons in the Reason Flow of FIG. 14, would cause a display of all of the steps, events, documents, etc., that are related to that particular reason.

Using Summarization to Discover Work Patterns

The techniques described herein leverage machine learning to generate textual summaries of multiple events occurring in a process. These textual summaries, in turn, can be used to generate textual summaries of process steps (groups of events) and/or the process overall.

However, generating a textual summary of a process from the textual summaries of interaction events yields meaningful results when the multiple events being analyzed are indeed part of the same underlying process being performed by the user. Thus, prior to generating textual summaries of a process from textual summaries of individual interaction events it may be helpful to confirm whether the multiple events are indeed part of the same underlying process.

Methods for identifying events that form part of the same underlying process may be referred to as "process discovery". Any suitable process discovery techniques may be used to identify multiple events as part of a single process such that these events may be further analyzed using techniques described herein to generate a textual summary of the process. For example, any of the process discovery techniques described in: (1) U.S. Pat. No. 11,816,112, titled "SYSTEMS AND METHODS FOR AUTOMATED PROCESS DISCOVERY," granted on Nov. 14, 2023, filed on Apr. 2, 2021; (2) U.S. Pat. No. 12,020,046, titled "SYSTEMS AND METHODS FOR AUTOMATED PROCESS DISCOVERY," granted on Jun. 25, 2024, filed on Apr. 1, 2022; and (3) PCT Application PCT/IN2024/050370, titled "MACHINE LEARNING SYSTEMS AND METHODS FOR AUTOMATED PROCESS DISCOVERY," filed on Apr. 10, 2024, may be used.

However, in addition, some of the techniques described herein can also be used to help identify sets of events part of the same underlying process. For example, entity values identified for individual interaction events, textual summaries of individual interaction events, and/or textual summaries of steps (i.e., groups of events) may be used to identify sets of events part of the same underlying process. For example, textual summaries for events or steps may be encoded to obtain corresponding numeric embeddings. These numeric embeddings of summaries can be used together with (e.g., they augment) the numeric embeddings of interaction data to identify groups of events part of the same underlying process.

As one example, PCT Application PCT/IN2024/050370, titled "MACHINE LEARNING SYSTEMS AND METH-ODS FOR AUTOMATED PROCESS DISCOVERY," filed on Apr. 10, 2024, describes identifying sets of events part of the same underlying process by: (1) obtaining metadata for interaction events; (2) generating numeric representations of the interaction events (and/or groups thereof); and (3) group-ing events together based on a measure of similarity between the numeric representations obtained at step (2) and numeric representations of events and/or groups of events in one or more taught process instances. The numeric representations generated at (2) may be numeric representations of interac-tion metadata (e.g., attribute-value pairs). These may be further augmented with numeric representations of event or step summaries, which would improve accuracy of identi-fying groups of events part of the same process. This embeds business context into the process of identifying events part of the same process, thereby improving performance.

Figure 15:
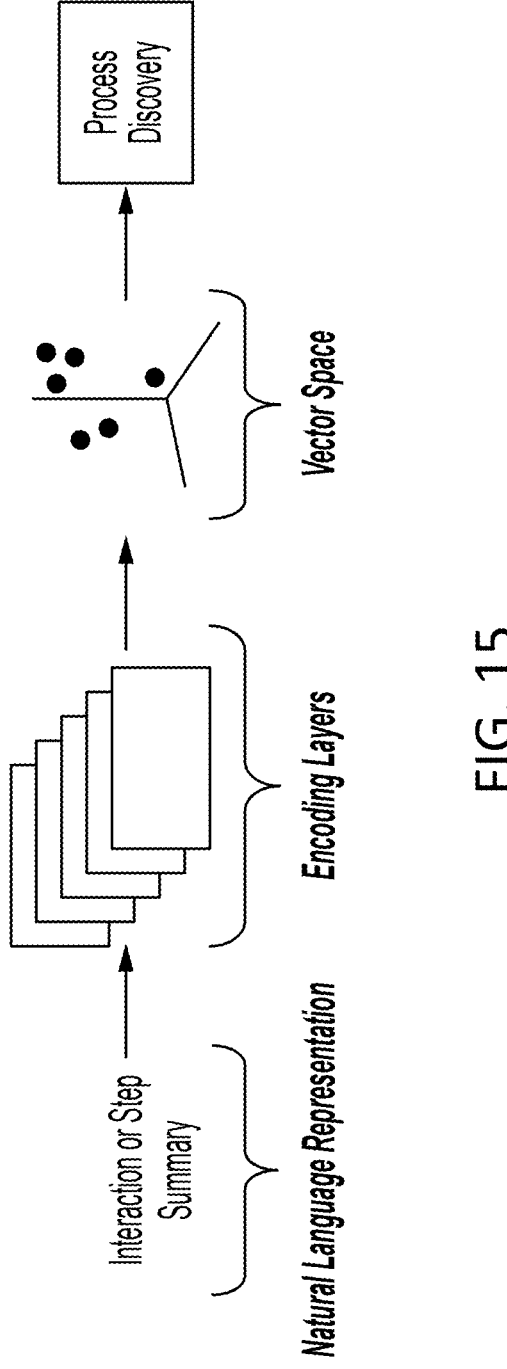
FIG. 15 is a diagram showing use of vectorized representations of textual summaries of events/steps for process discovery, in accordance with some aspects of the technology described herein.

In the diagram shown in FIG. 15, we highlight the stages. First, a textual summary of interaction event or a step (multiple interaction events) is encoded to produce a corre-sponding vector representation. This could be performed by using, for example, a sentence embedding model (e.g., SBERT). The resulting vector representation can be used together with vector representations produced by encoding interaction data directly to identify groups of events part of the same process, for example, by comparing to embeddings of groups of events obtained by encoding interaction data gathered and textual summaries generated during one or more instances of the process being taught.

Relationship Among Entities

Another capability enabled by the technology described herein is the ability to track and describe the relationship between any two Entities. For example, the relationship between two documents, or a team and a document, or a process and a document, or a process and an application.

Example Relationships

Since there are many Entity×Entity combinations, we do not list all of them but rather use the above table to show how one could take any two instances of two Entities to try to better understand their relationship with each other. How the relationship is described depends on those two entities, as shown above.

The relationship between Entities may be derived as follows. First, track two Entities connectivity to each other by seeing Interactions or Steps adjacent to each other that contain the two entities. This creates a table where there are 3 things that are tracked. 1) The first Entity (e.g., a Docu-ment called 'May Tracker.xlsx'), 2) The second Entity (e.g., a Process called 'Sales Tracking'), and 3) The frequency of the relationship, i.e., how commonly they are seen between each other. The third piece of information allows us to track whether there is a relationship between the Entities and to what degree they are related. Embedded in the first two parts of the table related to the two Entities is also the type of the Entity by using an object type, as an example of the implementation.

For there to be a relationship between the two Entities, the frequency of the relationship should be at least 0 but a threshold that is non-zero may also be implemented to suggest that we will only state a relationship if there is a greater degree of connectivity between the two Entities. Then, a part of the product can query the relationship table with 2 Entities (e.g., 'May Tracker.xlsx' and 'Sales Track-ing' process) to determine whether or not they are related. If so, such that the relationship frequency is 0 or above some threshold, then we are able to search for Interactions and Steps that contain the two Entities within windows of time together to extract situations in which they are both used. A Large Language Model may be prompted describe the relationship by using prompts such as:

> There is a Document 'May Tracker.xlsx' that is used in a process 'Sales Tracking', and the Interactions in 'May Tracker.xlsx' are <natural language translation of Inter-actions>, can you please summarize the relationship between 'May Tracker.xlsx' and 'Sales Tracking'?

When the two Entities provided are of the same type, the Large Language Model may be queried to compare and

| Entity 1 | Entity 2 | Example Descriptions of the Relationship |
|---|---|---|
| Document | Process | Whether the Document is used in the given Process |
| | | How the Document is used in the Process |
| | | Information about how frequently the Document is used in the Process |
| Document | Step | How the Document is used in the given Step |
| | | All of the Documents used in a given Step |
| | | Reason why the Document is accessed in a given Step |
| Process | Process | Any Documents, Interactions, Steps, etc. that are shared by the two given processes |
| | | Whether the two Processes are related to similar business outcomes |
| | | Whether one Process typically follows the other Process |
| View | Process | The purpose of the View for the given Process |
| | | What fields are edited in the given View for a given Process |
| | | All of the processes that use a particular View |
| Variation | Variation | The similarity between two given variations |
| | | The difference between two given variations, i.e., what is unique about one Variation from the other. |
| . . . | . . . | . . . | contrast them, which for example can lead to describing similarities or differences in Variations:

There is a Variation of the process that contains the following Interactions: <natural language translation of Interactions>, and another Variation of the process that contains the following Interactions: <natural language translation of Interactions>. Can you please provide two summaries, one that describes how they are similar and one that describes how they are different?

In all of these examples, Steps could be given instead of Interactions. And instead of Variations it could be two Processes, two Documents, two Interactions, two Steps, etc. What is being done is deriving the relationship between the Entities by asking the language model to summarize how similar or different they are.

Relating Business Problems to Interaction Data

Another way of improving the business understanding of interaction data is to connect it to the business problems that teams face, and in doing so also provide them a root cause of the business problems down to the interaction data. With the help of large language models and the summaries associated with the interaction data we can now relate the two better.

As an example, there is an Accounts Payable team in Finance that has had Interaction data collected and augmented with all of the business understanding such as Business Objects, Intent, etc. This team is experiencing a high cost of goods and services and wants to better understand why that might be the case and what can be done to improve it. What the Interaction data augmented with the business understanding provides is what is like a detailed series of documentation day-to-day of what actions the team is performing in relation to Business Objects such as Invoices and the processes they are performing such as payment-related processes. These are specifics to this organization and how they perform their processes. This is the first component of relating business problems and potential recommendations based on them to a particular team and how they perform their work. The second component is the generalized understanding of a language model that might understand common issues that lead to broader business problems. In this example, the broader business problem that the team wants to understand is a high cost of goods and services.

To understand the second component a large language model may be queried such as:

What are common issues that can lead to a high cost of goods and services for an Accounts Payable team in the Finance department related to processing done in software systems?

As an abbreviated response to what the LLM gives:

Several factors can contribute to a high cost of goods and services for an Accounts Payable (AP) team in the Finance department when it comes to processing done in software systems. Here are some common issues:

Inefficient Software Systems:

Lack of Automation: If the AP software lacks automation features, manual data entry and processing can lead to higher labor costs and increased error rates.

Outdated Technology: Using outdated or legacy systems can result in slower processing times and increased maintenance costs.

Manual data entry: Human errors in data entry can lead to discrepancies, payment delays, and the need for manual corrections.

Data Entry Errors:

Manual Input Mistakes: Human errors during data entry can lead to incorrect invoice information, requiring additional time and resources to rectify.

Duplicate Payments: Failing to detect and prevent duplicate payments can result in financial losses.

Incomplete or Inaccurate Vendor Data:

Inadequate Vendor Information: Missing or inaccurate vendor details can lead to delays in processing and increased time spent on communication to resolve issues.

Poor Integration with Other Systems:

Lack of Integration: Inability to integrate with other financial systems, ERP (Enterprise Resource Planning), or procurement tools can lead to disjointed processes and increased manual intervention This shows the large language model's ability to summarize how this particular team and their work relates to the business problem they are interested in. For example, "manual data entry" can lead to higher cost of goods and services which lead to discrepancies, payment delays, and needs for manual corrections. Now, a goal is to connect the actual work that they perform and how they perform with this particular business problem so that they can understand what leads to the problem. Additionally, later to provide recommendations for them. In this example, the Interaction data points to where there is substantial manual data entry. This can be gleaned from the actual inputs that the team is providing. The interaction data shows where they are providing substantial amounts of manual data entry via the clicks and keystrokes that they are taking in business applications and document-based applications like Word or Excel.

These two can be connected in the example that was given in two ways. We can a-priori template and map these business problems to what they look like in Interaction data, like what manual data entry looks like. However, we can also leverage the large language model again to create this connection by providing the summarized Interactions or Steps to the language model and asking it like this:

Can you tell me if a human was taking these steps in software systems, is it Manual Data Entry? "Extraction item price and packaging information", "Entering invoice number", "Adding items in the invoice", "Updating invoice amount", and "Fixing an invoice due date."

The language model responds with:

Yes, the steps you mentioned would generally be considered as manual data entry tasks when performed by a human in software systems.

This is a scalable and dynamic way of connecting summarized Interactions and Steps, even in their brief forms as shown above with the business challenges that teams face to ultimately show them where the team's work is impacting business objectives and business problems. This is ultimately like a root cause analysis of business problems that the team may be inquiring about, with in-depth business understanding how they perform work leads to these problems.

Since the Interaction data has information in it such as the amount of time they spend on performing certain Interactions and Steps, their impact on the business problem can be estimated. For example, that there are 100 hours of manual data entry per week, and thereby if the team is able to reduce these manual data entry hours it can lead them to a reduction in cost of goods and services.

Likewise, any additional filtering can be applied when querying about the relationship. Such as adding the following condition to better query about the relationship to a particular Business Object:

Can you tell me if a human was taking these steps in software systems, is it Manual Data Entry when filling out an Invoice? "Extraction item price and packaging information", "Entering invoice number", "Adding items in the invoice", Updating invoice amount", and "Fixing an invoice due date."

This could be done by including any of the additional business context that has been added when augmenting the Interaction data or Steps.

Figure 16:
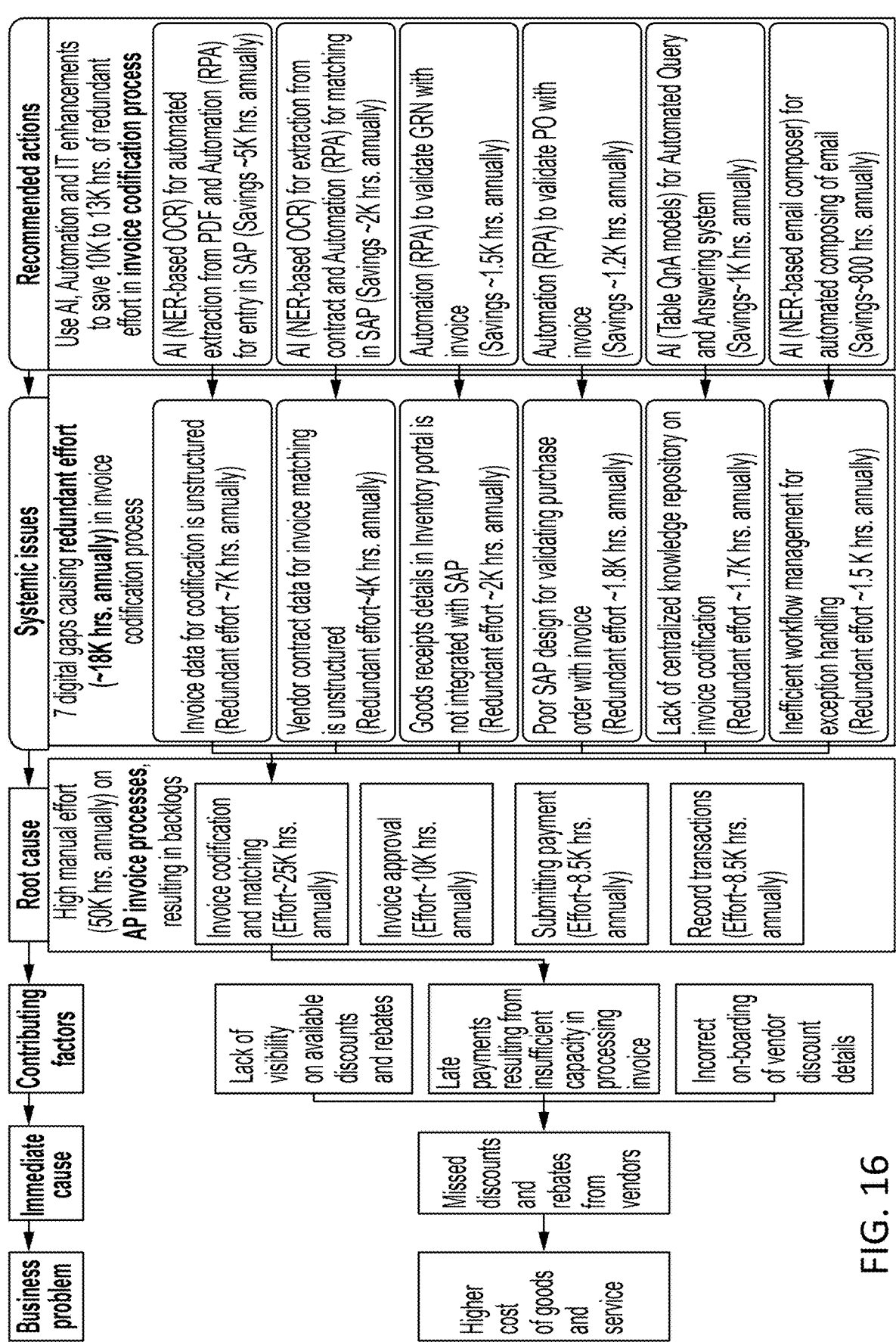
FIG. 16 shows a hierarchy of information from a business problem to its causes, factors that contribute to it, and a relationship to the metadata, in accordance with some aspects of the technology described herein.

FIG. 16 shows one example of how we can structure a hierarchy of information from a business problem down into causes, factors that contribute to it, and a relationship to the Interaction data. While an example of higher cost of goods and services is described, the flexibility of the large language model and the Interaction data is that other relationships of bespoke business problems that the teams want to learn more about may be derived and connected to the Interaction data to derive root causes with recommended actions for them. Recommended actions can be generated by connecting the large language model with the Interaction data again, by giving it where the manual interactions were in this situation which even has what fields were manually entered so that recommended actions can come from it (e.g., by recognizing that invoices are being interacted with and fields need to be extracted).

Searching Process/Tasks Based on Intent

Processes and Activities/Tasks that users perform are populated with significant amounts of business context as described herein. Although the Processes and Tasks contain significant amounts of business context, they become extremely difficult to search through and in particular to find ones that are relevant to particular initiatives. For example, many automation initiatives inside of organizations are run by individuals that may want to know which processes are good candidates for automation. Or an IT department that is looking to improve technology and applications internally may want to find where technology is hurting their team's productivity in Interaction data, which might show up as common Activities or Tasks that they perform where they have technology issues.

Using a deep learning or generative model, a search through the summaries of the processes may be enabled which also include bottlenecks and challenges that the team is facing. In the previous section, an example was given of how to describe problems that the team is facing by querying large language models like follows:

Can you tell me if a human was taking these steps in software systems, is it Manual Data Entry? "Extraction item price and packaging information", "Entering invoice number", "Adding items in the invoice", Updating invoice amount", and "Fixing an invoice due date."

The language model responds with:

Yes, the steps you mentioned would generally be considered as manual data entry tasks when performed by a human in software systems.

Therefore, summaries related to processes and activities may be generated which are like digests of information (like a 'wiki') which may be visible or non-visible to the user, like a knowledge base for processes, activities, documents, or any other entity that we have described. As described in the previous section, the time or effort associated with the Steps may also be determined which was the time the users spent performing those Steps or Interactions that belong to them. So for example, the Process or Activity that the Steps above belong to can have a statement like "This process contains manual data entry tasks when performed by a human in software systems and this manual effort accounts for 200 hours of your team's manual effort per month." Many statements like this will be generated per Process, Activity, Document, etc. to build a knowledge base for each of the Entities. Such that each entry, be it visible or not to the user will contain these statements which will be the basis for the knowledge base and resulting Intent-based search.

Figure 17A:
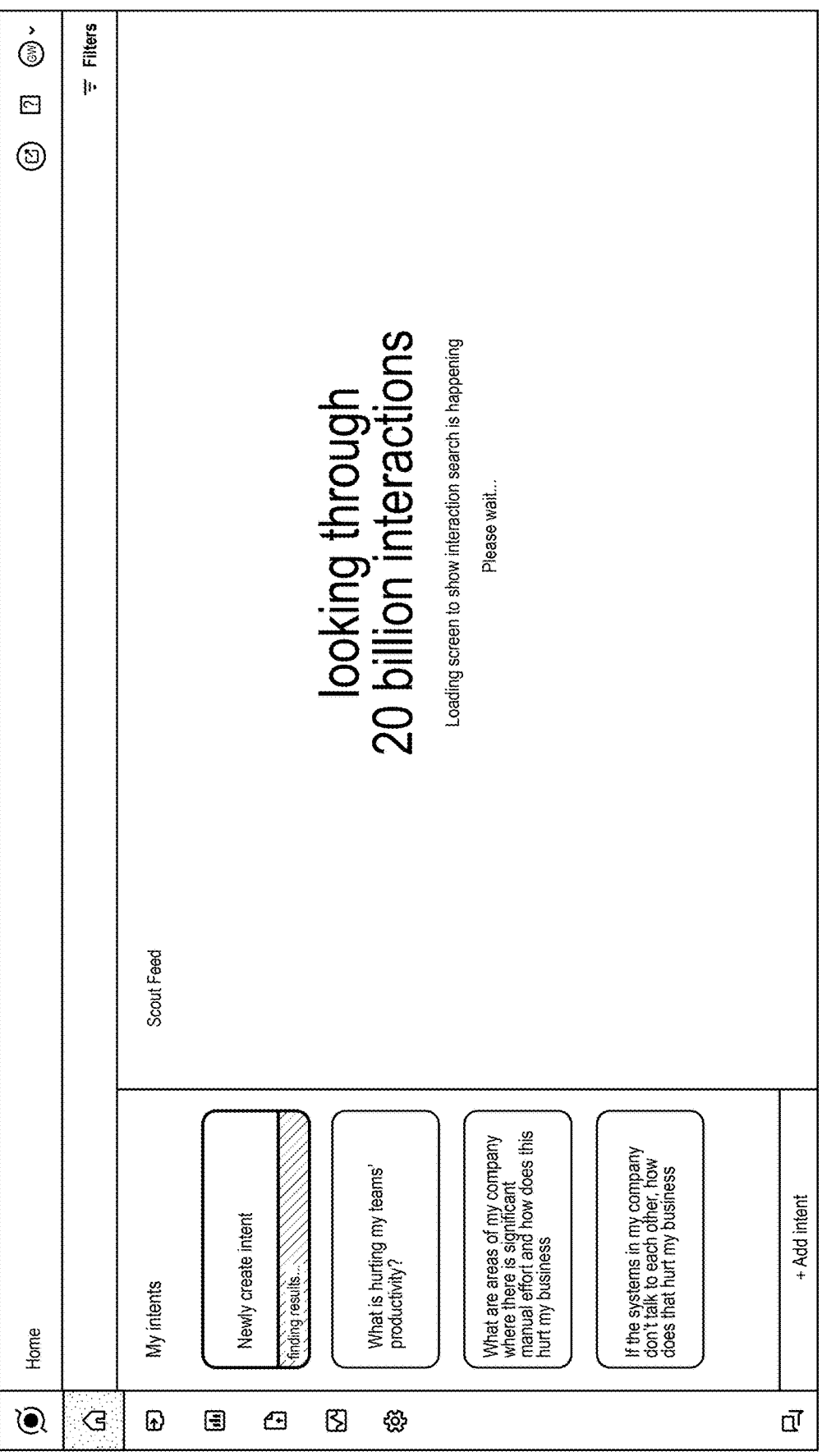
FIGS. 17A-17C are screenshots showing a search user interface that enables users to search through processes, activities, documents, and/or other entities by intent and impact to their team, in accordance with some aspects of the technology described herein.

This technology can enable a user experience like follows, which allows a user to search through their Processes, Activities, Documents, etc. by some Intent and impact to their team as shown in FIG. 17A.

Figure 17B:
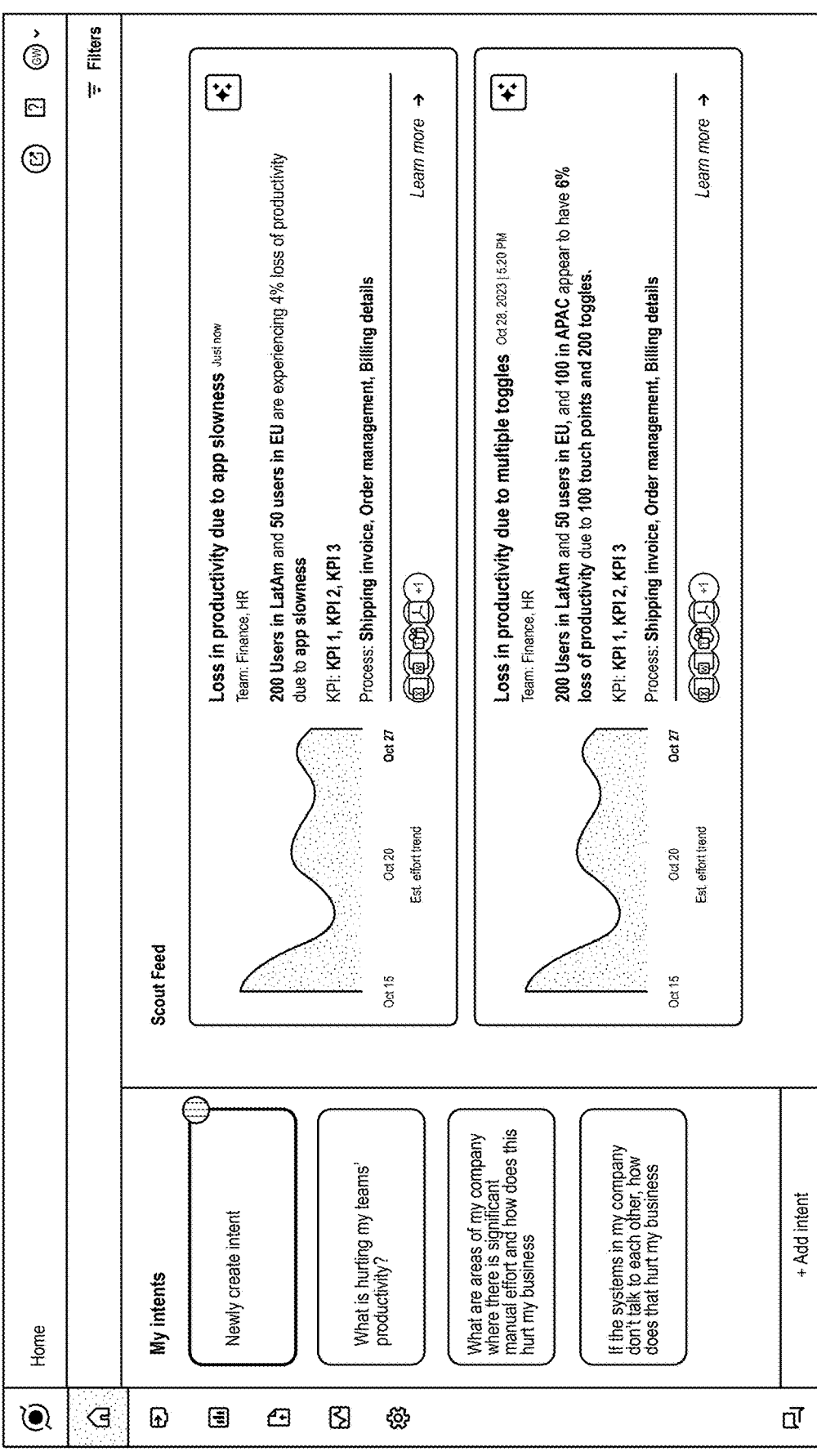
Figure 17C:
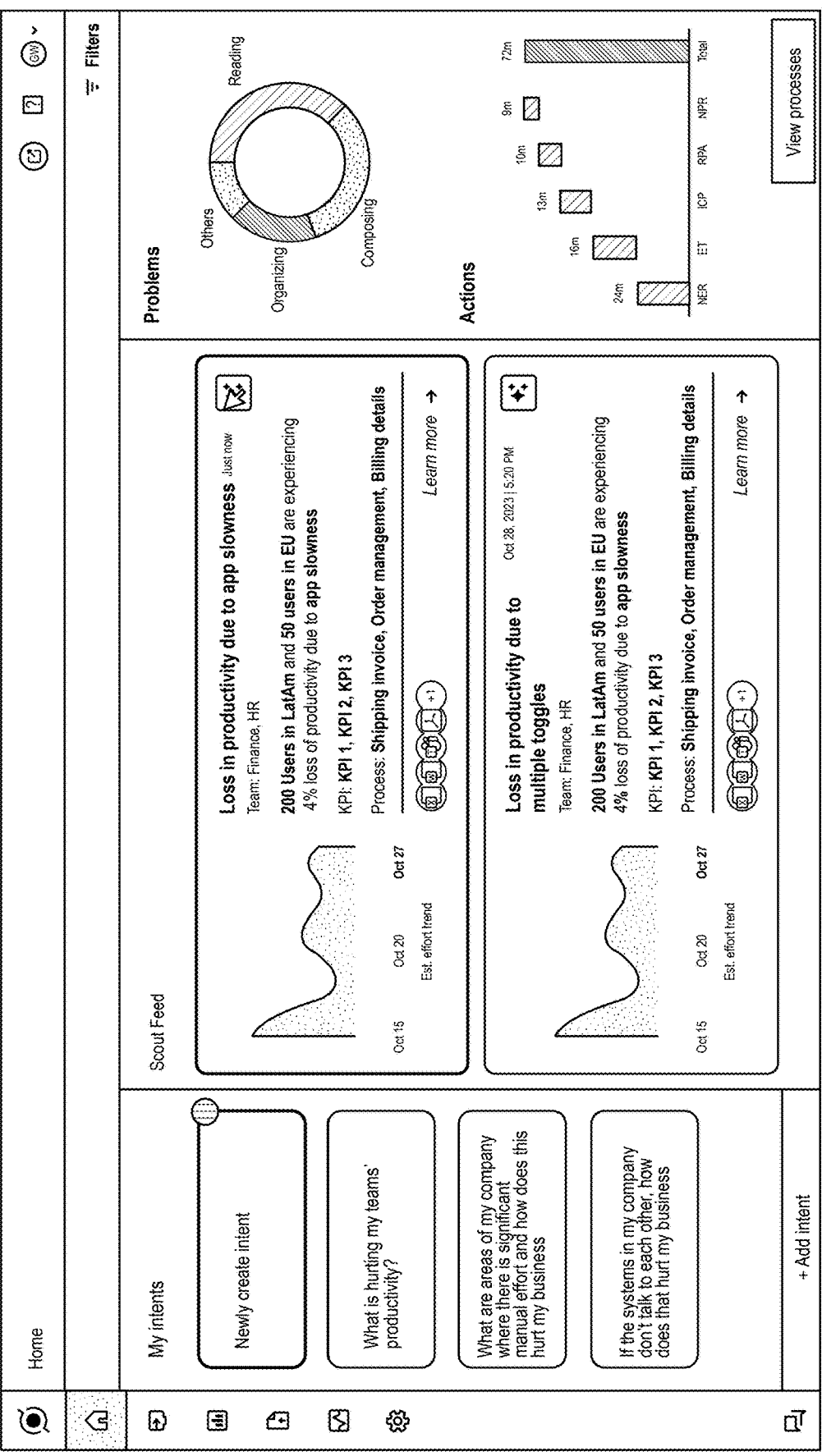

For each Intent or search, the knowledge base will be searched for any entry that matches that particular Intent. However, for each matching entry the resulting Entity will show up on the right-hand side in what is like a search result or a Feed for the user, as shown in FIGS. 17B and 17C.

How this works is as follows. Again, we will have a summary describing the problems, challenges, statistics, etc. all generated by techniques described herein. One such entry may contain the statement described (and how it is generated) previously like: "This process contains manual data entry tasks when performed by a human in software systems and this manual effort accounts for 200 hours of your team's manual effort per month."

Now, when a user adds an intent like: "What processes contain manual data entry that accounts for more than 50 hours of my team's effort?" Or "Show me processes where my teams have manual data entry" the large language model or a vector-based search may be used again to find Entities that match the desired intent that the user has described.

A simple implementation of this would be to iterate over all of the Entities in the knowledge base and their associated documentation while using the large language model or another deep learning model to check for a match, like follows:

Does this process match the following intent: "where my teams have manual data entry" where the knowledge of the process we have is: "This process contains manual data entry tasks when performed by a human in software systems and this manual effort accounts for 200 hours of your team's manual effort per month."

Where, 'process' was the entity, the 'intent' of the search was provided, and then the knowledge about the process is provided with the prompt as well. In doing so, the language model responds back with:

Yes, based on the provided information, the process aligns with the intent "where my teams have manual data entry." The knowledge about the process explicitly states that it contains manual data entry tasks performed by a human in software systems. The mention of "200 hours of your team's manual effort per month" further emphasizes the manual nature of the data entry tasks carried out by the team.

To more explicitly determine the match, and know whether to include the Process in the list of Intent matching results, the language model can be promped for a simple yes/no response which allows us to build the search results:

Does this process match the following intent: "where my teams have manual data entry" where the knowledge of the process we have is: "This process contains manual data entry tasks when performed by a human in software systems and this manual effort accounts for 200 hours of your team's manual effort per month." Please answer with only one word, yes or no.

The large language model responds: Yes

All of these techniques allow us to build up the capability of searching Entities in our work graph, with knowledge bases built from them, and providing users back with matches for the intent they provided. This helps users find Processes, Activities, Documents, etc. that meet particular criteria that they want to focus on, such as what processes are highly automatable, where they might have a lot of manual effort, where users conduct a lot of manual data entry, etc. How those results are ranked back to the user can be dependent on metrics they provide, such as if they asked about where large amounts of effort are spent the results can be ordered by the amount of effort spent.

Can you sort these results by order of most effort:

(A) "This process contains manual data entry tasks when performed by a human in software systems and this manual effort accounts for 200 hours of your team's manual effort per month."

(B) "This process contains manual data entry tasks when performed by a human in software systems and this manual effort accounts for 50 hours of your team's manual effort per month."

(C) "This process contains manual data entry tasks when performed by a human in software systems and this manual effort accounts for 10 hours of your team's manual effort per month."

The model will sort these, for sorting the results for the user:

Sorted by order of most effort:

(A) "This process contains manual data entry tasks when performed by a human in software systems and this manual effort accounts for 200 hours of your team's manual effort per month."

(B) "This process contains manual data entry tasks when performed by a human in software systems and this manual effort accounts for 50 hours of your team's manual effort per month."

(C) "This process contains manual data entry tasks when performed by a human in software systems and this manual effort accounts for 10 hours of your team's manual effort per month."

Other Implementation Details

Figure 18:
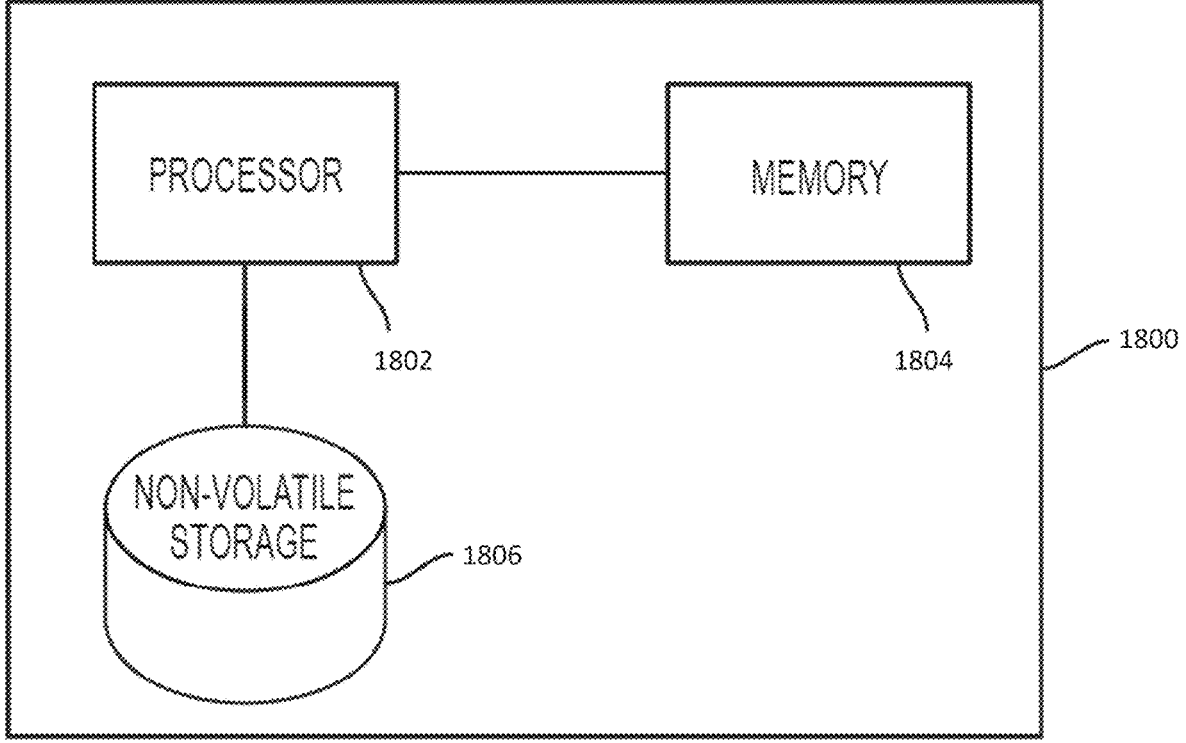
FIG. 18 schematically illustrates components of a computer that may be used to implement some embodiments described herein.

An illustrative implementation of a computer system 1800 that may be used in connection with any of the embodiments of the disclosure provided herein is shown in FIG. 18. For example, any of the computing devices described above may be implemented as computing system 1800. The computer system 1800 may include one or more computer hardware processors 1802 and one or more articles of manufacture that comprise non-transitory computer-readable storage media (e.g., memory 1804 and one or more non-volatile storage devices 1806). The processor 1802(s) may control writing data to and reading data from the memory 1804 and the non-volatile storage device(s) 1806 in any suitable manner. To perform any of the functionality described herein, the processor(s) 1802 may execute one or more processor-executable instructions stored in one or more non-transitory computer-readable storage media (e.g., the memory 704), which may serve as non-transitory computer-readable storage media storing processor-executable instructions for execution by the processor(s) 1802.

The terms "program" or "software" are used herein in a generic sense to refer to any type of computer code or set of processor-executable instructions that may be employed to program a computer or other processor to implement various aspects of embodiments as described above. Additionally, according to one aspect, one or more computer programs that when executed perform methods of the disclosure provided herein need not reside on a single computer or processor but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, for example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The phraseology and terminology used herein is for the purpose of description and should not be regarded as limiting. The use of "including," "comprising," "having," "containing," "involving," and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method of generating a textual summary of a stream of events corresponding to interactions between a user performing a process and one or more application programs executing on a computing device, the method comprising:

using at least one computer hardware processor to perform:

receiving information corresponding to the stream of events corresponding to the interactions between the user and the one or more application programs executing on the computing device, the information comprising, for each of multiple events in the stream of events associated with the process, metadata associated with the event, wherein metadata for a particular event specifies values for attributes of the particular event;

processing, using at least one machine learning (ML) model, the metadata associated with the multiple events in the stream of events to generate multiple corresponding textual summaries of the multiple events, the processing comprising:

for each particular event of the multiple events in the stream of events:

processing metadata associated with the particular event using the at least one ML model to determine a business object, an activity, an intent, and/or a reason associated with the particular event; and generating a textual summary of the particular event from the determined business object, activity, intent, and/or reason associated with the particular event; and generating, using the textual summaries of the multiple events, a textual summary of the process performed by the user through the interactions between the user and the one or more application programs executing on the computing device; and outputting the textual summary of the process, wherein the stream of events comprises a first event corresponding to an interaction between the user and an application program of the one or more application programs executing on the computing device, wherein the information comprises first metadata associated with the first event, and wherein the first metadata comprises values for one or more attributes selected from the group consisting of: a name of the application program, a title of an application program screen of the application program with which the user interacted during the first event, an identifier of a user interface element of the application program screen with which the user interacted, a type of the user interface element of the application program screen with which the user interacted, one or more identifiers for one or more user interface elements of the application program screen with which the user did not interact, a duration of the interaction, and one or more textual phrases and/or sentences appearing on the application program screen.

2. The method of claim 1, wherein:

the at least one ML model consists of a single ML model; and processing the metadata associated with the particular event comprises processing the metadata associated with the particular event using the single ML model to determine the business object, the activity, the intent, and/or the reason associated with the particular event.

3. The method of claim 1, wherein:

the at least one ML model comprises a first ML model and a second ML model different from the first ML model; and processing the metadata associated with the particular event comprises:

processing the metadata associated with the particular event using the first ML model to determine the business object associated with the particular event; and processing the metadata associated with the particular event using the second ML model to determine the activity associated with the particular event.

4. The method of claim 3, wherein:

the at least one ML model comprises a third ML model different from the first and second ML models and a fourth ML model different from the first, second, and third ML model; and processing the metadata associated with the particular event comprises:

processing the metadata associated with the particular event using the third ML model to determine the intent associated with the particular event; and processing the metadata associated with the particular event using the fourth ML model to determine the reason associated with the particular event.

5. The method of claim 1, wherein the at least one ML model comprises a large language model (LLM).

6. The method of claim 5, wherein the LLM is selected from the group consisting of: Llama3, Llama 2, Mistral, GPT-3, GPT-4, Bidirectional encoder representations from transformers (BERT), and Orca.

7. The method of claim 1, wherein:

the at least one ML model comprises a large language model; and processing metadata associated with the particular event using the at least one ML model comprises:

prompting the large language model with a natural language representation of the metadata associated with the particular event.

8. The method of claim 1, further comprising:

processing the metadata associated with the particular event using the at least one ML model to determine the activity associated with the particular event.

9. The method of claim 1, wherein the textual summary of the particular event comprises a natural language summary of the particular event and the textual summary of the process comprises a natural language summary of the process.

10. The method of claim 1, wherein generating the textual summary of the process comprises:

grouping two or more events in the multiple events into a step;

generating a textual summary of the step using the textual summaries of the two or more events; and generating the textual summary of the process using the textual summary of the step.

11. The method of claim 10, wherein grouping the two or more events comprises grouping, using a large language model, the two or more events into the step.

12. The method of claim 1, further comprising:

identifying, using the determined business object, activity, intent, and/or reason, the process in a second stream of events corresponding to interactions between the user and the one or more application programs executing on the computing device.

13. A system, comprising:

at least one computer hardware processor; and at least one non-transitory computer-readable storage medium storing processor executable instructions that, when executed by the at least one computer hardware processor, cause the at least one computer hardware processor to perform a method of generating a textual summary of a stream of events corresponding to interactions between a user performing a process and one or more application programs executing on a computing device, the method comprising:

receiving information corresponding to the stream of events corresponding to the interactions between the user and the one or more application programs executing on the computing device, the information comprising, for each of multiple events in the stream of events associated with the process, metadata associated with the event, wherein metadata for a particular event specifies values for attributes of the particular event;

processing, using at least one machine learning (ML) model, the metadata associated with the multiple events in the stream of events to generate multiple corresponding textual summaries of the multiple events, the processing comprising:

for each particular event of the multiple events in the stream of events:

processing metadata associated with the particular event using the at least one ML model to determine a business object, an activity, an intent, and/or a reason associated with the particular event; and generating a textual summary of the particular event from the determined business object, activity, intent, and/or reason associated with the particular event; and generating, using the textual summaries of the multiple events, a textual summary of the process performed by the user through the interactions between the user and the one or more application programs executing on the computing device; and outputting the textual summary of the process, wherein the stream of events comprises a first event corresponding to an interaction between the user and an application program of the one or more application programs executing on the computing device, wherein the information comprises first metadata associated with the first event, and wherein the first metadata comprises values for one or more attributes selected from the group consisting of: a name of the application program, a title of an application program screen of the application program with which the user interacted during the first event, an identifier of a user interface element of the application program screen with which the user interacted, a type of the user interface element of the application program screen with which the user interacted, one or more identifiers for one or more user interface elements of the application program screen with which the user did not interact, a duration of the interaction, and one or more textual phrases and/or sentences appearing on the application program screen.

14. The system of claim 13, wherein:

the at least one ML model consists of a single ML model; and processing the metadata associated with the particular event comprises processing the metadata associated with the particular event using the single ML model to determine the business object, the activity, the intent, and/or the reason associated with the particular event.

15. The system of claim 13, wherein:

the at least one ML model comprises a first ML model and a second ML model different from the first ML model; and processing the metadata associated with the particular event comprises:

processing the metadata associated with the particular event using the first ML model to determine the business object associated with the particular event; and processing the metadata associated with the particular event using the second ML model to determine the activity associated with the particular event.

16. The system of claim 15, wherein:

the at least one ML model comprises a third ML model different from the first and second ML models and a fourth ML model different from the first, second, and third ML model; and processing the metadata associated with the particular event comprises:

processing the metadata associated with the particular event using the third ML model to determine the intent associated with the particular event; and processing the metadata associated with the particular event using the fourth ML model to determine the reason associated with the particular event.

17. The system of claim 13, wherein:

the at least one ML model comprises a large language model; and processing metadata associated with the particular event using the at least one ML model comprises:

prompting the large language model with a natural language representation of the metadata associated with the particular event.

18. The system of claim 13, wherein generating the textual summary of the process comprises:

grouping two or more events in the multiple events into a step;

generating a textual summary of the step using the textual summaries of the two or more events; and generating the textual summary of the process using the textual summary of the step.

19. At least one non-transitory computer-readable storage medium storing processor executable instructions that, when executed by at least one computer hardware processor, cause the at least one computer hardware processor to perform a method of generating a textual summary of a stream of events corresponding to interactions between a user performing a process and one or more application programs executing on a computing device, the method comprising:

receiving information corresponding to the stream of events corresponding to the interactions between the user and the one or more application programs executing on the computing device, the information comprising, for each of multiple events in the stream of events associated with the process, metadata associated with the event, wherein metadata for a particular event specifies values for attributes of the particular event;

processing, using at least one machine learning (ML) model, the metadata associated with the multiple events in the stream of events to generate multiple corresponding textual summaries of the multiple events, the processing comprising:

for each particular event of the multiple events in the stream of events:

processing metadata associated with the particular event using the at least one ML model to determine a business object, an activity, an intent, and/or a reason associated with the particular event; and generating a textual summary of the particular event from the determined business object, activity, intent, and/or reason associated with the particular event; and generating, using the textual summaries of the multiple events, a textual summary of the process performed by the user through the interactions between the user and the one or more application programs executing on the computing device; and outputting the textual summary of the process, wherein the stream of events comprises a first event corresponding to an interaction between the user and an application program of the one or more application programs executing on the computing device, wherein the information comprises first metadata associated with the first event, and wherein the first metadata comprises values for one or more attributes selected from the group consisting of: a name of the application program, a title of an application program screen of the application program with which the user interacted during the first event, an identifier of a user interface element of the application program screen with which the user interacted, a type of the user interface element of the application program screen with which the user interacted, one or more identifiers for one or more user interface elements of the application program screen with which the user did not interact, a duration of the interaction, and one or more textual phrases and/or sentences appearing on the application program screen.

20. The at least one non-transitory computer-readable storage medium of claim 13, wherein:

the at least one ML model consists of a single ML model; and processing the metadata associated with the particular event comprises processing the metadata associated with the particular event using the single ML model to determine the business object, the activity, the intent, and/or the reason associated with the particular event.

* * * * *